(12) United States Patent
Ku et al.

(10) Patent No.: US 10,447,094 B2
(45) Date of Patent: Oct. 15, 2019

(54) METHOD, SYSTEM, AND APPARATUS FOR WIRELESS POWER TRANSMISSION BASED ON POWER WAVEFORMING

(71) Applicant: ORIGIN WIRELESS, INC., Greenbelt, MD (US)

(72) Inventors: Meng-Lin Ku, Taoyuan (TW); Yi Han, Ellicott City, MD (US); Hung-Quoc Duc Lai, Parkville, MD (US); Yan Chen, ChengDu (CN); Beibei Wang, Clarksville, MD (US); K. J. Ray Liu, Potomac, MD (US)

(73) Assignee: ORIGIN WIRELESS, INC., Greenbelt, MD (US)

( * ) Notice: Subject to any disclaimer, the term of this patent is extended or adjusted under 35 U.S.C. 154(b) by 490 days.

(21) Appl. No.: 15/584,052

(22) Filed: May 2, 2017

(65) Prior Publication Data
US 2018/0026481 A1    Jan. 25, 2018

Related U.S. Application Data

(60) Provisional application No. 62/331,278, filed on May 3, 2016.

(51) Int. Cl.
*H02J 50/23* (2016.01)
*H04B 5/00* (2006.01)
(Continued)

(52) U.S. Cl.
CPC .............. *H02J 50/23* (2016.02); *H02J 50/20* (2016.02); *H02J 50/40* (2016.02); *H04B 5/0037* (2013.01);
(Continued)

(58) Field of Classification Search
CPC .. H02J 50/20; H02J 50/23; H02J 50/40; H02J 7/025; H04B 5/0037; H04L 25/0226;
(Continued)

(56) References Cited

U.S. PATENT DOCUMENTS 2,933,702 A    4/1960 Bogert
3,767,855 A    10/1973 Ueno et al.
(Continued)

FOREIGN PATENT DOCUMENTS

EP           2571214 B1    4/2018
WO    2007/031088 A1    3/2007
(Continued)

OTHER PUBLICATIONS

U.S. Appl. No. 15/004,314, filed Jan. 22, 2016, Chen et al.
(Continued)

*Primary Examiner* — Un C Cho
*Assistant Examiner* — Shah M Rahman
(74) *Attorney, Agent, or Firm* — Yingxin Xiao

(57) ABSTRACT

The present teaching relates to wireless power transmission based on power waveforming. In one example, an apparatus for wireless power transmission is disclosed. The apparatus comprises: at least one antenna configured for receiving at least one wireless signal from a receiver, via a multipath channel between the apparatus and the receiver; and at least one processor configured for estimating at least one channel state information (CSI) of the multipath channel based on the at least one wireless signal, determining a power transmission waveform based on the at least one CSI, and calculating a power transfer signal based on the power transmission waveform and a reference signal. The at least one antenna is further configured for wirelessly transmitting the power transfer signal to the receiver.

23 Claims, 47 Drawing Sheets

(51) Int. Cl.
*H04L 5/00* (2006.01)
*H04L 27/26* (2006.01)
*H04L 25/02* (2006.01)
*H02J 50/40* (2016.01)
*H02J 50/20* (2016.01)
*H02J 7/02* (2016.01)

(52) U.S. Cl.
CPC ........ *H04L 5/0048* (2013.01); *H04L 25/0226* (2013.01); *H04L 27/2613* (2013.01); *H04L 27/2614* (2013.01); *H02J 7/025* (2013.01); *H04L 5/0023* (2013.01)

(58) Field of Classification Search
CPC ............. H04L 27/2613; H04L 27/2614; H04L 5/0023; H04L 5/0048
See application file for complete search history.

(56) References Cited

U.S. PATENT DOCUMENTS

| | | | |
|---|---|---|---|
| 5,092,336 | A | 3/1992 | Fink |
| 5,155,742 | A | 10/1992 | Ariyavisitakul et al. |
| 5,428,999 | A | 7/1995 | Fink |
| 5,926,768 | A | 7/1999 | Lewiner et al. |
| 6,301,291 | B1 | 10/2001 | Rouphael et al. |
| 6,490,469 | B2 | 12/2002 | Candy |
| 6,862,326 | B1 | 3/2005 | Eran et al. |
| 7,362,815 | B2 | 4/2008 | Lindskog et al. |
| 7,440,766 | B1 | 10/2008 | Tuovinen et al. |
| 7,460,605 | B2 | 12/2008 | Candy et al. |
| 7,463,690 | B2 | 12/2008 | Candy et al. |
| 7,587,291 | B1 | 9/2009 | Sarvazyan et al. |
| 7,768,876 | B2 | 8/2010 | Dahl et al. |
| 8,195,112 | B1 | 6/2012 | Zhang et al. |
| 8,346,197 | B2 | 1/2013 | Huy et al. |
| 8,362,651 | B2* | 1/2013 | Hamam ............... H04B 5/0037 307/104 |
| 8,411,765 | B2 | 4/2013 | Smith et al. |
| 8,451,181 | B2 | 5/2013 | Huy et al. |
| 8,457,217 | B2 | 6/2013 | Huy et al. |
| 8,498,658 | B2 | 7/2013 | Smith et al. |
| 8,593,998 | B2 | 11/2013 | Huy et al. |
| 8,743,976 | B2 | 6/2014 | Smith et al. |
| 8,792,396 | B2 | 7/2014 | Huy et al. |
| 8,831,164 | B2 | 9/2014 | Lu |
| 9,226,304 | B2 | 12/2015 | Chen et al. |
| 9,402,245 | B2 | 7/2016 | Chen et al. |
| 9,407,306 | B2 | 8/2016 | Yang et al. |
| 9,686,054 | B2 | 6/2017 | Yang et al. |
| 9,736,002 | B2 | 8/2017 | Yang et al. |
| 9,781,700 | B2 | 10/2017 | Chen et al. |
| 9,794,156 | B2 | 10/2017 | Ma et al. |
| 9,882,675 | B2 | 1/2018 | Han et al. |
| 9,883,511 | B1 | 1/2018 | Yang et al. |
| 9,887,864 | B1 | 2/2018 | Han et al. |
| 10,090,707 | B2* | 10/2018 | Davlantes ............... H01Q 3/36 |
| 10,211,662 | B2* | 2/2019 | Stein ....................... H04W 4/70 |
| 10,237,034 | B2* | 3/2019 | Son ....................... H04B 1/0639 |
| 2003/0036359 | A1* | 2/2003 | Dent ....................... H04B 7/005 455/63.1 |
| 2003/0138053 | A1 | 7/2003 | Candy et al. |
| 2004/0156443 | A1 | 8/2004 | Dent |
| 2006/0098746 | A1 | 5/2006 | Candy et al. |
| 2006/0115031 | A1 | 6/2006 | Lindskog et al. |
| 2006/0233221 | A1 | 10/2006 | Xu |
| 2006/0284593 | A1* | 12/2006 | Nagy ....................... H02J 7/00 320/109 |
| 2007/0178945 | A1* | 8/2007 | Cook ....................... H04B 1/1607 455/572 |
| 2010/0302977 | A1 | 12/2010 | Huy et al. |
| 2010/0309829 | A1 | 12/2010 | Huy et al. |
| 2010/0315045 | A1* | 12/2010 | Zeine ....................... H02J 7/025 320/137 |
| 2012/0155515 | A1 | 6/2012 | Smith et al. |
| 2012/0183037 | A1 | 7/2012 | Allpress et al. |
| 2012/0188058 | A1* | 7/2012 | Lee ....................... G06K 7/10356 340/10.1 |
| 2012/0207234 | A1 | 8/2012 | De Rosny et al. |
| 2012/0257660 | A1 | 10/2012 | Smith et al. |
| 2012/0263056 | A1 | 10/2012 | Smith et al. |
| 2012/0328037 | A1 | 12/2012 | Hsu et al. |
| 2013/0039168 | A1* | 2/2013 | Forenza ................ H04B 7/022 370/221 |
| 2013/0201958 | A1 | 8/2013 | Huy et al. |
| 2013/0223503 | A1 | 8/2013 | Smith et al. |
| 2014/0009108 | A1* | 1/2014 | Leabman ................ H02J 17/00 320/107 |
| 2014/0022128 | A1 | 1/2014 | Smith |
| 2014/0091626 | A1* | 4/2014 | Walley ................ H02J 7/0004 307/43 |
| 2014/0126567 | A1 | 5/2014 | Husain et al. |
| 2015/0049792 | A1 | 2/2015 | Han et al. |
| 2015/0333772 | A1* | 11/2015 | Voutilainen ............. H04L 1/007 714/755 |
| 2016/0018508 | A1 | 1/2016 | Chen et al. |
| 2016/0205569 | A1 | 7/2016 | Han et al. |
| 2017/0085126 | A1* | 3/2017 | Leabman ................ H02J 17/00 |
| 2017/0149284 | A1* | 5/2017 | Von Novak, III ... A01K 27/003 |
| 2017/0188359 | A1 | 6/2017 | Liu et al. |
| 2017/0212210 | A1 | 7/2017 | Chen et al. |

FOREIGN PATENT DOCUMENTS

| | | |
|---|---|---|
| WO | 2011/029072 A2 | 3/2011 |
| WO | 2011/029075 A2 | 3/2011 |
| WO | 2012/151316 A1 | 11/2012 |
| WO | 2013/126054 A1 | 8/2013 |
| WO | 2016/011433 A2 | 1/2016 |
| WO | 2017/100706 A1 | 6/2017 |
| WO | 2017/155634 A1 | 9/2017 |
| WO | 2017/156487 A1 | 9/2017 |
| WO | 2017/156492 A1 | 9/2017 |
| WO | 2017/180698 A1 | 10/2017 |

OTHER PUBLICATIONS

U.S. Appl. No. 15/004,335, filed Jan. 22, 2016, Chen et al.
U.S. Appl. No. 15/434,813, filed Feb. 16, 2017, Wu et al.
U.S. Appl. No. 15/061,059, filed Mar. 4, 2016, Ma et al.
U.S. Appl. No. 15/284,496, filed Oct. 3, 2016, Han et al.
Han et al., "Green radio: radio techniques to enable energy-efficient networks", IEEE Commun. Mag., Jun. 2011, pp. 46-54, vol. 49, No. 6.
Sudevalayam et al., "Energy harvesting sensor nodes: survey and implications", IEEE Commun. Surveys Tuts., Third Quarter 2011, pp. 443-461, vol. 13, No. 3.
Ku et al., "Advances in energy harvesting communications: past, present, and future challenges", IEEE Commun. Surveys Tuts., Second Quarter 2016, pp. 1384-1412, vol. 18, No. 2.
Ku et al., "Data-driven stochastic models and policies for energy harvesting sensor communications", IEEE J. Sel. Areas Commun., Aug. 2015, pp. 1505-1520, vol. 33, No. 8.
Vullers et al., "Energy harvesting for autonomous wireless sensor networks", IEEE Solid-State Circuits Mag., Spring 2010, pp. 29-38, vol. 2, No. 2.
Carvalho et al., "Wireless power transmission: R&D activities within Europe", IEEE Trans. Microw. Theory Techn., Apr. 2014, pp. 1031-1045, vol. 62, No. 4.
Kim et al., "Ambient RF energy-harvesting technologies for selfsustainable standalone wireless sensor platforms", Proc. IEEE, Nov. 2014, pp. 1649-1666, vol. 102, No. 11.
Chen et al., "Enhancing wireless information and power transfer by exploiting multi-antenna techniques", IEEE Commun. Mag., Apr. 2015, pp. 133-141, vol. 53, No. 4.
Huang et al., "Enabling wireless power transfer in cellular networks: architecture, modeling and deployment", IEEE Trans. Wireless Commun., Feb. 2014, pp. 902-912, vol. 13, No. 2.
Liu et al., "Multi-antenna wireless powered communication with energy beamforming", IEEE Trans. Commun., Dec. 2014, pp. 4349-4361, vol. 62, No. 12.

(56) References Cited

OTHER PUBLICATIONS

Yang et al., "Multi-antenna wireless energy transfer for backscatter communication systems", IEEE J. Sel. Areas Commun., Dec. 2015, pp. 2974-2987, vol. 33, No. 12.

Fang et al., "Distributed energy beamforming for simultaneous wireless information and power transfer in the two-way relay channel", IEEE Trans. Signal Process. Lett., Jun. 2015, pp. 656-660, vol. 22, No. 6.

Zeng et al., "Optimized training design for wireless energy transfer", IEEE Trans. Commun., Feb. 2015, pp. 536-550, vol. 63, No. 2.

Xu et al., "Energy beamforming with one-bit feedback", IEEE Trans. Signal Process., Oct. 2014, pp. 5370-5381, vol. 62, No. 20.

Kashyap et al., "Can wireless power transfer benefit from large transmitter arrays?", IEEE Wireless Power Transfer Conf., 2015, pp. 1-3.

Chen et al., "Energy-efficient optimization for wireless information and power transfer in large-scale MIMO systems employing energy beamforming", IEEE Wireless Commun. Lett., Dec. 2013, pp. 667-670, vol. 2, No. 6.

Yang et al., "Throughput optimization for massive MIMO systems powered by wireless energy transfer", IEEE J. Sel. Areas Commun., Aug. 2015, pp. 1640-1650, vol. 33, No. 8.

Wang et al., "Green wireless communications: a time-reversal paradigm", IEEE J. Sel. Areas Commun., Sep. 2011, pp. 1698-1710, vol. 29, No. 8.

Chen et al., "Time-reversal wideband communications", IEEE Trans. Signal Process. Lett., Dec. 2013, pp. 1219-1222, vol. 20, No. 12.

Chen et al., "Why Time-Reversal for Future 5G Wireless?", IEEE Signal Processing Magazine, Mar. 2016, pp. 17-26, vol. 33, No. 2.

Yang et al., "Near-optimal waveform design for sum rate optimization in time-reversal multiuser downlink wystems", IEEE Trans. Wireless Commun., Jan. 2013, pp. 346-357, vol. 12, No. 1.

Luo et al., "Capacity region of MISO broadcast channel for simultaneous wireless information and power transfer", IEEE Trans. Commun., Oct. 2015, pp. 3856-3868, vol. 62, No. 10.

Zhou et al., "Wireless power meets energy harvesting: a joint energy allocation approach in OFDM-based system", IEEE Trans. Wireless Commun., May 2016, pp. 3481-3491, vol. 15, No. 5.

Zhou et al., "Wireless information and power transfer in multiuser OFDM systems", IEEE Trans. Wireless Commun., Apr. 2014, pp. 2282-2294, vol. 13, No. 4.

Zeng et al., "Optimized training for net energy maximization in multi-antenna wireless energy transfer over frequency-selective channel", IEEE Trans. Commun., Jun. 2015, pp. 2360-2373, vol. 63, No. 6.

Kamalinejad et al., "Wireless energy harvesting for the Internet of Things", IEEE Commun. Mag., Jun. 2015, pp. 102-108, vol. 53, No. 6.

Lu et al., "Wireless charging technologies: fundamentals, standards, and network applications", IEEE Commun. Surveys Tuts., Second Quarter 2016, pp. 1413-1452, vol. 18, No. 2.

Wang et al., "Adaptively directional wireless power transfer for large-scale sensor networks", IEEE J. Sel. Areas Commun., May 2016, pp. 1785-1800, vol. 34, No. 5.

Kashyap et al., "On the feasibility of wireless energy transfer using massive antenna arrays", IEEE Trans. Wireless Commun., May 2016, pp. 3466-3480, vol. 15, No. 5.

Clerckx et al., "Waveform design for wireless power transfer", IEEE Trans. Signal Process., Dec. 2016, pp. 6313-6328, vol. 64, No. 23.

Zeng et al., "Communications and signals design for wireless power transmission", IEEE Trans. Commun., May 2017, pp. 2264-2290, vol. 65, No. 5.

Huang et al., "Simultaneous information and power transfer for broadband wireless systems", IEEE Trans. Signal Process., Dec. 2013, pp. 5972-5986, vol. 61, No. 23.

Lee et al., "Distributed wireless power transfer with energy feedback", IEEE Trans. Signal Process., Apr. 2017, pp. 1685-1699, vol. 65, No. 7.

Yang et al., "Dynamic resource allocation for multiple-antenna wireless power transfer", IEEE Trans. Signal Process., Jul. 2014, pp. 3565-3577, vol. 62, No. 14.

Xu et al., "A general design framework for MIMO wireless energy transfer with limited feedback", IEEE Trans. Signal Process., May 2016, pp. 2475-2488, vol. 64, No. 10.

Ku et al., "Power waveforming: wireless power transfer beyond time-reversal", IEEE Trans. Signal Process., Nov. 2016, pp. 5819-5834, vol. 64, No. 22.

Han et al., "Time-reversal massive multipath effect: a single-antenna "massive MIMO" solution", IEEE Trans. Commun., Aug. 2016, pp. 3382-3394, vol. 64, No. 8.

Chang et al., "Energy-assisted information detection for simultaneous wireless information and power transfer: performance analysis and case studies", IEEE Trans. Signal Inf. Process. Netw., Jun. 2016, pp. 149-159, vol. 2, No. 2.

Liu et al., "Wireless information transfer with opportunistic energy harvesting", IEEE Trans. Wireless Commun., Jan. 2013, pp. 288-300, vol. 12, No. 1.

Shi et al., "Joint transmit beamforming and receive power splitting for MISO SWIPT systems", IEEE Trans. Wireless Commun., Jun. 2014, pp. 3269-3280, vol. 13, No. 6.

Shi et al., "Joint beamforming and power splitting for MISO interference channel with SWIPT: an SOCP relaxation and decentralized algorithm", IEEE Trans. Signal Process., Dec. 2014, pp. 6194-6208, vol. 62, No. 23.

Shi et al., "Energy efficiency optimization for MISO SWIPT systems with zero-forcing beamforming", IEEE Trans. Signal Process., Feb. 2016, pp. 842-854, vol. 64, No. 4.

Zong et al., "Optimal transceiver design for SWIPT in K-user MIMO interference channels", IEEE Trans. Wireless Commun., Jan. 2016, pp. 430-445, vol. 15, No. 1.

Khandaker et al., "SWIPT in MISO multicasting systems", IEEE Wireless Commun. Lett., Jun. 2014, pp. 277-280, vol. 3, No. 3.

Zhong et al., "Wireless-powered communications: performance analysis and optimization", IEEE Trans. Commun., Dec. 2015, pp. 5178-5190, vol. 63, No. 12.

Huang et al., "On the performance of multi-antenna wireless-powered communications with energy beamforming", IEEE Trans. Veh. Technol., Mar. 2016, pp. 1801-1808, vol. 65, No. 3.

Ku et al., "Joint power waveforming and beamforming for wireless power transfer", IEEE Trans. Signal Process., Dec. 2017, pp. 6409-6422, vol. 65, No. 24.

* cited by examiner

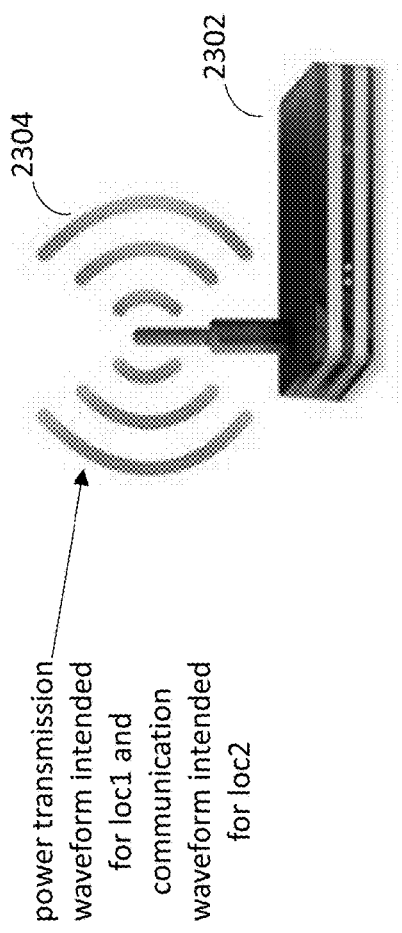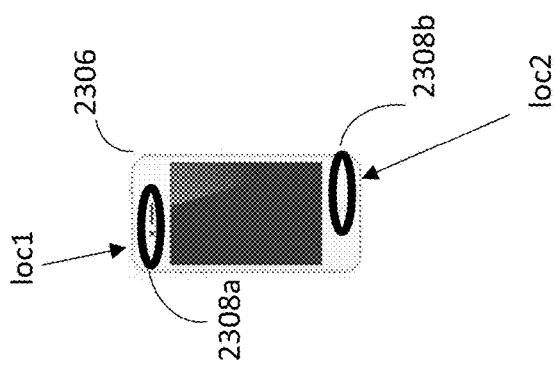
FIG. 26

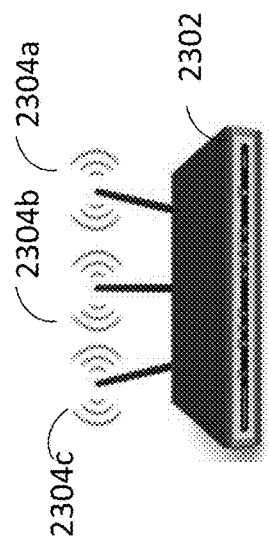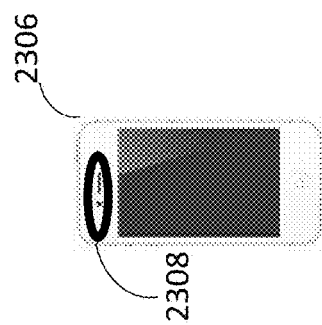
FIG. 29

METHOD, SYSTEM, AND APPARATUS FOR WIRELESS POWER TRANSMISSION BASED ON POWER WAVEFORMING

CROSS-REFERENCE TO RELATED APPLICATION

The present application claims priority to U.S. Patent Application No. 62/331,278, filed May 3, 2016, entitled "USING VIRTUAL ANTENNAS FOR POWER WAVEFORMING IN WIRELESS POWER TRANSMISSION SYSTEMS", which is incorporated herein by reference in its entirety.

TECHNICAL FIELD

The present teaching generally relates to wireless power transmission. More specifically, the present teaching relates to waveform designs that can be used to improve the efficiency of radiative wireless power transfer systems in multipath environments.

BACKGROUND

As the number of battery powered and mobile devices used by consumers has grown, people are interested in wireless power transfer systems that can be used to recharge or directly power those mobile devices. Recently, wireless power transfer systems have become commercially available that utilize near-field or inductive power transfer techniques and that require the power transmitter and receiver be very close to each other, if not actually in physical contact. Resonant inductive systems using high-Q resonator structures promise to transfer power more efficiently and over longer distances than inductive systems, but have yet to be widely deployed in the market place. Both traditional and resonant induction are sometimes referred to as non-radiative and/or near-field power transfer techniques, because the distance over which power is transferred is in the near-field of the inductive coils themselves. Therefore, the distance over which power may be efficiently transferred using non-radiative techniques is typically limited to one meter or less.

Near field or non-radiative wireless power transfer techniques are often contrasted to radiative techniques which in general are less efficient and which transfer power using propagating or radiated electromagnetic fields. While directed radiated electromagnetic radio waves can be used to transfer power efficiently over long distances, such systems have not been used in consumer applications because of performance concerns in non-line-of-sight environments and safety concerns of living beings' interaction with the directed energy beams as they propagate from the transmitter to the receiver. Omni-directional radiative schemes, sometimes referred to as direct transmission (DT) schemes, and similar if not the same as information transmission schemes, have relatively lower power transfer efficiency as much of the power radiated by a wireless transmitter is lost in free space. Power harvesters of ambient radio waves have been found some applications in very low power applications such as powering sensors, but are generally hampered by their inability to capture significant amounts of power or to capture less significant amounts of power in reasonable time frames.

Therefore, there is a need to provide a far-field/radiative wireless power transfer system to address the above-mentioned issues.

SUMMARY

The present teaching generally relates to wireless power transmission. More specifically, the present teaching relates to waveform designs that can be used to improve the efficiency of radiative wireless power transfer systems in multipath environments. Specially designed power transfer waveforms are disclosed. The present teaching describes embodiments operating in the radio frequency range of the electromagnetic spectrum; but other operating frequencies are possible and should be considered within the scope of the present teaching.

In one example, an apparatus for wireless power transmission is disclosed. The apparatus comprises: at least one antenna configured for receiving at least one wireless signal from a receiver, via a multipath channel between the apparatus and the receiver; and at least one processor configured for estimating at least one channel state information (CSI) of the multipath channel based on the at least one wireless signal, determining a power transmission waveform based on the at least one CSI, and calculating a power transfer signal based on the power transmission waveform and a reference signal. The at least one antenna is further configured for wirelessly transmitting the power transfer signal to the receiver.

In another example, an apparatus for wireless power transmission is disclosed. The apparatus comprises: at least one antenna configured for receiving a first wireless signal from a first receive antenna of a receiver, via a multipath channel between the apparatus and the receiver, and receiving a second wireless signal from a second receive antenna of the receiver, via the multipath channel between the apparatus and the receiver; and at least one processor configured for estimating at least one CSI of the multipath channel based on the first wireless signal and the second wireless signal, determining, based on the at least one CSI, a first power transmission waveform for wirelessly transmitting power to the first receive antenna, determining, based on the at least one CSI, a second power transmission waveform for wirelessly transmitting power to the second receive antenna, determining a composite power transmission waveform based on a combination of the first and second power transmission waveforms, and calculating a composite power transfer signal based on the composite power transmission waveform and a reference signal. The at least one antenna is further configured for wirelessly transmitting the composite power transfer signal to the receiver.

In yet another example, an apparatus for wireless power transmission is disclosed. The apparatus comprises: a first antenna configured for receiving a first wireless signal from a receiver, via a multipath channel between the apparatus and the receiver; a second antenna configured for receiving a second wireless signal from the receiver, via the multipath channel; and at least one processor configured for estimating at least one CSI of the multipath channel based on the first wireless signal and the second wireless signal, determining, based on the at least one CSI, a first power transmission waveform for wirelessly transmitting power from the first antenna to the receiver, determining, based on the at least one CSI, a second power transmission waveform for wirelessly transmitting power from the second antenna to the receiver, calculating a first power transfer signal based on the first power transmission waveform and a first reference signal, and calculating a second power transfer signal based on the second power transmission waveform and a second reference signal. The first antenna is further configured for wirelessly transmitting the first power transfer signal to the receiver. The second antenna is further configured for wirelessly transmitting the second power transfer signal to the receiver.

In still another example, an apparatus for wireless power transmission is disclosed. The apparatus comprises: at least one antenna configured for receiving a first wireless signal from a first receiver, via a first multipath channel between the apparatus and the first receiver, and receiving a second wireless signal from a second receiver, via a second multipath channel between the apparatus and the second receiver; and at least one processor configured for estimating a first CSI of the first multipath channel based on the first wireless signal, estimating a second CSI of the second multipath channel based on the second wireless signal, determining, based on the first CSI and the second CSI, a first power transmission waveform for wirelessly transmitting power to the first receiver and a second power transmission waveform for wirelessly transmitting power to the second receiver, determining a composite power transmission waveform based on a combination of the first and second power transmission waveforms, and calculating a composite power transfer signal based on the composite power transmission waveform and a reference signal. The at least one antenna is further configured for wirelessly transmitting the composite power transfer signal to the first and second receivers.

In a different example, an apparatus for simultaneously transmitting wireless power and data is disclosed. The apparatus may comprise: at least one antenna configured for receiving at least one wireless signal from a receiver, via a multipath channel between the apparatus and the receiver; and at least one processor configured for estimating at least one CSI of the multipath channel based on the at least one wireless signal, determining, based on the at least one CSI, a power transmission waveform and a data waveform, and calculating a composite signal based on the power transmission waveform, the data waveform, a power reference signal, and a data reference signal. The at least one antenna is further configured for wirelessly transmitting the composite signal to the receiver.

In a different example, an apparatus for simultaneously receiving wireless power and data is disclosed. The apparatus may comprise: at least one processor configured for generating a channel probe signal; at least one antenna configured for wirelessly transmitting the channel probe signal to the transmitter, via a multipath channel between the apparatus and a transmitter, and receiving a composite signal including wireless power and data from the transmitter; a power splitter configured for dividing the composite signal into a first portion and a second portion; and at least one power converter configured for converting the first portion to a wired power signal, wherein the at least one processor is further configured for extracting data from the second portion.

In a different example, an apparatus for simultaneously transmitting wireless power and data is disclosed. The apparatus may comprise: at least one antenna configured for receiving a first wireless signal from a first receiver, via a first multipath channel between the apparatus and the first receiver, and receiving a second wireless signal from a second receiver, via a second multipath channel between the apparatus and the second receiver; and at least one processor configured for estimating a first CSI of the first multipath channel based on the first wireless signal, estimating a second CSI of the second multipath channel based on the second wireless signal, determining, based on the first CSI and the second CSI, a power transmission waveform for wirelessly transmitting power to the first receiver and a data waveform for wirelessly transmitting data to the second receiver, calculating a first signal based on the power transmission waveform, and calculating a second signal based on the data waveform. The at least one antenna is further configured for wirelessly transmitting the first signal to the first receiver, and wirelessly transmitting the second signal to the second receiver.

In another example, a method for wireless power transmission is disclosed. The method may be implemented on a machine including at least a processor and a memory communicatively coupled with the processor. The method may comprise: receiving at least one wireless signal via a multipath channel from a receiver; estimating at least one CSI of the multipath channel based on the at least one wireless signal; determining a power transmission waveform based on the at least one CSI; calculating a power transfer signal based on the power transmission waveform and a reference signal; and wirelessly transmitting the power transfer signal to the receiver.

Other examples in the present teaching may include systems, methods, medium, devices, servers, and other implementations directed to wireless power transmission based on power waveforming.

Other concepts relate to software for implementing the present teaching on exploring computation, storage, application, or processing of wireless power transmission based on power waveforming. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings.

FIG. 26 shows an exemplary embodiment of the disclosed wireless power transfer system including a power/data transmitter and a power/data receiver, according to an embodiment of the present teaching.

FIG. 29 shows another exemplary embodiment of the disclosed wireless power transfer system including a transmitter and a receiver, according to an embodiment of the present teaching.

FIG. 31A shows the values of $|g_1[n]|$ and $|g_2[n]|$. FIG. 31B shows the real and imaginary parts of $v[n]$. FIG. 31C shows the values of $|\tilde{v}[k]|^2$ and $\tilde{q}[k]$. FIG. 31D shows the values of $|\tilde{h}_1[k]|^2$, $|\tilde{h}_1[k]|^2|\tilde{v}[k]|^2$ and $|\tilde{g}_1[k]|^2$. FIG. 31E shows the values of $|\tilde{h}_2[k]|^2$, $|\tilde{h}_2[k]|^2|\tilde{v}[k]|^2$ and $|\tilde{g}_2[k]|^2$.

DETAILED DESCRIPTION

Figure 1:
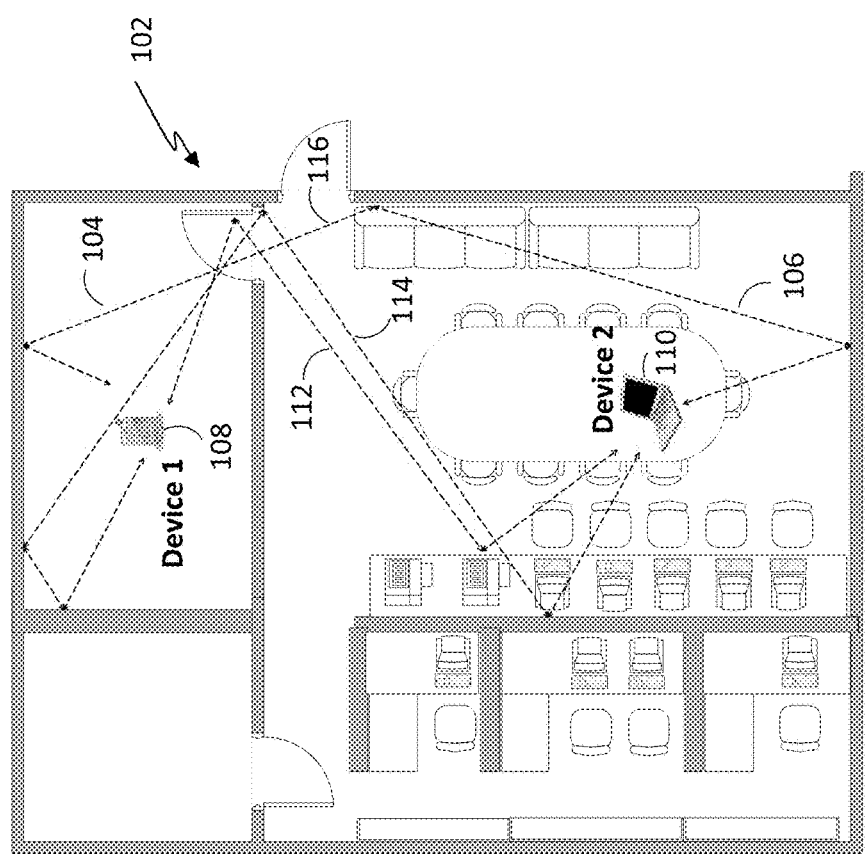
FIG. 1 is a diagram showing an exemplary environment for operating a time-reversal system, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In general, the present teaching discloses a new type of far-field/radiative wireless power transfer technique that can increase the efficiency of traditional direct transmission energy transfer systems. This technique takes advantage of virtual antennas associated with the multiple signal paths in indoor or multipath environments and specially designed power waveforms that can be used to deliver power using radio transmitters and receivers and/or transceivers. This novel, radiative power transfer system, which may be referred to as "power waveforming" (PW) system, may be used to supply power to both stationary and mobile devices over distances typical for wireless routers and access points (e.g. meters to tens of meters).

In exemplary embodiments, a power or source transmitter engages in delivering wireless power to an intended receiver or receivers by utilizing specially designed and/or determined power transfer waveforms derived from information related to the multi-path channel impulse response of the wireless channel between the transmitter and receiver. In general, embodiments may include one or more transmitters, one or more receivers, one or more channel impulse responses, and one or more power transmission waveforms. In some embodiments, any or all of the transmitters and receivers may be transceivers and may be capable of operating as any or all of power sources, power receivers, and/or power relays. In some embodiments, traditional wireless system components such as components in Wi-Fi systems, Bluetooth systems, OFDM systems, narrowband systems and the like, may be used in wireless power transfer systems.

In some embodiments, multiple power sources may send power to a single power receiver, a single power source may send power to multiple receivers, and multiple power sources may send power to multiple receivers. In the present teaching, an antenna may constitute a transmitter, a receiver, a transceiver and the like. In the present teaching, one may refer to power sources as power sources, power transmitters, transmitters, data transmitters, waveform transmitters, sources, data sources, waveform sources, power supplies, supplies, power origins, origins, and the like. In some embodiments the source or sources of power in these power waveforming systems may be the power mains, batteries, fuel cells, renewable energy sources such as solar cells, power harvesters or scavengers, other wireless power transfer systems, and the like.

Traditional radiative power transmission schemes in indoor environments or in environments with rich multi-paths may suffer from signal dispersion, interference, shadowing effects and large-scale path loss, and these effects may result in insufficient power transfer performance. Previously, beamforming techniques have been applied to combat the signal power loss over distance and to enhance the power transfer efficiency. Specifically, in wireless power transfer, multiple transmit antennas may facilitate focusing a power beam at an intended receiver, while multiple receive antennas may increase the effective aperture area of the receiver. However, utilizing multiple antennas for beamforming in wireless power transfer systems requires additional hardware and may increase system cost and complexity. Also, many beamforming techniques generally require the existence of a clear line-of-sight (LOS) link between the transmitter and the receiver. In rich scattering environments, beamforming schemes may be less efficient because the LOS link may be blocked by objects such as walls, doors, room dividers, furniture and the like, or attenuated by penetration loss.

The present teaching discloses a novel wireless power transmission system that takes advantage of omni-directional antennas and scatterers in the environment to increase the efficiency of radiative wireless power transmission systems. The disclosed wireless power system which one may refer to as power waveforming system uses specially designed wireless waveforms to overcome the impact of scatterers and non-LOS application scenarios. In some exemplary embodiments, wireless transmission waveforms determined from channel impulse response information and/or channel state information may be transmitted and spatially focused to deliver power to an intended location or receiver. In other exemplary embodiments, simplified and/or narrowband waveforms, where the chosen center frequency of the waveform is related to the position of the transmitter and receiver and the environment in which they operate, may also be used to preferentially deliver power radiatively from a transmitter to a receiver.

Time-reversal (TR) transmission waveforms can take advantage of multi-path propagation channels to provide spatial and temporal focusing of wireless signals at a receiver. In various embodiments, the novel power waveforming systems disclosed herein may utilize some of those TR techniques, apparatus, and methods. In particular, previous TR communication systems have been described that operate in substantially two phases, a channel probing phase and a data transmission phase. During the channel probing phase, a first device sends a channel probe signal to a second device. The probe signal probes the channel impulse response (CIR) or channel frequency response (CFR) or channel state information (CSI) of the channel between the first and second devices. The second device may use the received probe signal to determine and/or estimate the CSI, CIR or CFR of the channel. In the present teaching, one may refer to any of the CSI, CIR and/or CFR as yielding information related to a wireless channel. It should be understood that the present teaching is not limited to CSI only embodiments, CIR only embodiments or CFR only embodiments. In general, any of the CSI, CIR or CFR may be used to realize the embodiments described herein.

In a basic TR communication system, the second device may detect and process the received signal to determine the CIR and may then generate a waveform that is a time-reversed version of the CIR. The second device may then use its data transmitter to generate a transmitted signal intended for the first device by encoding data onto a time-reversed waveform related to the CIR, which may also be called a "basic TR" waveform, in order to leverage the multipath channel as a cost-free matched filter and to refocus the signal power at the first device. This phenomenon may be referred to as a spatial-temporal focusing effect, since it concentrates the signal power at a particular instant in time and at an intended spatial location. In spite of this focusing advantage of TR communication systems, a large delay spread of a channel may cause inter-symbol interference and the presence of other devices in the communication system may cause inter-user interference. To compensate for these effects, a new communications waveform, referred to as "MaxSINR" waveform, was designed to maximize the signal-to-interference plus noise ratio (SINR) at a receiving device. See, for example, "Near-optimal waveform design for sum rate optimization in time-reversal multiuser downlink systems," *IEEE Trans. Wireless Commun.*, vol. 12, no. 1, pp. 346-357, January 2013. It has shown that a MaxSINR waveform provides improved communication performance compared to a basic TR waveform in time-reversal communication systems.

But the basic time-reversal waveform may not be the best waveform for exchanging power between wireless devices. Rather, new waveform designs have been developed and utilized to take advantage of multipath signals channels to improve wireless power transmission performance. The present teaching discloses these novel waveforms that may be used for radiative wireless power transfer systems and wireless power apparatus and systems based on utilizing these waveforms. In the present teaching, one may refer to these novel wireless power transmission systems as power waveforming and/or power waveforming systems, but it should be understood that there are a number of power waveforms that may be utilized in power waveforming systems. Many of the previously disclosed channel impulse response measurement and processing techniques and time-reversal techniques disclosed in the present teaching may prove useful in determining, generating, controlling and optimizing the wireless power waveforms of the present teaching. Using the exemplary disclosed waveforms described herein, the disclosed power waveforming systems are capable of constructively recollecting the dispersed signal power existing in multipath channels and providing improved wireless power transmission performance compared to traditional direct transmission systems.

In one example, an apparatus for wireless power transmission is disclosed. The apparatus comprises: at least one antenna configured for receiving at least one wireless signal from a receiver, via a multipath channel between the apparatus and the receiver; and at least one processor configured for estimating at least one channel state information (CSI) of the multipath channel based on the at least one wireless signal, determining a power transmission waveform based on the at least one CSI, and calculating a power transfer signal based on the power transmission waveform and a reference signal. The at least one antenna is further configured for wirelessly transmitting the power transfer signal to the receiver.

In one embodiment, the apparatus may further comprise: a digital-to-analog converter configured for converting the power transfer signal having a digital format to an analog power transfer signal; and an amplifier configured for amplifying the analog power transfer signal to generate an amplified analog power transfer signal, wherein the at least one antenna is configured for wirelessly transmitting the amplified analog power transfer signal to the receiver.

In one embodiment, determining the power transmission waveform comprises designing the power transmission waveform to maximize an efficiency of energy delivery from the apparatus to the receiver. In another embodiment, determining the power transmission waveform comprises jointly designing the power transmission waveform and the reference signal to maximize an efficiency gain that is a ratio between a total harvested energy at the receiver and a total energy expenditure at the apparatus. In one example, jointly designing the power transmission waveform and the reference signal may comprise: initiating an iteration number; optimizing, based on an initial version of the reference signal or a previous version of the reference signal from previous iteration, the power transmission waveform to maximize the efficiency gain and generate a current version of the power transmission waveform of current iteration; optimizing, based on the current version of the power transmission waveform of current iteration, the reference signal to maximize the efficiency gain and generate a current version of the reference signal of current iteration; increasing the iteration number by one; and repeating the steps of optimizing the power transmission waveform, optimizing the reference signal and increasing the iteration number, until at least one of the following: the iteration number exceeds a first threshold, a difference between the current version of the reference signal of current iteration and the previous version of the reference signal from previous iteration is smaller than a second threshold, and a difference between the current version of the power transmission waveform of current iteration and a previous version of the power transmission waveform from previous iteration is smaller than a third threshold. The initial version of the reference signal may be a single-tone signal that has a power spectrum condensed into a single frequency tone that has a largest value of summation of channel power over all transmit antennas on the apparatus. In another example, jointly designing the power transmission waveform and the reference signal may comprise designing the power transmission waveform to be a single-tone waveform regardless of the designing of the reference signal, when the reference signal is periodic and a first length of the power transmission waveform is a multiple of a second length of the reference signal. In yet another example, jointly designing the power transmission waveform and the reference signal may comprise designing the reference signal to be a single-tone signal that has a power spectrum condensed into a single frequency tone that has a largest value of summation of channel power over all transmit antennas on the apparatus, regardless of the designing of the power transmission waveform, when the reference signal is periodic and a second length of the reference signal is larger than or equal to a third length of the multipath channel.

In one embodiment, the at least one processor is further configured for adjusting at least one of the following parameters: a quantity of transmit antennas on the apparatus for wirelessly transmitting power transfer signals, a quantity of multipaths of the multipath channel, a length of the power transmission waveform, and a length of the reference signal. Each of the parameters may be adjusted based on at least one of: a first relationship between an upper bound of an outage probability and the parameter, wherein the outage probability is a probability that harvested energy at the receiver is smaller than or equal to a predetermined threshold; and a second relationship between a lower bound of an efficiency gain and the parameter, wherein the efficiency gain is a ratio between a total harvested energy at the receiver and a total energy expenditure at the apparatus.

In one embodiment, the power transmission waveform is a narrowband frequency tone waveform. In one embodiment, the at least one antenna includes at least one of: an omni-directional antenna and a dipole antenna. In one embodiment, the at least one wireless signal has an autocorrelation function that is a delta function. In one embodiment, the at least one CSI includes at least one of: a channel impulse response (CIR) of the multipath channel and a channel frequency response (CFR) of the multipath channel. In one embodiment, the at least one wireless signal includes at least one of: a wireless signal having a center frequency between 2 GHz and 3 GHz and a wireless signal having a center frequency between 5 GHz and 7 GHz. In various embodiments, the at least one wireless signal is received by the at least one antenna through a network that is at least one of: Internet, an Internet-protocol network, and another multiple access network; and the at least one antenna is associated with a physical layer of at least one of: a wireless PAN, IEEE 802.15.1 (Bluetooth), a wireless LAN, IEEE 802.11 (Wi-Fi), a wireless MAN, IEEE 802.16 (WiMax), WiBro, HiperMAN, mobile WAN, GSM, GPRS, EDGE, HSCSD, iDEN, D-AMPS, IS-95, PDC, CSD, PHS, WiDEN, CDMA2000, UMTS, 3GSM, CDMA, TDMA, FDMA, W-CDMA, HSDPA, W-CDMA, FOMA, 1×EV-DO, IS-856, TDSCDMA, GAN, UMA, HSUPA, LTE, 2.5G, 3G, 3.5G, 3.9G, 4G, 5G, 6G, 7G and beyond, another wireless system and another mobile system.

In one embodiment, the at least one antenna is further configured for receiving a feedback signal from the receiver; the at least one processor is further configured for detecting a change of the multipath channel based on the feedback signal; estimating updated at least one CSI of the multipath channel upon detecting the change of the multipath channel, updating at least one of the power transmission waveform and the reference signal based on the updated at least one CSI, and re-calculating the power transfer signal to generate an updated power transfer signal; and the at least one antenna is further configured for wirelessly transmitting the updated power transfer signal to the receiver.

In one embodiment, the at least one antenna is further configured for receiving a feedback signal from the receiver; the at least one processor is further configured for determining that harvested energy at the receiver is smaller than or equal to a predetermined threshold based on the feedback signal; updating at least one of: a first length of the power transmission waveform, a second length of the reference signal, a third length of the multipath channel, and a quantity of transmit antennas, and re-calculating the power transfer signal to generate an updated power transfer signal; and one or more of the at least one antenna, according to the quantity of transmit antennas, is further configured for wirelessly transmitting the updated power transfer signal to the receiver.

In one embodiment, the at least one processor is further configured for determining a first narrow band power transmission waveform having a first frequency that is selected based on at least one characteristic associated with wireless power transmission to the receiver, the first frequency being within a first frequency range, determining a second narrow band power transmission waveform having a second frequency that is selected based on the at least one characteristic, the second frequency being within a second frequency range that does not overlap the first frequency range, determining a composite narrow band power transmission waveform based on a combination of the first and second narrow band power transmission waveforms, and calculating a composite narrow band power transfer signal based on the composite narrow band power transmission waveform; and the at least one antenna is further configured for wirelessly transmitting the composite narrow band power transfer signal to the receiver. For example, the first frequency range may overlap 2.4 GHz, and the second frequency range may overlap 5.8 GHz. For example, the at least one processor is further configured for at least one of: selecting the first frequency to maximize an efficiency gain that is a ratio between a total harvested energy at the receiver and a total energy expenditure at the apparatus, as compared to other frequencies in the first frequency range; and selecting the second frequency to maximize the efficiency gain, as compared to other frequencies in the second frequency range.

In another example, an apparatus for wireless power transmission is disclosed. The apparatus comprises: at least one antenna configured for receiving a first wireless signal from a first receive antenna of a receiver, via a multipath channel between the apparatus and the receiver, and receiving a second wireless signal from a second receive antenna of the receiver, via the multipath channel between the apparatus and the receiver; and at least one processor configured for estimating at least one CSI of the multipath channel based on the first wireless signal and the second wireless signal, determining, based on the at least one CSI, a first power transmission waveform for wirelessly transmitting power to the first receive antenna, determining, based on the at least one CSI, a second power transmission waveform for wirelessly transmitting power to the second receive antenna, determining a composite power transmission waveform based on a combination of the first and second power transmission waveforms, and calculating a composite power transfer signal based on the composite power transmission waveform and a reference signal. The at least one antenna is further configured for wirelessly transmitting the composite power transfer signal to the receiver.

In one embodiment, the first power transmission waveform is determined such that when a signal generated based on the first power transmission waveform is transmitted to the receiver, an amount of power received at the first receive antenna of the receiver is greater than an amount of power received at the second receive antenna of the receiver; and the second power transmission waveform is determined such that when a signal generated based on the second power transmission waveform is transmitted to the receiver, an amount of power received at the second receive antenna of the receiver is greater than an amount of power received at the first receive antenna of the receiver.

In yet another example, an apparatus for wireless power transmission is disclosed. The apparatus comprises: a first antenna configured for receiving a first wireless signal from a receiver, via a multipath channel between the apparatus and the receiver; a second antenna configured for receiving a second wireless signal from the receiver, via the multipath channel; and at least one processor configured for estimating at least one CSI of the multipath channel based on the first wireless signal and the second wireless signal, determining, based on the at least one CSI, a first power transmission waveform for wirelessly transmitting power from the first antenna to the receiver, determining, based on the at least one CSI, a second power transmission waveform for wirelessly transmitting power from the second antenna to the receiver, calculating a first power transfer signal based on the first power transmission waveform and a first reference signal, and calculating a second power transfer signal based on the second power transmission waveform and a second reference signal. The first antenna is further configured for wirelessly transmitting the first power transfer signal to the receiver. The second antenna is further configured for wirelessly transmitting the second power transfer signal to the receiver. In one embodiment, the first reference signal and the second reference signal is a common reference signal.

In still another example, an apparatus for wireless power transmission is disclosed. The apparatus comprises: at least one antenna configured for receiving a first wireless signal from a first receiver, via a first multipath channel between the apparatus and the first receiver, and receiving a second wireless signal from a second receiver, via a second multipath channel between the apparatus and the second receiver; and at least one processor configured for estimating a first CSI of the first multipath channel based on the first wireless signal, estimating a second CSI of the second multipath channel based on the second wireless signal, determining, based on the first CSI and the second CSI, a first power transmission waveform for wirelessly transmitting power to the first receiver and a second power transmission waveform for wirelessly transmitting power to the second receiver, determining a composite power transmission waveform based on a combination of the first and second power transmission waveforms, and calculating a composite power transfer signal based on the composite power transmission waveform and a reference signal. The at least one antenna is further configured for wirelessly transmitting the composite power transfer signal to the first and second receivers.

In one embodiment, determining a composite power transmission waveform comprises designing the composite power transmission waveform to maximize an aggregated efficiency gain that is a ratio between a total harvested energy at the first and second receivers and a total energy expenditure at the apparatus. In another embodiment, determining a composite power transmission waveform comprises designing the composite power transmission waveform to maximize a minimum of a first efficiency gain and a second efficiency gain, wherein the first efficiency gain is a ratio between a total harvested energy at the first receiver and a total energy expenditure at the apparatus, and the second efficiency gain is a ratio between a total harvested energy at the second receiver and a total energy expenditure at the apparatus. In another embodiment, determining a composite power transmission waveform comprises designing the composite power transmission waveform to maximize one of a first efficiency gain and a second efficiency gain, while keeping the other one of the first efficiency gain and the second efficiency gain above a threshold, wherein the first efficiency gain is a ratio between a total harvested energy at the first receiver and a total energy expenditure at the apparatus, and the second efficiency gain is a ratio between a total harvested energy at the second receiver and a total energy expenditure at the apparatus. The first receiver may be associated with a first user; and the second receiver may be associated with a second user.

In yet another example, a system for simultaneously transmitting wireless power and data is disclosed. The system may comprise a transmitter and a receiver. The transmitter may comprise: at least one antenna configured for receiving at least one wireless signal from the receiver, via a multipath channel between the transmitter and the receiver; and at least one processor configured for estimating at least one CSI of the multipath channel based on the at least one wireless signal, determining, based on the at least one CSI, a power transmission waveform and a data waveform, and calculating a composite signal based on the power transmission waveform, the data waveform, a power reference signal, and a data reference signal, wherein the at least one antenna is further configured for wirelessly transmitting the composite signal to the receiver.

In one embodiment, determining the power transmission waveform and the data waveform comprises designing the power transmission waveform and the data waveform to achieve at least one of the following: maximizing an efficiency gain that is a ratio between a total harvested energy at the receiver and a total energy expenditure at the apparatus, while keeping quality of service (QoS) with respect to data received at the receiver above a first threshold; and maximizing the QoS with respect to data received at the receiver, while keeping the efficiency gain above a second threshold. The QoS with respect to data received at the receiver may be determined based on at least one of: signal-to-noise ratio at the receiver, interference at the receiver, data rate at the receiver subject to a power constraint, signal-to-interference ratio, signal-to-interference-plus-noise ratio, signal-to-noise ratio, data rate, error rate, throughput, transmission delay, jitter, and a metric of availability. The jitter may refer to a variation in delay for an audio or a video application. The metric of availability may refer to availability of resources that can be represented by the ratio between the total time some resources are capable of being used during a given interval and the duration of the interval.

In one embodiment, the receiver in the system may comprises at least one processor configured for generating a channel probe signal; at least one antenna configured for wirelessly transmitting the channel probe signal to the transmitter, via the multipath channel, and receiving a composite signal including wireless power and data from the transmitter; a power splitter configured for dividing the composite signal into a first portion and a second portion; and at least one power converter configured for converting the first portion to a wired power signal, wherein the at least one processor is further configured for extracting data from the second portion.

Unless otherwise defined, all technical and scientific terms used herein have the same meaning as commonly understood by one of ordinary skill in the art to which the present teaching belongs. In case of conflict with patent applications incorporated herein by reference, the present specification, including definitions, will control.

Overview of Multipath Environments

The following provides an overview of multi-path environments and how waveforming may be utilized to realize improved wireless system performance in these environments. Referring to FIG. 1, a multipath environment 102 may comprise structures or objects that may cause one or more reflections of wireless signals. Many indoor locations, and some outdoor locations comprising multiple structures and/or objects and/or reflectors and/or scatterers, and the like, may be considered to be rich multipath environments. By way of example but not limitation, exemplary venue or location 102 may have a first room 104 and a second room 106. When a first wireless device 108 in the first room 104 transmits a signal to a second wireless device 110 in the second room 106, the wireless signal can propagate in several directions and reach the second device 110 by traveling through several exemplary propagation paths, e.g., 112, 114, and 116. The signal traveling through multiple propagation paths is referred to as a multipath signal. As the signal travels through the propagation paths, the signal may become distorted and noise may be added. The multipath signal received by the second device 110 can be quite different from the signal transmitted by the first device 108.

Figure 2A:
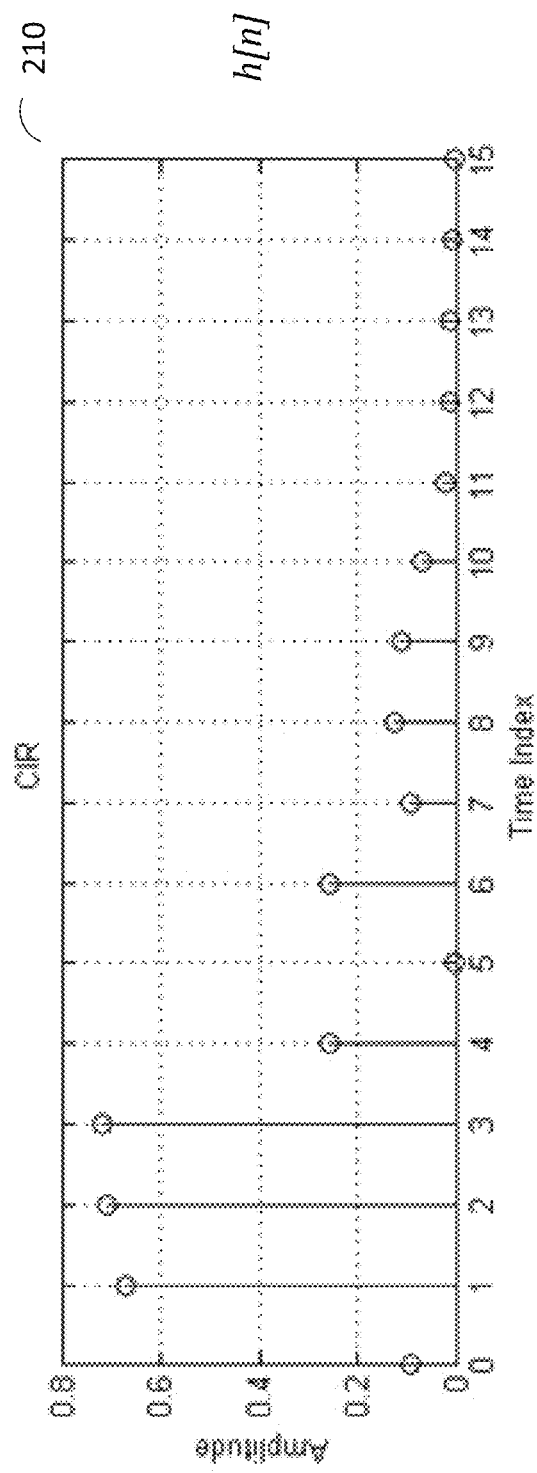
FIG. 2A is a graph of an exemplary channel impulse response waveform, according to an embodiment of the present teaching.

For example, if the first device 108 sends a channel probe signal, as described above, the second device 110 may receive that signal and determine a channel impulse response for that channel. FIG. 2A shows the amplitude of an exemplary channel impulse response 210 for a wireless channel in an office environment measured with a 125 MHz wideband signal. The waveform 210 may be referred to as the channel impulse response signal or CIR.

Figure 2B:
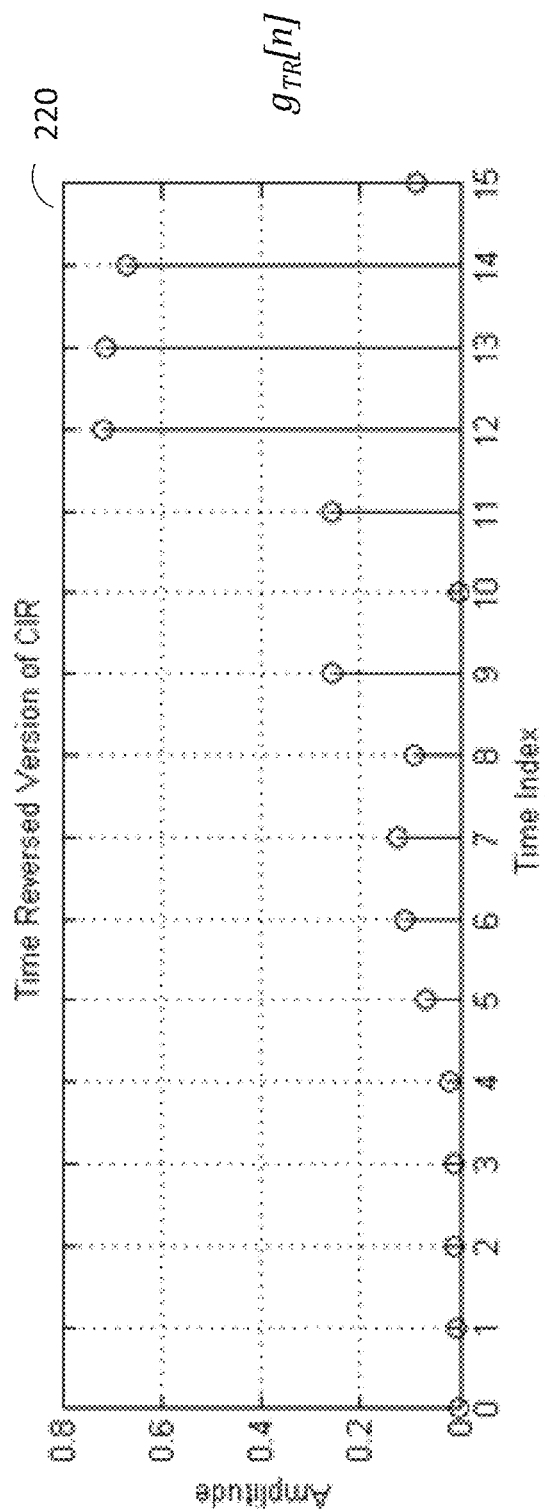
FIG. 2B is a graph of an exemplary time-reversed waveform generated by reversing the waveform in FIG. 2A with respect to time, according to an embodiment of the present teaching.

CIR information can be used to design waveforms that may realize improved system performance in wireless communication systems. For example, as disclosed in U.S. patent application Ser. No. 13/969,271, filed Aug. 16, 2013, entitled "Time-Reversal Wireless System Having Asymmetric Architecture", and U.S. patent application Ser. No. 14/912,324, filed Feb. 16, 2016, entitled "Time-Reversal Wireless System Having Asymmetric Architecture", which are incorporated herein by reference in their entireties, a waveform that is substantially a time-reversed version of the channel impulse response may be used to provide spatial and temporal focusing of an information signal at an intended receiver, improving its signal-to-noise ratio and reducing ISI. An example of the time-reversed version of the exemplary CIR of FIG. 2A is shown in FIG. 2B, 220. Referring to FIG. 2B, a time-reversed waveform 220 can be generated by processing a received waveform where the processing includes reversing the waveform 210 with respect to time.

In an exemplary time-reversal (TR) communication system, if the second device 110 sends a signal having the time-reversed waveform 220 to the first device 108, the signal will propagate in various directions, including back through exemplary propagation paths 112, 114, and 116 (in reverse direction relative to the propagation direction of the impulse signal), and reach the first device 108, effectively reconstituted as the channel probing signal. If the channel probing signal was a pulse, then in an idealized situation, the multipath signal received at the first device 108 would form a pulse signal that is similar to the pulse signal previously sent from the first device 108 to the second device 110. In other words, the signal may be spatially and temporally focused at the first device 108.

One way to understand this system performance of the TR communication system is to think of the signals that travel along the various multipaths in the environment as having been generated by "virtual antennas". It is known that multiple antennas may be used to control the direction and the focus of electro-magnetic waves using techniques referred to as "phased array", "beamsteering" and "beamforming". Such multi-antenna systems may be used to focus energy at an intended location, but such systems also require multiple "real" antennas and potentially complex coordination between those multiple antennas. The disclosed technique may use only a single real antenna and leverages the multipath environment as virtual antennas to achieve capabilities previously only associated with multi-antenna systems. That is, by launching designed waveforms from a single transmit antenna, one can coherently manipulate the impact of the multipath propagation on the far field signal distribution. As shown in U.S. patent application Ser. No. 15/284,496, filed Oct. 3, 2016, entitled "Time-Reversal Communication Systems", which is incorporated herein by reference in its entirety, properly designed waveforms launched from a single antenna and propagated in multipath environments may achieve similar spatial and temporal control of their radio signals as MIMO (multiple input antenna, multiple output antenna) systems when the number of real antennas in the MIMO system is similar to the number of virtual antennas in the disclosed novel waveforming system. An important difference between using real and virtual antennas is that since the disclosed waveforming technique can be realized using a single transmit and/or receive antenna, the disclosed systems may use less equipment, consume less power, and require fewer feedback, control and synchronization systems. However, the power waveforming system can also deploy multiple transmit and/or receive antennas to better utilize the spatial diversity.

The implemented systems may differ from the "idealized" systems described in relation to FIG. 1 in some aspects. For example, in some embodiments, the number of multi-path signals that can be captured at a first device 108 may be a subset of the total number of multi-paths generated by the environment. In some embodiments, a first device may detect, digitize (or sample) and process a portion of a transmitted signal that travels directly along a line-of-sight between a first device and a second device. In some embodiments, a first device may detect, digitize (or sample) and process one or more multi-path signals that arrive at the device within a certain time delay. Such a time delay may be referred to as a time delay window or a channel length. In some embodiments, the time delay window may be variable and may be controlled by hardware and/or software in a device. In some embodiments, a first device may detect, sample and process one or more multi-path signals with certain amplitudes. In some embodiments, the certain amplitude may be above a threshold, where the threshold may be fixed or may be variable and may be controlled by hardware and/or software in a device. In exemplary embodiments, different devices may collect different numbers of multipath signals and may have different settings for the time delay window or channel length, and/or amplitude threshold. In some embodiments, amplitude and phase information of the multipath channel may be collected and/or detected and/or analyzed. In some embodiments, the in-phase and quadrature (I and Q) components of a wireless signal may be used to probe a wireless channel and/or to exchange information and/or power between devices. In some embodiments, I and Q components of a wireless signal may be used for power waveforming.

In some embodiments, analog-to-digital converters (ADCs) and digital-to-analog converters (DACs) may be used in interfaces between analog and digital circuitry. In some embodiments, the ADCs and/or DACs may utilize up to two (2) bits of resolution, up to four (4) bits of resolution, up to six (6) bits of resolution, up to eight (8) bits of resolution, up to ten (10) bits of resolution, up to twelve (12) bits of resolution or more bits of resolution. In some embodiments, the ADCs and/or DACs may adaptively adjust the number of bits of resolution that are being used to digitize a signal. In exemplary embodiments, an ADC or DAC in a device may utilize 4 bits of resolution under normal operating conditions but may increase the number of bits of resolution to improve the temporal and/or spatial focusing effect of the waveforming system. In other exemplary embodiments, an ADC or DAC in a device may utilize 8 bits of resolution under normal operating conditions but may decrease the number of bits of resolution to reduce the power utilization of the device. The number of bits of resolution of either or both of ADCs and DACs may be an adjustable parameter in a wireless transmitter and/or receiver. The number of bits of resolution of either or both of ADCs and DACs may be adjusted by a feedback loop and/or under software control. The number of bits of resolution may be a user settable parameter and may be accessed and set using a user interface and/or application running on a device of a waveforming system.

In some embodiments, schemes referred to as continuous time binary variable (CTBV) sampling, strobed sampling, swept threshold sampling, and the like, may be used to digitize and/or sample received waveforms. In exemplary embodiments, CTBV and similar techniques may reduce the power consumption and increase the speed of the digitization and/or sampling processes in the waveforming systems.

In some embodiments, waveforming systems may benefit from ADCs and DACs with relatively high sampling rates. For example, a previously described TR system with a 125 MHz receiver bandwidth used ADCs and DACs with sampling rates higher than 250 MHz. In that demonstration system, ADCs and DACs with quoted sampling rates of 500 MHz were used. Broader band operation of waveforming systems may require ADCs and DACs with several GHz sampling rates and/or sampling techniques such as the CTBV, strobed sampling and swept threshold sampling techniques referred to previously.

In some embodiments, processing a received channel probe signal may include amplifying or attenuating any portion of the received signal. In some embodiments, a channel may be probed once or a channel may be probed more than once. In some embodiments, multiple channel probe signal responses may be measured, processed, recorded, stored in a database, and the like. In some embodiments, some channel probe signal responses may be averaged with others. In some embodiments, some channel probe signal responses may be discarded or not recorded. In some embodiments, some channel probe signal responses may be measured under different environmental conditions and stored. In exemplary embodiments, environmental conditions may include, but may not be limited to, temperature, location or placement of objects, location or placement of people, pose of objects, pose of people, location and/or pose of access points, terminal devices, position and/or pose of sensors, position and/or pose of signal reflectors, position and/or pose of signal scatterers, position and/or pose of signal attenuators, and the like.

In exemplary embodiments, devices may have single input antennas or receivers and/or single output antennas or transmitters. In some embodiments, devices may have multiple input antennas or receivers and/or multiple output antennas or transmitters. In the present teaching, it should be understood that first and second devices may include single or multiple input and/or output antennas and/or single or multiple receivers and/or transmitters. Different antennas, transmitters, and/or receivers may be designed to operate at similar carrier frequencies or in similar regions of the electromagnetic spectrum or they may be designed to operate at different carrier frequencies or in different regions of the electromagnetic spectrum. Antennas, transmitters and/or receivers may have different bandwidths and may comprise different hardware components, circuits, processors, software, firmware and the like.

In embodiments with multiple antennas, transmitters and/or receivers, the multiple antennas, transmitters and/or receivers may operate completely independently of each other or they may operate in conjunction with each other. In some embodiments, a subset of antennas, transmitters and/or receivers in a device may operate independently of others or in conjunction with others. The multiple antennas, transmitters and/or receivers may share certain hardware components and software code. The multiple antennas, transmitters and/or receivers may operate simultaneously, independently or in a synchronized manner. For example, some or all of the antennas, transmitter and/or receivers may utilize frequency hopping techniques and/or channel hopping techniques and the frequency/channel hopping may be coordinated amongst the various antennas, transmitters and or receivers.

In the present teaching, depending on context, the use of the term device and/or terminal device may mean a device with single or multiple transmitters and/or with single or multiple receivers and/or with single or multiple antennas. The term receiver may mean a single receiver or multiple receivers and/or a single antenna or multiple antennas. The term transmitter may mean a single transmitter or multiple transmitters and/or a single antenna or multiple antennas. In some cases, a device may be any of a transmitter, a receiver and a transceiver (a combination of a transmitter and a receiver).

Figure 3A:
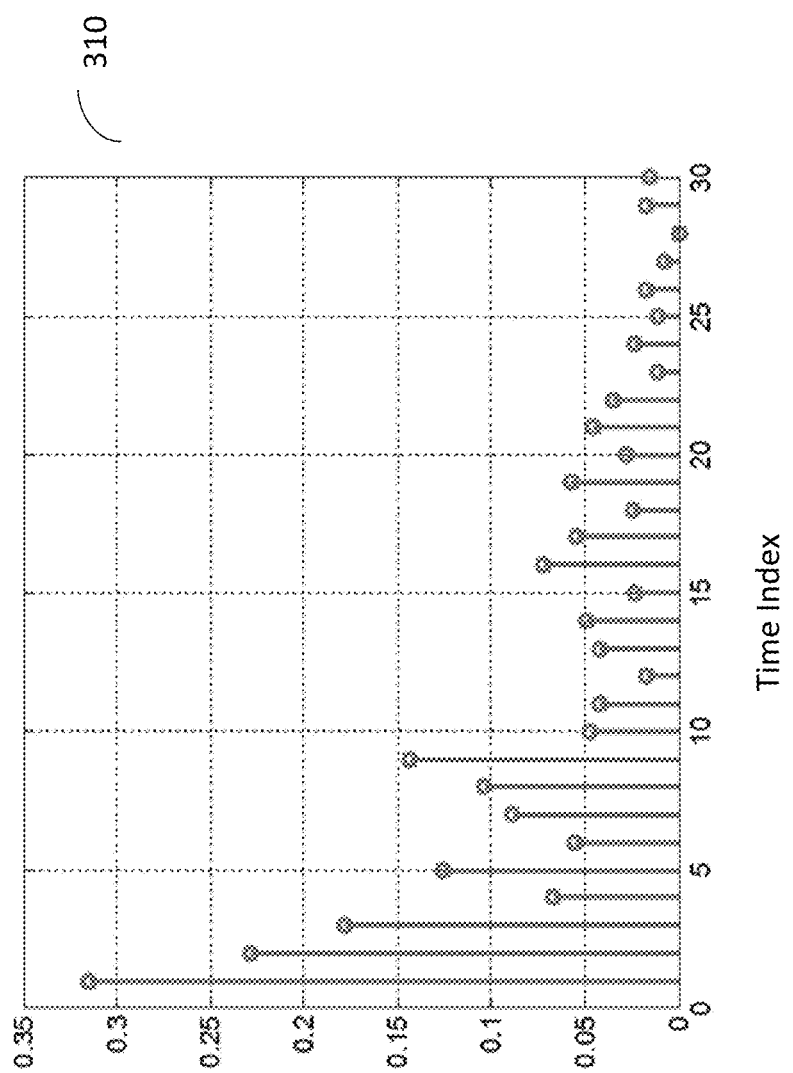
FIG. 3A is a graph of an exemplary channel impulse response waveform between an access point and a terminal device in an exemplary environment, according to an embodiment of the present teaching.
Figure 3B:
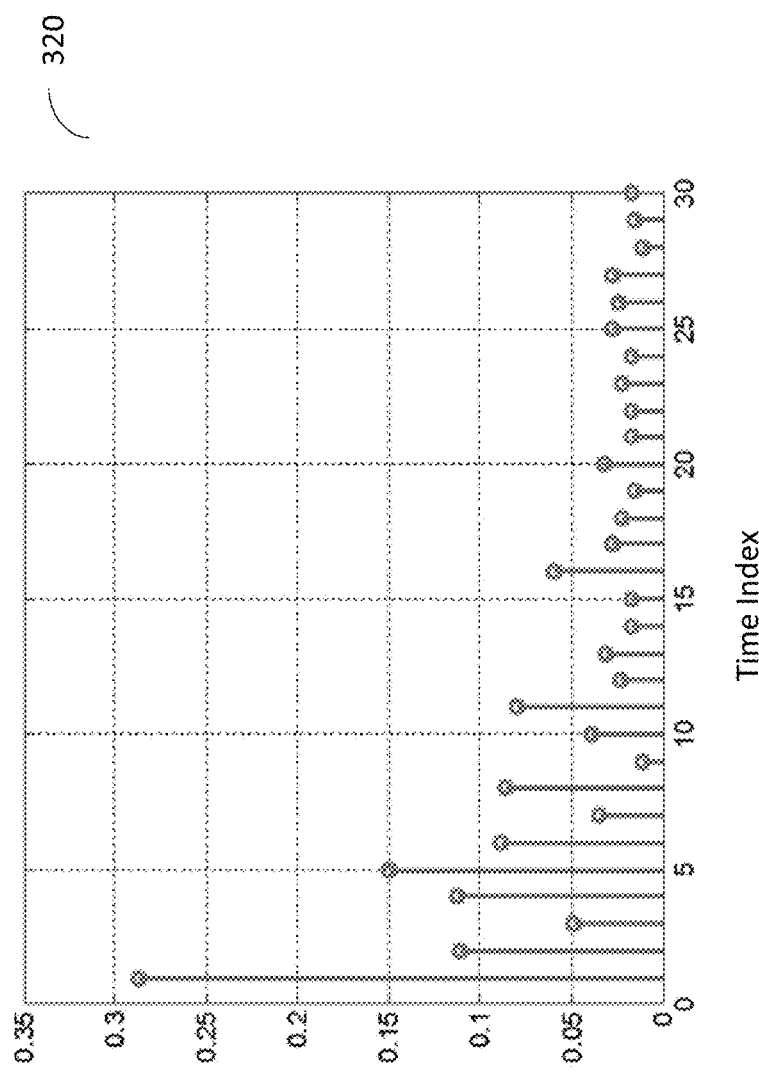
FIG. 3B is a graph of an exemplary channel impulse response waveform between the same terminal device and a different access point in the same exemplary environment as in FIG. 3A, according to an embodiment of the present teaching.

The waveforms 210 and 220 shown in FIGS. 2A and 2B are merely examples. Probe signal waveforms, channel impulse responses, and transmitted and received waveforms in waveforming systems can vary depending on, e.g., the probe signal, the environment, including the electronic transmitters and receivers, and the information or data being transmitted. For example, the waveforms 310 and 320 shown in FIGS. 3A and 3B are examples of sampled channel probe signal responses measured at two different access points (or probe signal receivers) from the same terminal device (sending the same probe signal). These two plots show exemplary differences in channel probe signal responses/CIRs. In addition, the use of a pulse signal as the channel probing signal is merely an example. The channel probe signals in waveforming systems can vary depending on, e.g., the environment, including the electronic transmitters and receivers, and the purpose of the signal being transmitted (e.g. data communications, power transfer, environmental probing, etc.). While pulse or impulse signals may be described, different probe signals, waveforms, signatures and the like are all envisioned in the present teaching.

In some embodiments, the channel probe signal may be a single pulse or a series of pulses with a regular, arbitrary or non-regular pattern. The probe signal may be a waveform, including a pulse waveform. The probe signal may be a pseudo-noise (PN) signal or waveform. Waveforms may be substantially square waveforms, raised cosine waveforms, Gaussian waveforms, Lorentzian waveforms, or waveforms with shapes that have been designed to probe the channel in some optimal or desired way. For example, probe waveforms may be frequency chirped or may have a frequency spectrum that is tailored to probe the channel in some optimal or desired way. Probe waveforms may be narrowband signals or substantially single-frequency signals and may be referred to as "tones". In some embodiments, the center frequency of the frequency tone may be tunable.

Probe waveforms may be amplitude modulated, phase modulated, frequency modulated, pulse position modulated, polarization modulated, or modulated in any combination of amplitude, phase, frequency, polarization, and pulse position. The probe signals may have a temporal width that is substantially equal to the bit duration of a data stream if a data stream were intended to be exchanged over the associated communication channel. The probe waveform may have a temporal width that is substantially half, substantially one quarter, substantially one tenth, substantially one hundredth, or less than the bit duration of a data stream intended to be exchanged over the associated communication channel. The probe signals/waveforms may be a data pattern and may be a repeating data pattern. The probe signals may include packet and/or framing information, synchronization and/or clock recovery information, stream capture information, device ID and network and link layer operating information. The probe signals may have a frequency spectrum that has been tailored for the operating environment and/or the electronic components in the transmitters and/or receivers of the systems. The probe signals may be an estimate of the channel impulse response or may be an altered version of the estimate of the channel impulse response. The probe signal may be designed to compensate for or to accentuate signal distortions imposed by certain electronic components in the transmitters and/or receivers and/or imposed by certain environmental factors.

When the second device 110 intends to transmit a data stream to the first device 108, the second device 110 may use a normalized time-reversed conjugate version of the received probe signal as a basic TR waveform. The second device 110 may encode the basic TR waveform with an up-sampled data signal and transmit the encoded signal through the wireless channel. The baud rate may be lower than the sampling rate. As long as the channel has not changed significantly between the receiving of the probe signal and the sending of the data signal, the signal received at the receiver, in this case device 108, will be approximately the convolution of the transmitted signal and the channel probe signal response, plus noise. The first device 108 may perform a one-tap gain adjustment to the received signal and may down-sample it to recover the data stream transmitted by the second device 110.

In some examples, a transmitter may send signals to two or more receivers at the same time. The transmitted signal may travel through multiple exemplary propagation paths to each receiver. Because the receivers are positioned at different locations, the transmitted signals travel through at least some different propagation paths before reaching the receivers. Therefore, different multipath signals (different virtual antennas) may be associated with different receivers. By carefully constructing the waveform of the signal sent from the transmitter, it is possible to allow each receiver to preferentially receive the signal intended for that receiver with sufficiently high quality. That is, a single waveform launched by a transmitter may simultaneously deliver different (or the same) intended signals that may be at least partially focused in time and space at each of the receivers. In this manner, waveforming may be used to achieve at least some level of spatial multiplexing in wireless systems.

In some embodiments and applications, the first device 108 in FIG. 1 may also be referred to as a terminal device (TD) or a mobile device or a radio or a tag or a Bot. The second device 110 in FIG. 1 may be referred to as an access point (AP) or a base station or a mobile device or an anchor or an Origin. In all of the disclosed embodiments, it is envisioned that wireless networks and/or wireless power systems using the disclosed technology may comprise at least two wireless devices and such networks may comprise three or more wireless devices. For the sake of explanation and in certain some embodiments, devices may be identified as transmitters or receivers, but it should be understood that the devices could also be transceivers, radios, software radios, handsets, mobile devices, computers, routers, modems, tags, circuit boards, semiconductor chips, and the like. Devices may be fully bi-directional or they may be configured to have more functionality as transmitters or as receivers or to support different data rates, protocols, power levels and the like in the transmit and receive modes. Multiple access points or Origins may communicate back and forth with each other and multiple terminal devices or Bots may communicate back and forth with each other. In some embodiments, an access point or Origin may be a fixed module that allows wireless devices to be connected to a wired or another wireless network. Access points may support a wide variety of networking protocols and/or transmission protocols and may include or may be connected to additional computing engines and/or devices to achieve enhanced performance. Access points may be routers, modems, servers, switches, terminals, transmitters, repeaters, and the like and may be the signal source to support local area networks, cells, microcells, nanocells, picocells, femtocells, and the like. Access points may support multiple wireless transmission standards, formats and protocols including, but not limited to Wi-Fi, 802.11xx, Bluetooth, Bluetooth LE, Zigbee, Near Field Communications (NFC), infrared communications, orthogonal frequency division multiple access (OFDMA), code division multiple access (CDMA), long term evolution (LTE), 3G, 4G, 5G, TR communications, and the like.

Figure 4:
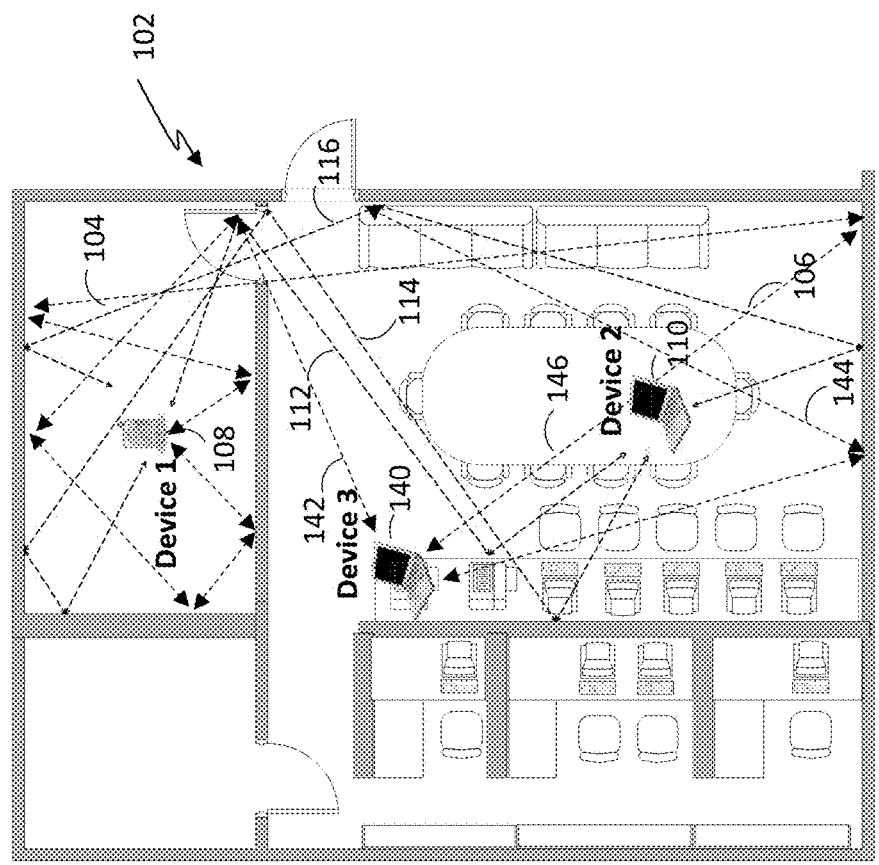
FIG. 4 is a diagram showing an exemplary environment for operating a time-reversal system having multiple devices, according to an embodiment of the present teaching.

Referring to FIG. 4, a waveforming system may include a first wireless device 108 that may exchange a signal with a second wireless device 110 and a third wireless device 140. The second device 110 may send a probe signal that travels through exemplary propagation paths 112, 114, and 116 to the first device 108. The first device 108 may detect, digitize (or sample), process, record, and the like, the received waveform representing the channel probe signal response for the first multipath channel. The third device 140 may send a probe signal that travels through exemplary propagation paths 142, 144, and 146 to the first device 108. The first device 108 may detect, digitize, process, record, and the like, the received waveform representing the channel probe signal response for the second multipath channel. In some embodiments, the probe signal used for the first multipath channel may be substantially the same as the probe signal used for the second multipath channel. In some embodiments, the probe signal used for the first multipath channel may be different than the probe signal used for the second multipath channel.

Throughout the present teaching, one may use the terms "channel impulse response" and "channel probe response" and "channel probe signal response" interchangeably. These responses may refer to a conventional channel impulse response such as determined by a delta-like pulse probing a channel. These responses may also refer to the conventional channel impulse response as determined by a pulse of some finite duration and may also refer to the waveform that results from probing the channel with any of the channel probing signals described above. One may use the term channel state information interchangeably with channel impulse response or with channel frequency response. The channel frequency response can be considered as the frequency domain representation of a channel impulse response. Channel state information can include channel impulse responses, which can include the amplitude, phase, and/or delay values of the multipaths, or channel frequency responses, which can include the amplitude and/or phase values of the multipaths at various frequencies.

Here, the term "channel frequency response" refers to the frequency domain representation of a "channel impulse response." The channel impulse response is commonly referred to as a channel response of a wireless channel, in which the channel impulse response can be obtained from a probing signal that is not necessary an impulse signal. The term "channel state information" refers to the time domain and frequency domain representation of the channel impulse response. For example, the channel state information can include the amplitude and/or phase values of the channel impulse response, and/or the delay values of the multipaths associated with the channel impulse response. For example, the channel state information can include the amplitude and/or phase values of the channel frequency response at various frequencies. For example, different types/brands of wireless network routers can provide channel state information using different formats.

The first device 108 may construct a wireless signal based on a first time-reversed multipath channel probe signal response, a second time-reversed multipath channel probe signal response, a first data or power stream intended for the second device 110, and a second data or power stream intended for the third device 140. The first device 108 may utilize a waveform for the transmit signal so that a first portion of the downlink signal travels through exemplary propagation paths 112, 114, and 116 to reach the second device 110. A second portion of the transmit signal may travel through exemplary propagation paths 142, 144, and 146 to reach the third device 140. The first signal portion received at the second device 110 may form the first data or power stream. The second signal portion received at the third device 140 may form the second data or power stream.

In the example of FIG. 4, the first device 108 transmits two data or power streams simultaneously to the second device 110 and the third device 140. Using the same principle, the second device 110 can receive channel probe response signals from the first device 108 and the third device 140, and then transmit two data or power streams simultaneously to the first device 108 and the third device 140 using waveforms that are determined from the channel impulse responses for each of those channels. The third device 140 can also receive channel probe signal response signals from the first device 108 and the second device 110, and then transmit two data or power streams simultaneously to the first device 108 and the second device 110 using waveforms that are determined according to the channel impulse responses for each of those channels. In general, when there are three or more devices, each device can transmit two or more data or power streams simultaneously to two or more other devices.

In another example, a first device 108 transmits a waveform that simultaneously delivers data and power to the second device 110 and the third device 140. Using the same principle, the second device 110 can receive channel probe signal response signals from the first device 108 and the third device 140, and then transmit a waveform that simultaneously delivers data and power to the first device 108 and the third device 140 using designed waveforms that are determined from the channel impulse responses for each of those channels. The third device 140 can also receive channel probe signal response signals from the first device 108 and the second device 110, and then transmit a waveform that simultaneously delivers data and power to the first device 108 and the second device 110 using designed waveforms that are determined according to the channel impulse responses for each of those channels. In general, when there are three or more devices, each device can transmit waveforms that simultaneously deliver data and power to two or more other devices.

For example, waveforms can be designed to simultaneously deliver data and power to other devices by superimposing the designed power waveform on the MaxSINR waveform for simultaneously data and power delivery. Another way to design waveforms that simultaneously deliver data and power to other devices is to design a new superimposed data and power waveform to maximize the received power at devices, while being subject to signal-to-interference-plus-noise ratio (SINR) constraints for other devices. For example, a transmit waveform can be designed to transmit a signal from a single antenna to (1) transmit data to a first device and transmit data and power to a second device, or (2) transmit power to a first device and transmit data and power to a second device. Such waveforms are designed to ensure a certain level of quality for the power delivery or information delivery. The scheme of simultaneous information and power transfer can be extended to scenarios with at least one of (1) a set of devices that are to receive data and/or power from one or more transmit antennas, and (2) a set of devices that are to receive power and/or data from the one or more transmit antennas.

In the example of FIG. 4, the device operating as a transmitter may use either an omnidirectional antenna or a directional antenna for broadcasting the wireless signals to other devices, as long as the transmitted signals reach each of the receivers through multiple propagation paths.

The following notations are used in the present teaching. The uppercase and lowercase letters (e.g., H and h) denote matrices and vectors, respectively. The notations $(\cdot)^T$, $(\cdot)^\dagger$, $(\cdot)^*$ and $(\cdot)^{-1}$ represent transpose, conjugate transpose, element-wise conjugate, and inverse operation, respectively. The matrix $I_N$ represents an N×N identity matrix. The notations $\mathbb{E}[\cdot]$ and $\mathrm{tr}(\cdot)$ represent expectation and trace, respectively.

System Model of Single-Antenna Power Waveforming

In the time domain, the channel impulse response of a communication link can be modeled as $$h[n] = \sum_{l=0}^{L-1} h_l \delta[n-l], \qquad (1)$$

where h[n] is the n-th tap of the CIR with length L, and δ[ ] is the Dirac delta function, $h_l$ is the channel gain of the $l^{th}$ path, which is a circularly symmetric complex Gaussian random variable with zero mean and variance, $\mathbb{E}[|h_l|^2] = \rho_l$, for l=0, ..., L−1. This means the power of the l-th tap is $\rho_l$. The time domain representation of the channel response and the frequency domain representation of the channel response are related by the Fourier Transform. In some embodiments where a channel response is determined between two separate antennas i and j, the channel response function notation may include either or both indices as a subscript. For example, if a single access point is receiving signals from multiple devices, i, the channel response may be indicated as $h_i$. If multiple access points, j, are receiving signals from multiple devices, i, the channel response may be indicated as $h_{ij}$. In some embodiments where a single antenna is both transmitting a probe signal and receiving a probe signal waveform, the indices i and j may represent time slots, frequencies, polarizations and the like. Without loss of generality, one can assume the total channel power is one, i.e. $\Sigma_{l=0}^{L-1} \rho_l = 1$. Furthermore, for the mathematical analysis, it is assumed that paths that contribute to the channel impulse response are substantially uncorrelated with each other:

$$\mathbb{E}[h_i h_j^*] = 0, i \neq j. \tag{2}$$

Additionally, the mathematical analysis assumes the in-phase and quadrature components of each path are uncorrelated with each other and contain identical power. The number of resolvable paths increases as the amount of scattering in the environment increases, as the sampling period of the system, $T_S$, decreases, and/or as the system bandwidth becomes larger.

In exemplary virtual antenna waveforming systems, a focusing effect can be created at the intended receiver by exploiting the multipath propagation to recollect the signal energy from the environment. To achieve this, a receiver may first send a channel probe signal that may be used to measure, estimate, and/or determine the CIR at the transmitter side during a channel probing phase. As described above for a time-reversal embodiment, a transmitter may then form a waveform, g[n], to send wireless signals that may be focused, by the environment, at the receiver. One can use v[n] to represent the sampled transmitted data or signals for the TR embodiment. In a power transfer system, one can use v[n] to represent the sampled power signal, which is a discrete time signal. In either case, the signal transmitted by a transmitter, s[n], in a waveforming system may be given as:

$$s[n] = (v*g)[n] \tag{3}$$

where v*g refers to the convolution between v and g. The waveform g[n] has the length L and the signal v[n] has the length T, if the target wireless power transfer time duration is T. Thus, the signal s[n] has the length T+L−1. When the channel state information (channel impulse response or channel frequency response) changes, the channel probing process may be performed again, and the waveform g[n] and the signal s[n] are recalculated.

In an exemplary "basic" time-reversal embodiment, a "basic" time-reversal waveform, $g_{TR}[n]$, for the channel impulse response of (1) can be given by:

$$g_{TR}[n] = \frac{h^*[L-1-n]}{\sqrt{\sum_{l=0}^{L-1} |h[n]|^2}}, n = 0, \ldots, L-1. \tag{4}$$

The time-reversal waveform $g_{TR}[n]$ is the time-reversed and complex-conjugated version of the channel impulse response h[n], and the denominator in (4) is a normalization factor such that the waveform power is equal to one. With the waveform $g_{TR}[n]$, the channel serves as a matched-filter, allowing for the signal to be focused at a particular time instant with a peak value $\Sigma_{l=0}^{L-1} |h[l]|^2$. Following the example from above in FIG. 1 and considering the waveforms shown in FIGS. 2A and 2B, when a first device 108 sends a probe pulse signal, the signal received by a second device 110 may be processed to yield the channel impulse response (CIR), h[n], given in (1). If the second device 110 generates a time reversal waveform for that channel, that waveform may be represented by, $g_{TR}[n]$, given in (4). If the second device 110 transmits a signal, s[n], that is a data signal or waveform, v[n], modulated onto the time-reversal waveform, $g_{TR}[n]$, back to the first device 108, then the wireless channel will naturally perform the operation of a matched filter and the transmitted signal energy will be spatially and temporally focused at the first device 108 for detection.

While a basic time-reversal waveform as described above can be used to focus signal energy at an intended receiver or location to improve wireless communication performance in multi-path environments, more sophisticated waveforms may be designed to further improve the signal-to-interference plus noise ratio (SINR) in higher speed and/or multi-user communication scenarios. Examples of these waveforms and how to generate them are described in co-owned applications, including U.S. patent application Ser. No. 13/706,342, filed on Dec. 5, 2012 and U.S. patent application Ser. No. 14/615,984, filed on Feb. 6, 2015, which are incorporated herein by reference in their entireties. Such waveforms designed to improve the SINR in a communication system may be referred to in the present teaching as $g_{SINR}[n]$. Traditional or non-TR wireless communication systems, referred to in the present teaching as direct transmission (DT) systems, may be modeled as using a channel waveform that is a delta function, i.e., $g_{DT}[n] = \delta[n]$. The waveforms $g_{TR}[n]$, $g_{SINR}[n]$, and $g_{DT}[n]$, have been designed and/or studied for use in communications or information transfer systems and for reducing the inter-symbol interference (ISI) and inter-user interference (IUI) using the virtual antenna effect of the multipath channels. While these waveforms can be used for transferring power in power waveforming systems, they are not necessarily the best waveforms for supporting efficient wireless power transfer. Rather, new waveforms can be designed and utilized to improve the wireless power transfer efficiency in multipath environments.

Power Waveform Design with Single Transmit Antenna

Referring to the above example, the signal received at device 108, y[n], may be modeled as the convolution among the signal s[n] and the wireless channel h[n]:

$$y[n] = (s*h)[n] + z[n] = (v*g*h)[n] + z[n] = \Sigma_{l=n-2L+2}^{n} \Sigma_{m=0}^{L-1} g[m]h[n-l-m]v[l] + z[n] \tag{5}$$

where $g = [g[0], \ldots, g[L-1]]^T$ is the waveform vector, z[n] represents the noise signal at time n. Define a (2L−1)×L Toeplitz channel matrix H with the column vector $[h[0], \ldots, h[L-1], 0, \ldots, 0]^T$ as its first column. Then, the received signal in (5) can be rewritten into a matrix-vector form (p≥0):

$$y[L-1+p] = \Sigma_{q=-(L-1)}^{L-1} f_q^+ gv[p+q] + z[L-1+p] \tag{6}$$

where $f_q$ is the (L−1−q)$^{th}$ column of the matrix $H^+$, and the superscript $(\cdot)^+$ represents the transpose and conjugate operation. Note that $f_q^+ gv[p+q]$ can be treated as the equivalent filtering function of the channel at time instant p+q. For power transfer, one may design a waveform, $g_{Power}$, that improves, increases, and/or maximizes the power delivered over the multi-path channel.

One can assume that the number of channel taps is finite, and the time duration of the transmitted signals is sufficiently large so that the received signal power $\mathbb{E}[|y[L-1+p]|^2]=\mathbb{E}[|y[L-1+p']|^2]$ for any $p \geq 0$ and $p' \geq 0$, where $\mathbb{E}[\cdot]$ takes expectation over the random uncorrelated signal $v[n]$ (with the expected power equal to 1). For example, $v[n]$ can be complex random binary signals, i.e., $v[n] \in \{\pm(1/\sqrt{2}) \pm j(1/\sqrt{2})\}$. Hence, the term $\mathbb{E}[|y[L-1+p]|^2]$ is irrelevant to the random signal $v[n]$, and the average power transfer maximization problem is equivalent to maximizing the power of the signal $y[L-1]$:

$$g_{Power} = \arg\max_{\|g\|_2^2=1} \mathbb{E}[|y[L-1]|^2], \quad (7)$$

where $|\cdot|^2$ is a square operator, $\|\cdot\|_2$ is an Euclidean norm operator, i.e., $\|g\|_2^2 = \Sigma_{n=0}^{L-1}|g[n]|^2$ means the total power of the waveform g. That is, the total power of the designed waveform $g_{Power}$ may be normalized to one. By substituting (6) into (7), the maximization problem is equivalent to $$g_{Power} = \arg\max_{\|g\|_2^2=1} g^+ H^+ H g, \quad (8)$$

where the noise power is assumed to be a constant and irrelevant to the waveform design. For a given channel H, which can be estimated in the channel probing phase, the optimal power waveform can be computed by $$g_{Power} = u_1 \quad (9)$$

where $u_1$ is the principal eigenvector of the matrix $H^+H$. One can compute a power waveform that optimizes the power transferred from a transmitter to a receiver using $g_{Power}=u_1$, and the transmitted power signal is within a certain frequency band for which the corresponding wireless channel, $h[n]$, is estimated. The waveforms that are described above and determined using (7)-(9) will be referred to as "max-Power waveforms."

Example Power Waveforms with Single Transmit Antenna

Figure 5:
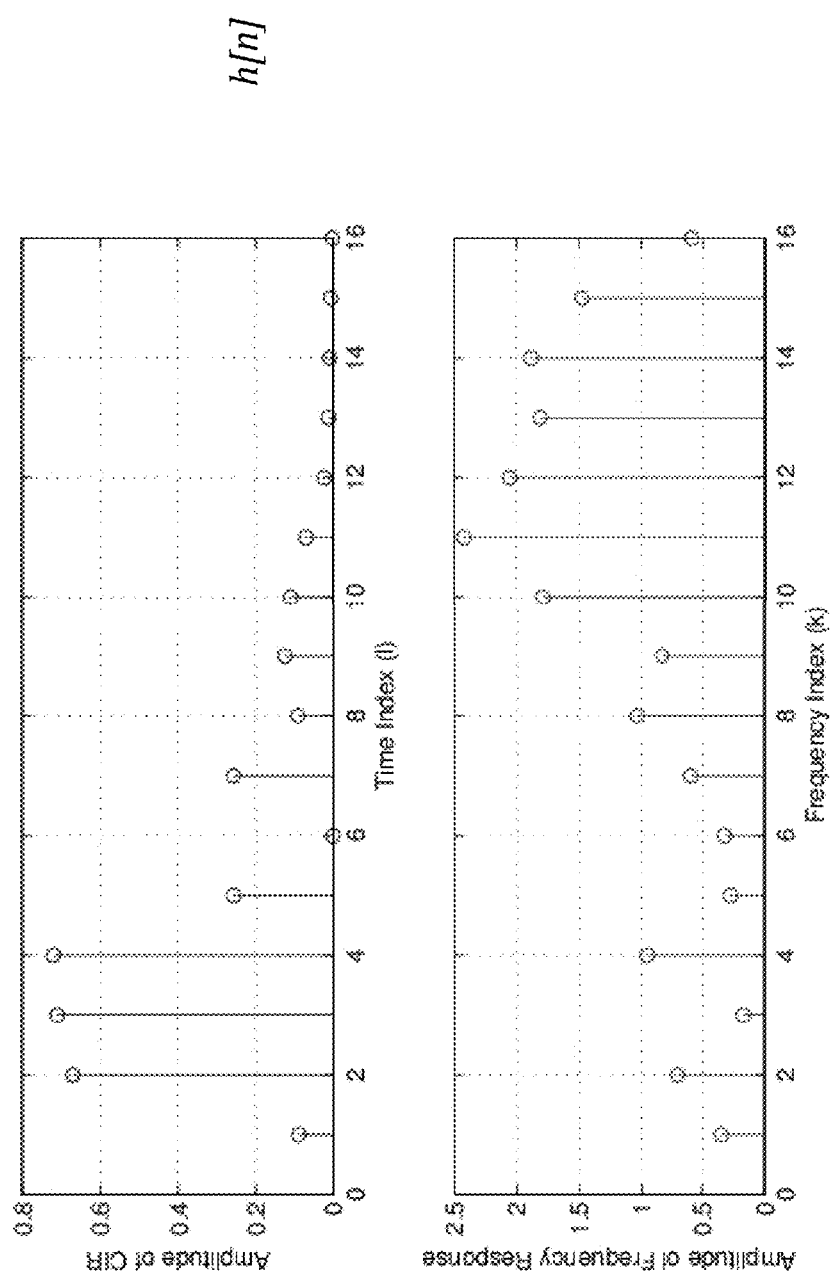
FIG. 5 shows exemplary channel state information for an exemplary wireless channel, according to an embodiment of the present teaching. The top plot shows the channel impulse response in the time domain; and the bottom plot shows the channel frequency response in the frequency domain.

An example of a designed power waveform (e.g., $g_{Power}$ described above) for an ultra-wideband (UWB) channel under non-light-of-sight (NLOS) environments is shown in FIG. 5. The top plot in FIG. 5 shows the amplitude of an exemplary channel impulse response (CIR), $h[n]$, for a UWB channel; and the bottom plot shows the corresponding channel frequency response, which is the discrete Fourier Transform (DFT) of the time-domain waveform.

Figure 6:
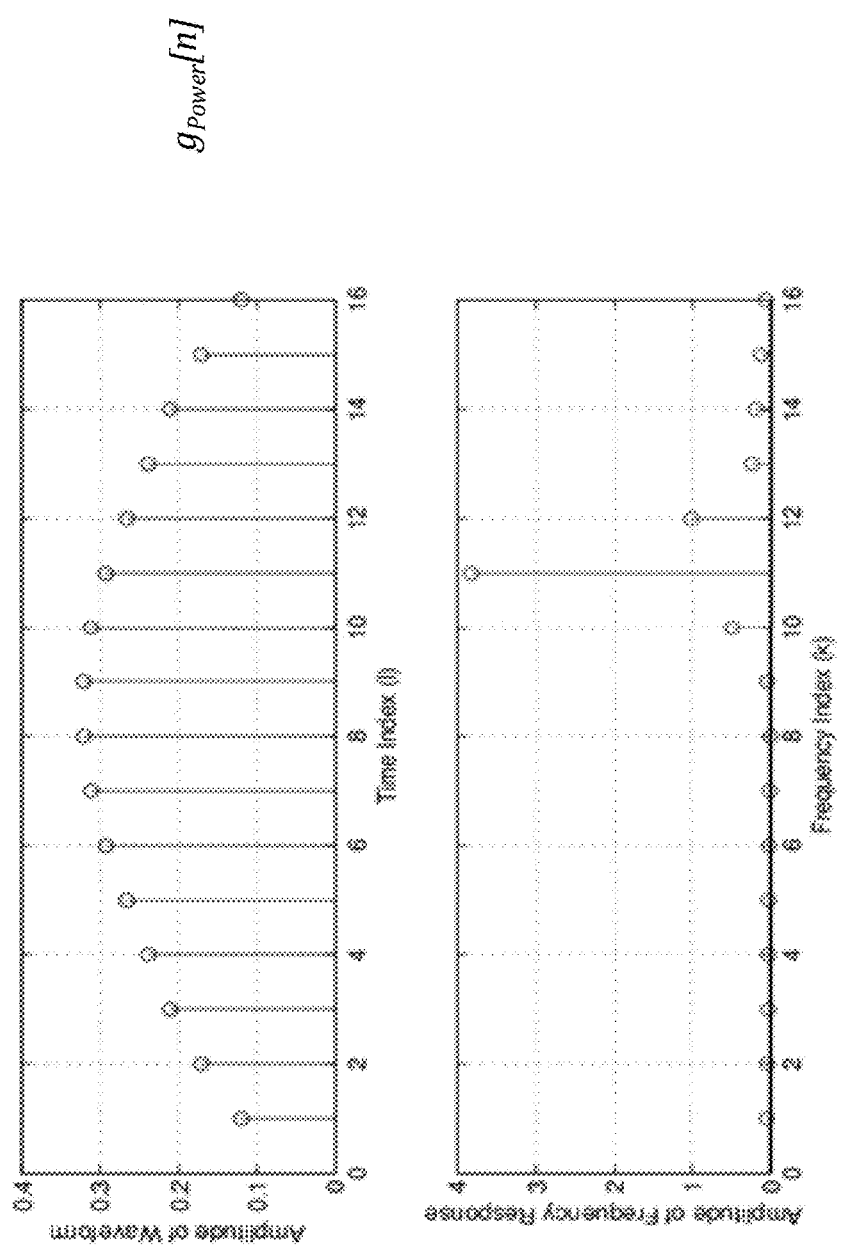
FIG. 6 shows an exemplary waveform designed for wireless power transfer, according to an embodiment of the present teaching. The top plot shows a time domain representation of the waveform; and the bottom plot shows a frequency domain representation of the response.

FIG. 6 shows an exemplary power waveform, $g_{Power}$, calculated according to the methods outlined above for the same UWB channel modeled in FIG. 5 (and FIGS. 2A and 2B). Here, $g_{power}$ is the designed waveform at the transmitter, and the signal transmitted by a transmitter is generated by using (3). The top plot in FIG. 6 shows the amplitude of the exemplary power waveform and the bottom plot shows the associated frequency response of that exemplary power waveform. The bottom plot in FIG. 6 reveals that the exemplary power waveform tends to concentrate its waveform energy on a few frequency components, in this example frequency components k=10, 11, and 12. Here, k represents the DFT frequency index. In exemplary embodiments, a single frequency tone, or a narrowband signal, may be used as a power waveform that is transmitted by the transmitter. For example, the single frequency tone may have a sinusoidal (or approximately sinusoidal) waveform. For example, a narrowband frequency signal with a center frequency corresponding to k=11, may be used as a power transfer waveform. In the present teaching, one may refer to that type of power waveform as $g_{Tone}$.

Exemplary power waveform (e.g., as shown in the top plot of FIG. 6) tends to spread out the energy of the transmitted signals over a larger time duration than a traditional basic TR waveform.

The wireless signals used for power transfer may have, e.g., center frequencies in the range from tens of kilohertz to tens of gigahertz. For systems operating in the spectrum associated with traditional Wi-Fi systems, the wireless power transfer signals may have center frequencies between 2 GHz and 3 GHz or between 5 GHz and 6 GHz. By way of example but not limitation, k=10 may correspond to a frequency of 2.4 GHz. By way of example but not limitation, k=12 may correspond to a frequency of 2.401 GHz. In some embodiments, the center frequencies and spacings of the frequency components in the wireless power transmission system may be determined by a number of system specific factors such as the multipath environment, the hardware of software processing capabilities of the system, the available spectrum, the bandwidth of the system, co-existing radio systems and the like.

Demonstration of Single-Antenna Power Waveforming

Figure 7:
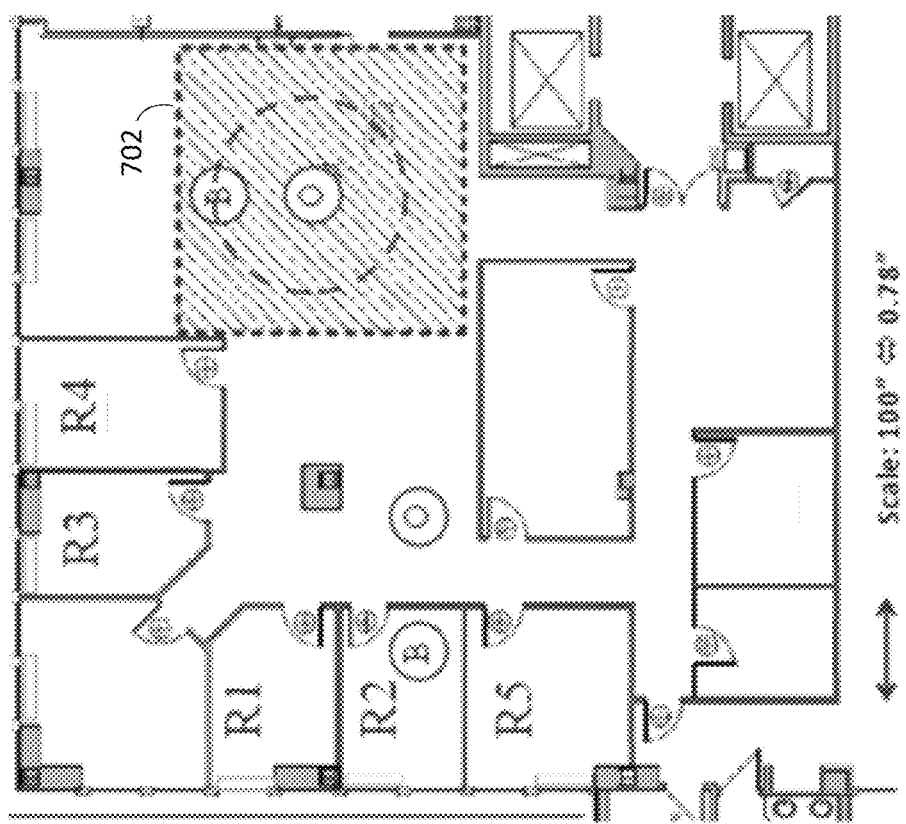
FIG. 7 shows an exemplary floorplan of an office space, according to an embodiment of the present teaching. The highlighted square region indicates an area in which some line-of-sight (LOS) power transfer measurements have been made. The exemplary positions of Origins (O) and Bots (B) in the space for non-line-of-sight (NLOS) measurements are indicated by the circled letters "O" and "B".

Improved radiative wireless power transfer using power waveforming in multipath environments has been confirmed experimentally. The present teaching discloses system performance results achieved using transmitters that transmit exemplary power waveforms and compare that performance to transmitters transmitting waveforms designed for communication purposes such as direct transmission (DT) waveforms, basic TR waveforms, and MaxSINR waveforms. In the following experiments, exemplary wireless transmitter and receiver are operated with a center frequency of approximately 5.4 GHz, and a maximum signal bandwidth of approximately 125 MHz. The measurements are performed in an office environment, the floorplan of which is shown in FIG. 7. In these experiments, a transmitter (sometimes referred to as an "Origin" and denoted by the letter "O") will be the power transmitter that transmits power to a receiver (sometimes referred to as a "Bot" and denoted by the letter "B"). The power signals transmitted by the Origin comprise waveforms which propagate through the environment and may be scattered, reflected, attenuated, and the like, by objects in the office space such as walls, doors, poles, windows, desks, furniture, and the like. The experiments include measuring the power transfer level for different waveforms transmitted by the Origin and received by the Bot at various positions throughout the office space.

Figure 8A:
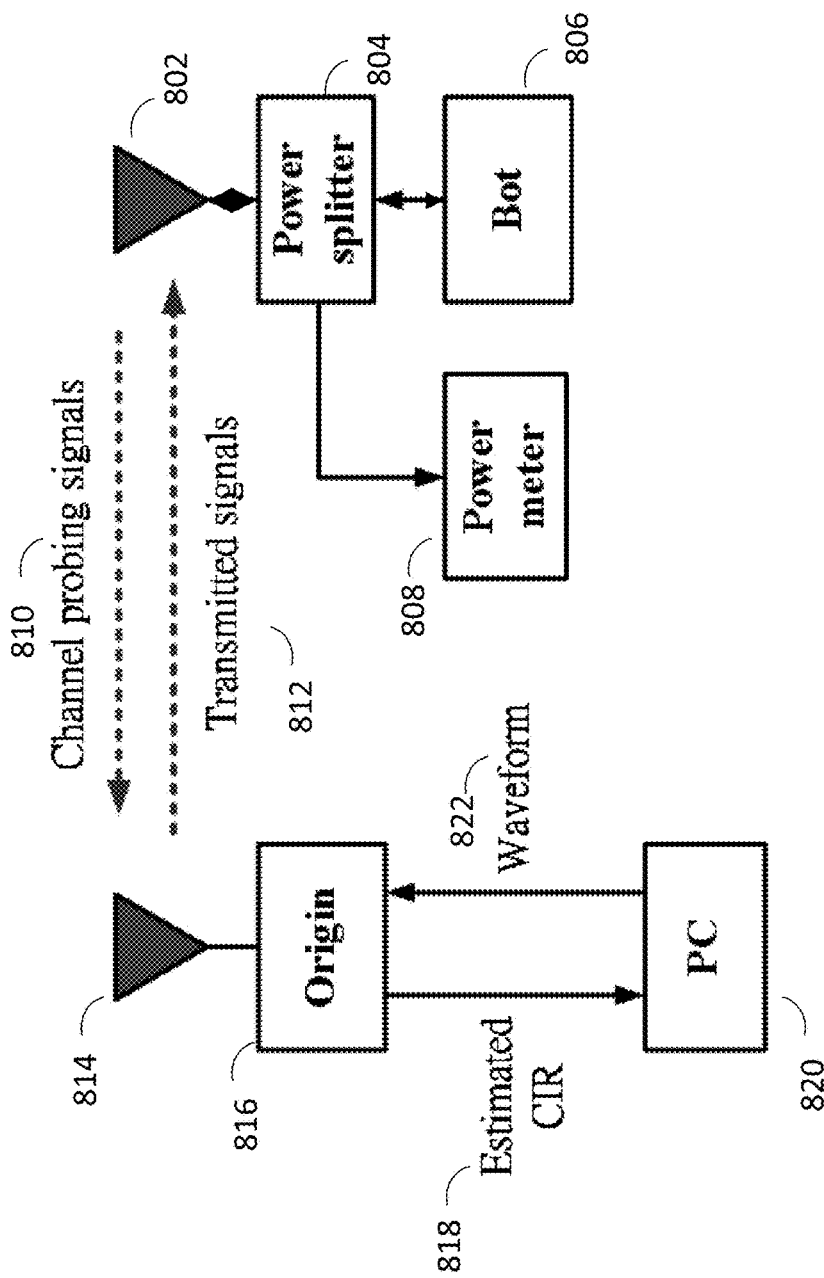
FIG. 8A shows a block diagram of an experimental power measurement set-up, according to an embodiment of the present teaching.
Figure 8B:
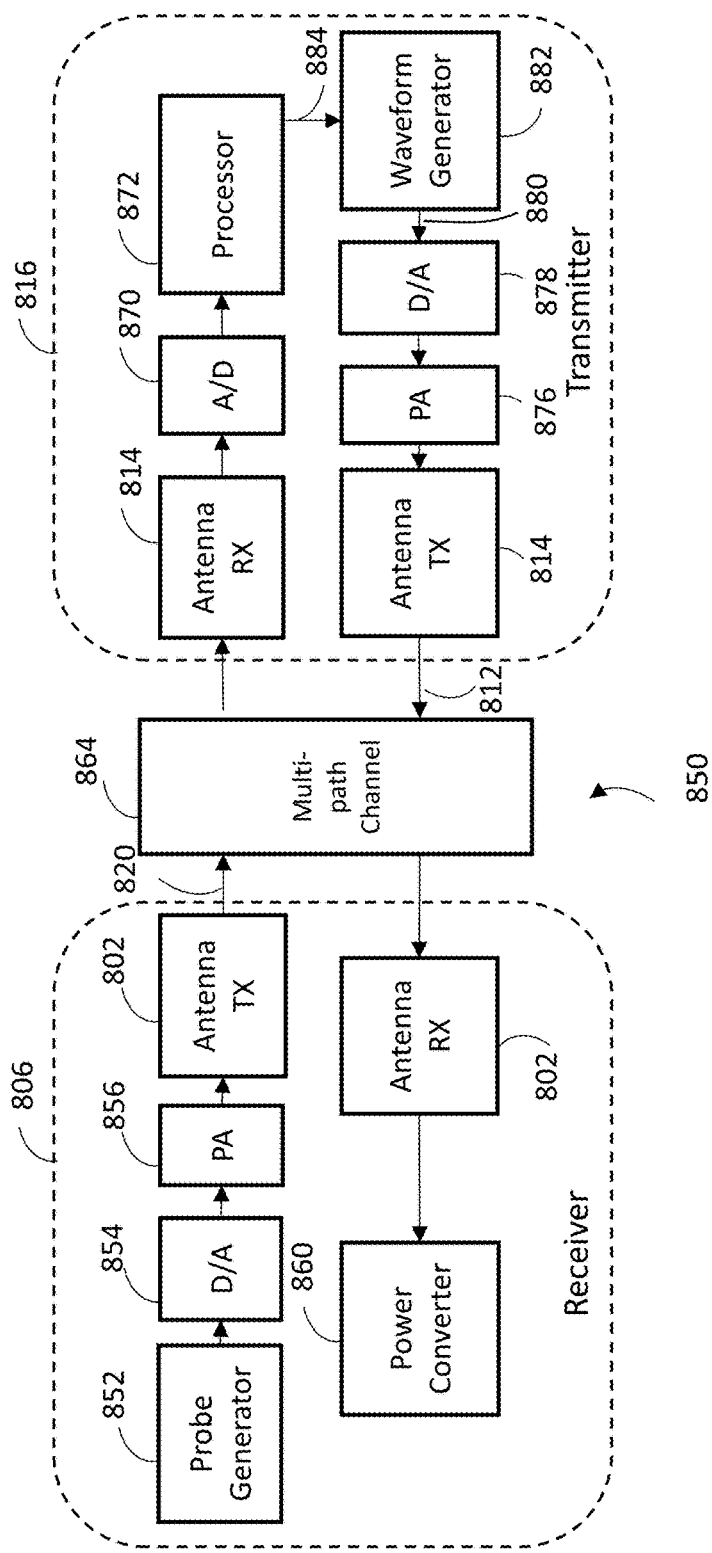
FIG. 8B shows a block diagram of an exemplary power transmitter (Origin) and power receiver 806 that may be used in the disclosed wireless power transfer system, according to an embodiment of the present teaching.

FIG. 8A shows a block diagram of the experimental set-up and FIG. 8B shows a block diagram of an exemplary power transmitter (Origin) 816 and power receiver (Bot) 806 that may be used in the disclosed wireless power transfer system. In this example, the devices labeled Origin or Bot or transmitter or receiver are all transceivers and can both transmit and receive wireless signals. In exemplary embodiments, an Origin or a transmitter is so-called because it may be the source of the power that is being transmitted wirelessly to the so-called receiver or Bot. In general, it should be understood that the devices exchanging power are wireless transceivers and may be configured as power transmitters and/or power receivers. It should also be understood that power can be exchanged between more than two devices. In some embodiments, one or more power sources may wirelessly transmit power to one or more power receivers. In some embodiments, power may be simultaneously transmitted from one or more power sources to one or more power receivers using power waveforms that utilize CIR information for more than one channel.

Figure 9:
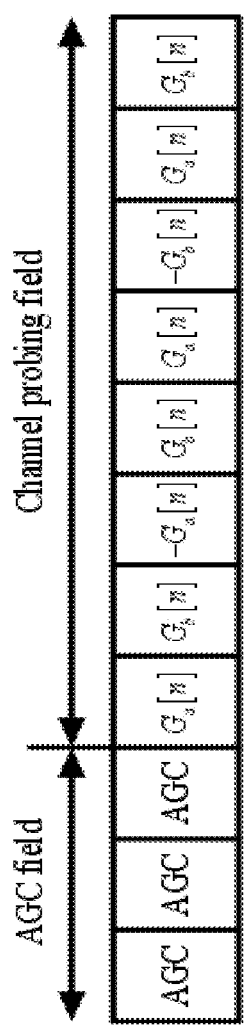
FIG. 9 shows an exemplary structure for a channel probing signal, according to an embodiment of the present teaching.

A power waveforming system may operate in two phases, a channel probing phase and a power transmission phase. During the channel probing phase, the receiver or Bot 806 may send channel probing signals 810 to the transmitter or Origin 816. Exemplary channel probing signals may be structured as illustrated in FIG. 9. Such exemplary channel probing signals may be advantageous for accurate automatic gain control (AGC) and channel estimation by the receiver of the channel probe signals. In this example, the channel probing field includes a pair of Golay sequences, $G_a[n]$, and $G_b[n]$, with length, n, equal to 256, where the sum of the autocorrelation functions of the two sequences is a delta function. This property may be useful for acquiring CIR information in the presence of inter-symbol interference (ISI). In some embodiments, in a radiative wireless power system, a Golay channel correlator may be used to receive channel probing signals used to estimate the CIR and the operating SNR of the wireless channel.

In exemplary embodiments, the Origin 816 may receive the channel probing signals 810 and may determine an estimated channel impulse response or CIR 818 for the wireless channel between the Origin 816 and the Bot 806. In the embodiment illustrated in FIG. 8A, the Origin 816 may send the estimated CIR 818 to a computer 820. The computer 820 may use information from the estimated CIR 818 to generate a power transfer waveform 822. The power transfer waveform 822 may be sent to the Origin 816. The Origin 816 may transmit the power transfer waveform 822 as a transmitted signal 812. The transmitter signal 812 may be received by a receiver or Bot antenna 802 and may be split by a power splitter 804 so that a portion of the received signal is sent to the Bot 806 and a portion of the received signal is sent to the power meter 808.

Referring again to FIG. 8A, during the power transmission phase, the transmitter or Origin 816 launches or transmits or radiates a wireless signal 812 also referred to as a power waveform and the receiver or Bot 806 receives the wireless signal. In this experimental demonstration, the waveforms transmitted by Origin 816 are calculated in a computer, but in general waveforms can be calculated in any or all of a digital processor that may include a computer 820, a tablet, a signal processor, a digital signal processor, an ARM processor, a microprocessor, a field-programmable gate array (FPGA), and an application-specific integrated circuit (ASIC) and the like. The digital waveform is converted to an analog waveform in a digital-to-analog converter (DAC), amplified, and transmitted by an antenna 814 at the transmitter/Origin 816. There are many other functions that a wireless transmitter may perform on a digital signal such as processing, storing, correlating, truncating, equalizing, and the like, and on an analog signal such as filtering, shaping, switching, amplifying, band limiting, frequency hopping, and the like, that would be known to one of ordinary skill in the art of radio systems that will not be discussed in detail here. It can be understood that any known radio transmission and reception techniques may be applied to this wireless power transfer system without departing from the scope of the present teaching.

In exemplary embodiments, the transmit and/or receive antennas 814, 802 are omni-directional or substantially omni-directional antennas. In some embodiments, any or all of the transmit and receive antennas in a power transfer system may have some directionality. In some embodiments, any or all of the transmit and receive antennas in a power transfer system may be directional antennas. In some embodiments, the efficiency of the wireless energy transfer may be improved when there are more multipaths in the environment, when a signal has broader bandwidth, and/or when the analog-to-digital conversion can be performed at higher speeds. Therefore, antennas, circuits, and environments that support power transfer efficiency improvements may be advantageous.

FIG. 8B shows a block diagram of components in an exemplary wireless power transfer system 850, according to an embodiment of the present teaching. A wireless power Bot 806 or receiver/transceiver may include a probe signal generator 852 that sends a digital channel probe signal to a DAC 854 during a channel probing phase. The analog probe signal may be amplified in an amplifier 856 and radiated by an antenna 802. The transmitted channel probe signal 820 may propagate through a multipath channel 864 and be received by an Origin or transmitter/transceiver 816. The Origin or power transmitter 816 may comprise an antenna 814, an ADC 870 and a processor 872. The processor 872 may process the received channel probing signal to estimate a channel impulse response. The channel impulse response information 884 may be sent to a power transmission waveform generator 882. The power transmission waveform generator may generate a power transmission waveform g[n], 880. The power transmission waveform 880 may be sent to a DAC 878 during a power transmission phase. The analog signal may then be amplified in an amplifier 876 and radiated by an antenna 814. The power transmission waveform 812 may propagate through a multipath channel 864 and be received by a Bot or receiver 806. The Bot or power receiver 806 may comprise an antenna 802, and a power converter 860 or power receiver 860.

While FIG. 8B shows separate transmit and receive antennas and separate transmit and receive signal chains and components, one of ordinary skill in the art will recognize that some portion or all of the components in the signals chains may be shared by both transmit and receive signal paths. Some portion or all of the components depicted in FIG. 8A may be bidirectional components. In exemplary embodiments, a transceiver may comprise a single antenna, ADC/DACs, processor and the like or a transceiver may comprise multiple antennas, ADC/DACs, processors and the like. In some embodiments probe signal generation, processing and waveform generation may take place in a single processor or such functionality may be distributed across multiple processors. In some embodiments, the signal chains in transceivers appropriate for wireless power transfer may also comprise filters, switches, impedance matching networks, current sensors, power sensors, phase locked loops, synchronization circuits and other components found in known wireless communication systems and radios.

Below are experimental results for radiative wireless power transfer between a transmitter 816 and a receiver 806 that are arranged to have both an unblocked line-of-sight (LOS) between the transmitter and receiver antennas 814, 802, and that have at least one object blocking the sight-path between the transmit and receive antennas 814, 802 (non line-of-sight or NLOS).

The layout of the experiment in the LOS testing environment is illustrated in FIG. 7. First, the Origin ("O") and the Bot ("B") are randomly deployed in the area indicated by a rectangular shadowed area 702 in an LOS manner, i.e., there are no intervening objects between the Origin and the Bot.

Figure 10:
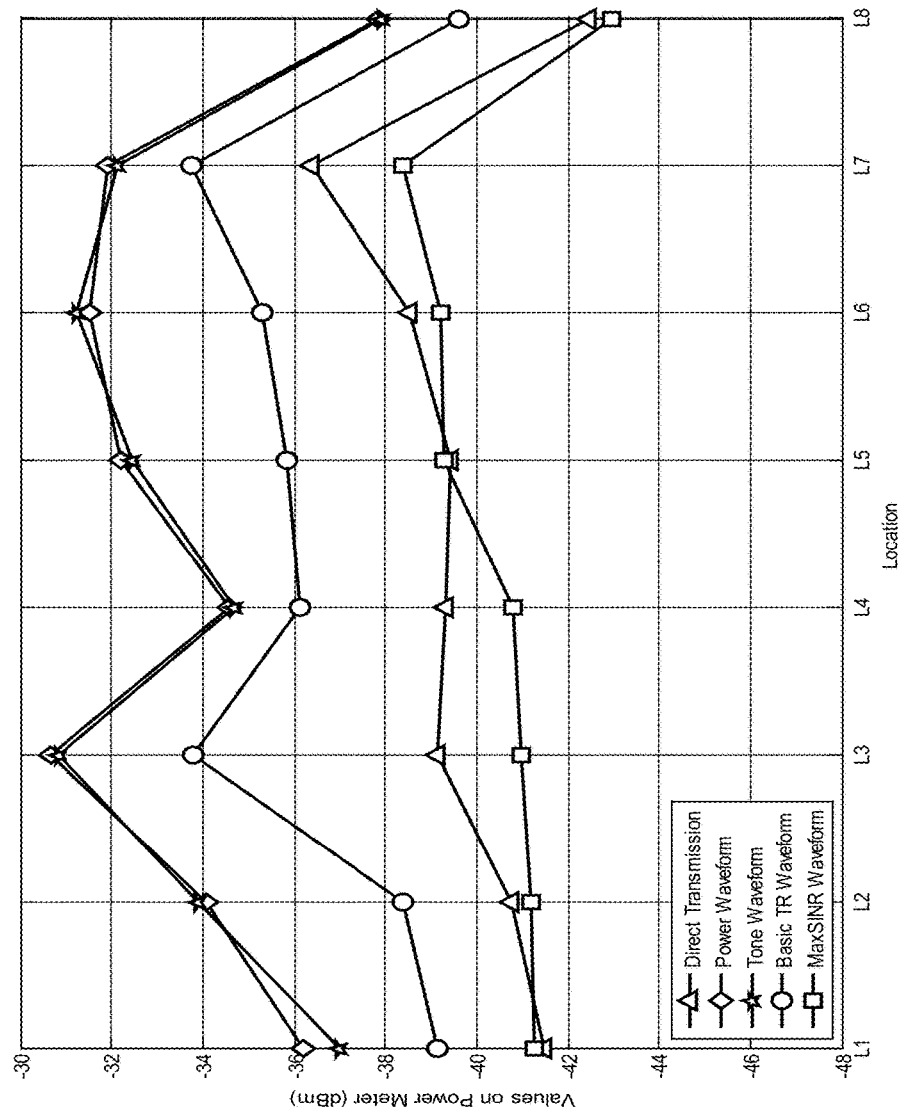
FIG. 10 shows exemplary measured power transfer levels between an Origin and Bot at 8 relative locations, each separated by approximately 2 meters, according to an embodiment of the present teaching.

The distance between the Origin and Bot can be varied from one meter to six meters in increments of one meter. At each location, the transferred power level is measured using five (5) different power transfer waveforms. FIG. 10 shows exemplary levels of measured power at a Bot placed two meters away from an Origin within the area 702 of an office space. The power transfer performance is measured at eight random locations (L1-L8) located along the perimeter of the gray dashed circle. One of the power waveforms used in the measurement is a direct transmission waveform (DT), $g_{DT}$ [n], which is a delta function. Using this power waveform, the radiated wireless signal mimics a standard wireless data stream. This radiated signal may be a traditional wireless communication signal, such as has been used in previous demonstrations of radiative wireless power transfer and harvesting applications. One can use this waveform as a "baseline" to represent the power transfer capabilities of "known" radiative wireless power transfer schemes. One can compare the results of the disclosed wireless power transfer waveforms to this baseline to show the performance improvement.

In the experiment disclosed here, a processor at the Origin first computes the various waveforms according to the estimated CIR and then the Origin transmits the signals shaped by the designed waveforms via an omni-directional antenna. The maximum transmit power of the Origin is 20 dBm. At the Bot, a commerically available power meter, which is linked to the antenna via a power splitter is used to measure the received power at the radio frequency (RF)-front end. The sensitivity range of the power meter is from −55 dBm up to 0 dBm. During the experiment, all the Wi-Fi access points in the office are turned off to insure that the power captured by the power meter is coming only from the Origin.

In a completely open environment, one would expect similar power levels to be transmitted to a power receiver placed 2 meters away from the Origin in any direction, However, as shown by the triangles in FIG. 10, in an indoor office environment, the power transferred using direct transmission can vary even when the distance between the Origin and the Bot is constant at 2 meters, but the direction is varied. At least some of this variation can be attributed to the multipath environment.

The other four (4) waveforms used for power transmission are a specially designed power waveform based on the measure CIR of the channel, $g_{power}$[n], a substantially single frequency or tone waveform with a center frequency corresponding to the largest frequency component of the measured CIR, $g_{Tone}$[n], a basic TR waveform, $g_{TR}$[n], and a communications waveform designed to maximize SINR, $g_{SINR}$[n].

FIG. 10 shows the measured power levels at each of 8 Bot locations separated from the Origin by 2 meters using one of 5 power waveforms. For fair comparison, the average transmit power of different waveforms is normalized in such a way that the average transmit power is the same as that for the direct transmission. The basic TR waveform, tone waveform and maxPower waveform all deliver more power to the Bot than the traditional direct transmission wireless waveform and the maxSINR waveform. These data show that waveforms designed for optimizing multipath communication systems may not be optimal for power transmission. These results also show that much of the improved power transmission performance realized using a designed power waveform may be realized using a narrowband power transmission signal. In this exemplary embodiment, the amount of power delivered by the power or tone waveforms is 4 dB to 8 dB higher than that delivered by a traditional DT waveform. These values are significant as an 8 dB improvement in power delivery means a remote battery could be recharged 6 times faster using this new radiative power transfer scheme compared to using traditional or known radiative wireless power transfer schemes.

Figure 11:
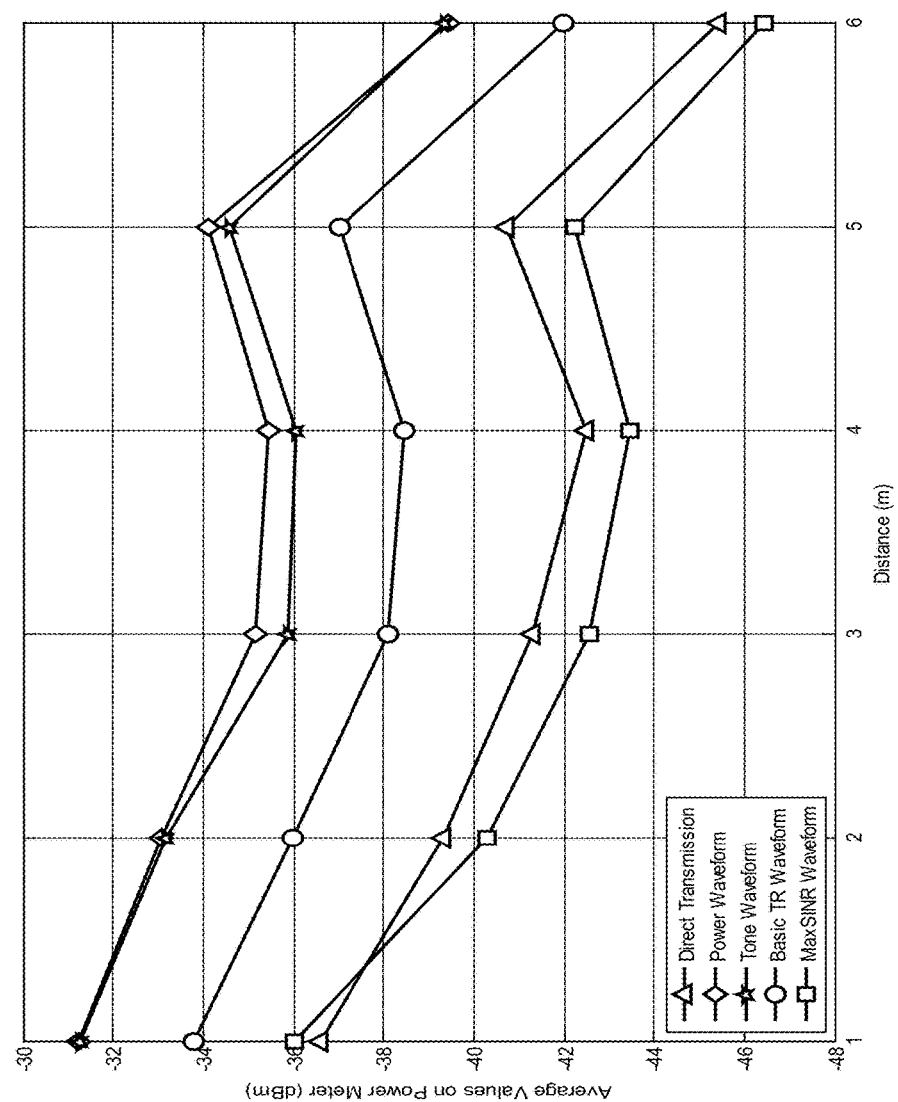
FIG. 11 shows the average power transfer levels between an exemplary Origin and Bot versus the distance in an exemplary LOS testing environment, according to an embodiment of the present teaching.

FIG. 11 shows the average power transfer performance versus the distance. In these measurements, at each distance, the power transfer was measured at 8 locations and averaged so the value plotted at each distance value is averaged over the eight random locations. In general, the average measured power value on the power meter decreases as the distance between the Origin and the Bot increases owing to the path loss effect. As in the 2 meter measurements, the maxPower waveform is superior to the direct transmission by about 6 dB to 8 dB in terms of the received power. Compared with the power waveform, the tone waveform can achieve similar performance gains and requires less computational complexity as described above. In the example above, the center frequency of the tone waveform can be determined by the frequency representation of the measured CIR, and the frequency with the largest amplitude value is chosen as the center frequency of the tone waveform. A basic TR waveform does yield improved performance compared to direct transmission, but that it typically delivers half as much power as the power and tone waveforms. The MaxSINR waveform, which was designed to optimize data transmission, has the worst performance among all the compared waveforms when the distance is larger than two meters.

Using a narrowband signal as the power transfer waveform may have a number of advantages. First, narrowband signals are relatively easy to generate. Second, a wireless power transfer system that uses a narrowband power transfer waveform may not need to use a channel probing step. That is, a power transmitter may sweep its output frequency in communication with a Bot to determine which center frequency is able to deliver the maximum amount of power to the Bot. In some embodiments where a Bot has multiple antennas, additional narrowband signals may be used to deliver power to different antennas with different CIRs with different frequency responses. In some embodiments, narrowband waveforms in different bands, such as in the vicinity of 2.4 GHz and the vicinity of 5.8 GHz, may be utilized to deliver more power to Bots. The idea of using multiple waveforms to transmit more power using additional antennas and/or additional frequency bands also applies to using designed and broader band power waveforms.

For example, to send power signals over a first frequency band and a second frequency band, a first channel probing signal is sent through a first wireless channel occupying the first frequency band from the terminal device intending to receive power to the transmitter, and a second channel probing signal is sent through a second wireless channel occupying the second frequency band from the terminal device to the transmitter. A first power waveform is determined using (7) based on the first CIR of the first wireless channel, and a second power waveform is determined using (7) based on the second CIR of the second wireless channel. For example, the first and second power waveforms can be transmitted using different transmit antennas and/or received using different receive antennas.

Figure 12:
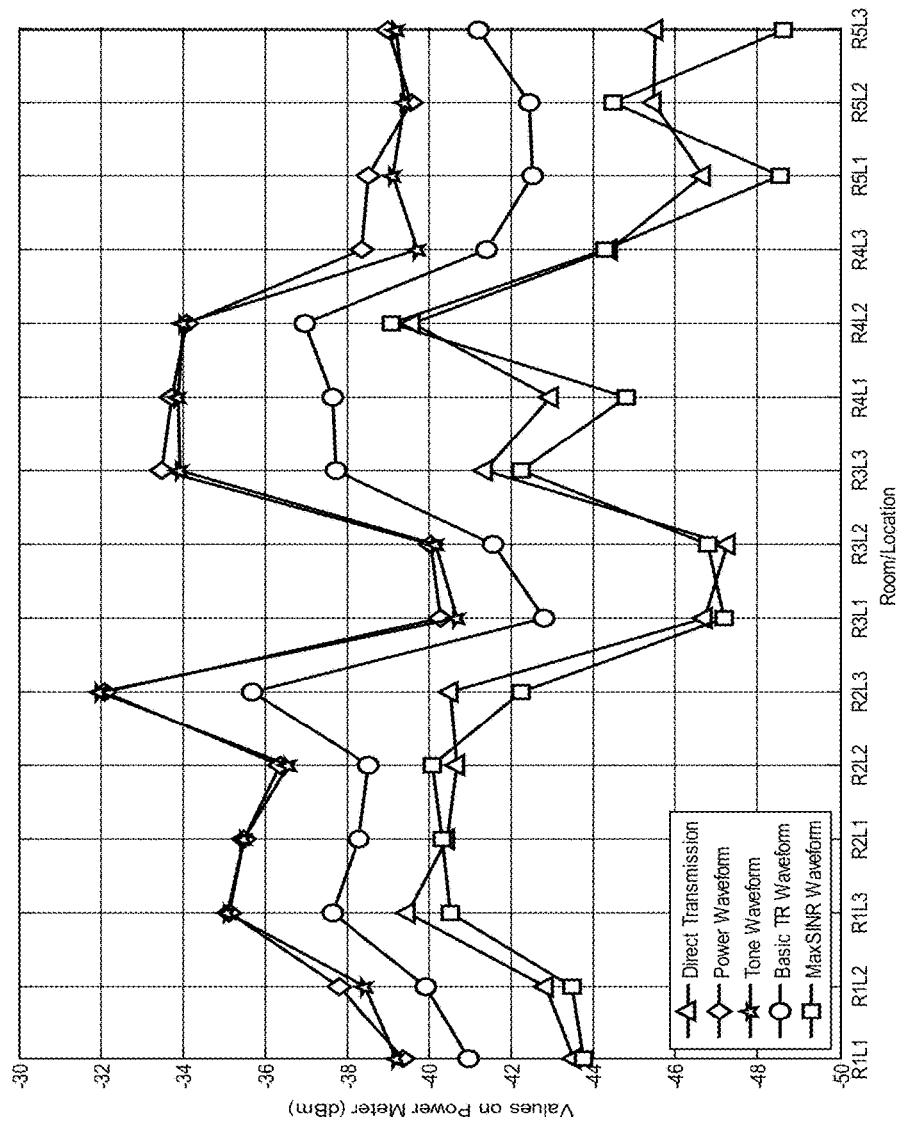
FIG. 12 shows the power measurement results for different rooms and Origin-Bot locations in an exemplary NLOS testing environment, according to an embodiment of the present teaching.

FIG. 7 also shows the layout of the experiments for the NLOS testing. Five office rooms (R1-R5) are considered, and the Origin and the Bot are located outside and inside the room, respectively, as depicted in FIG. 7. For each room, the power delivered to the Bot is measured at three random locations (L1-L3) within the room, keeping the distance between the Origin and the Bot between two to three meters. FIG. 12 shows the power measurement results for different rooms and locations in the NLOS testing environments. The performance gain of the power waveform over the direct transmission waveform is larger than 6 dB for most of the locations, e.g., R3 L1 and R3 L2. The performance gain using the power waveform in the NLOS environments is in general larger than that obtained in the LOS environments. Also, the performance gain can vary when placing the Bot within the same room but at different locations within that room. For example, the performance gain is 9 dB at the location L1 within room R4 (R4L1), whereas it is approximately 6 dB at location L2 within room R4 (R4L2). Finally, the performance gap between the power waveform and the basic TR waveform is also observed in the NLOS testing and ranges from 2 dB to 4 dB.

Simulation Results Using Measured CIRs with Single Transmit Antenna

Figure 13:
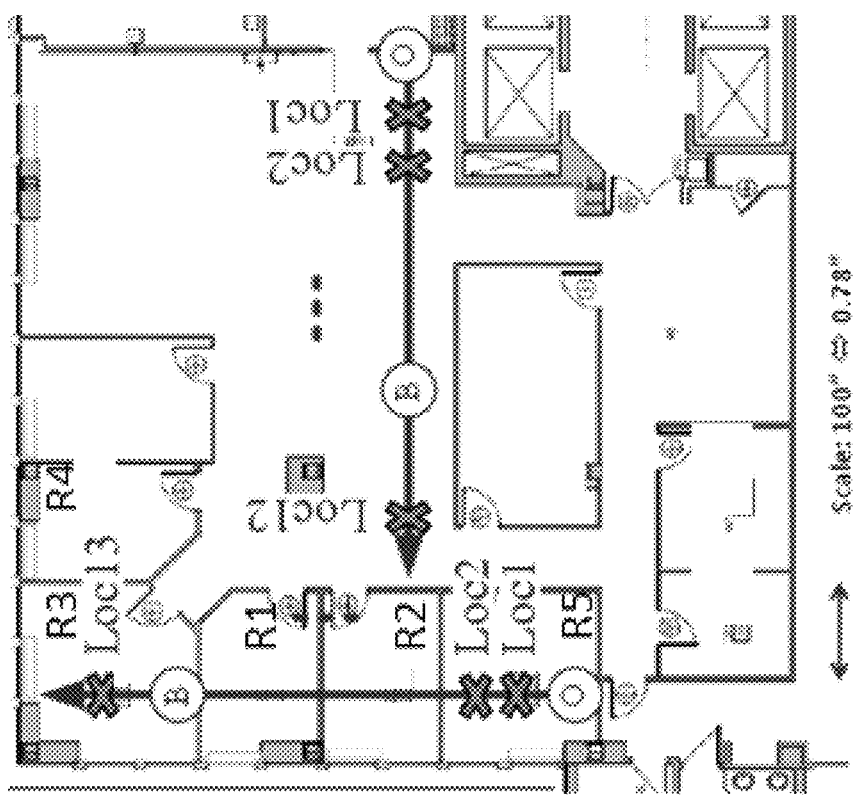
FIG. 13 shows an exemplary layout of Origin and Bot locations used for measuring channel state information in LOS and NLOS testing environments, according to an embodiment of the present teaching.

To further understand the performance of different power transfer waveforms in multipath environments, one can use measured CIRs in simulations of radiative wireless power transmission systems. A layout of the experiment used for measuring the real physical channels in LOS and NLOS testing environments is shown in FIG. 13. For the LOS environment, the locations of the Origin and the Bot are deployed as shown by the horizontal arrow in FIG. 13, while for the NLOS environment, the locations are arranged across the office rooms as shown by the vertical arrow. CIRs are measured and estimated for each Origin-to-Bot separation in increments of 1 m. There are twelve and thirteen relative separations for the LOS and NLOS testing environments, respectively, and one hundred estimated CSIs are recorded at the Origin for each location. The channel state information can include information about, e.g., the channel impulse response or the channel frequency response.

Figure 14:
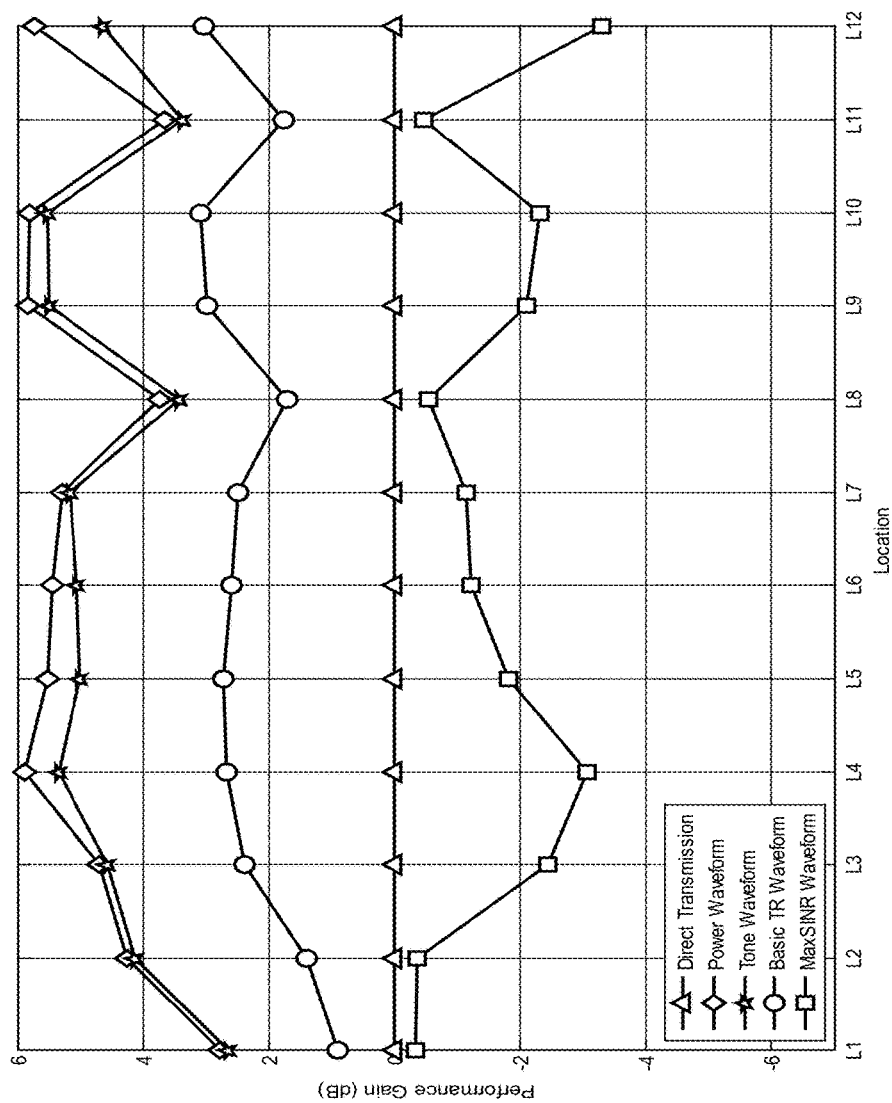
FIG. 14 shows the simulation results for power transmission between an Origin and a Bot using the measured CIRs in LOS testing environment of FIG. 13, according to an embodiment of the present teaching.
Figure 15:
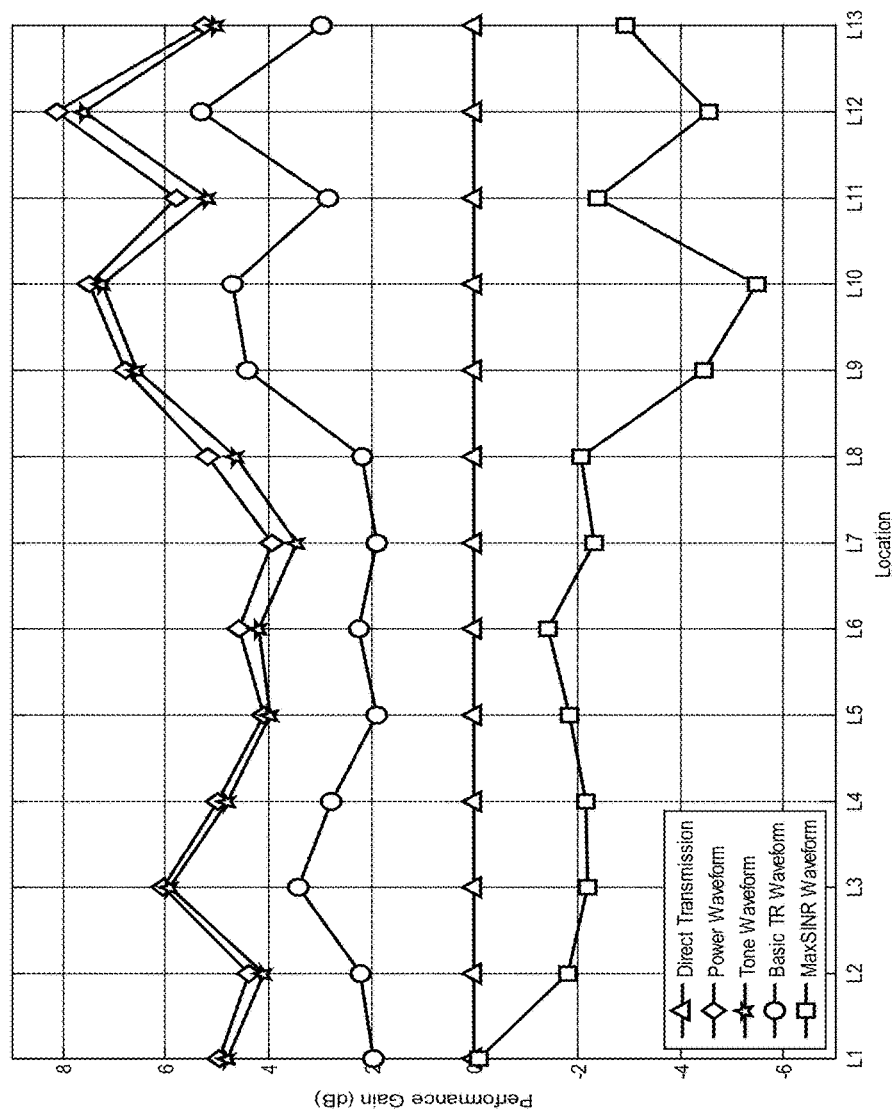
FIG. 15 shows the simulation results for power transmission between an Origin and a Bot using the measured CIRs in NLOS testing environment of FIG. 13, according to an embodiment of the present teaching.

FIG. 14 shows the simulation results for power transmission between an Origin and a Bot using the measured CIRs in LOS testing environment. FIG. 15 shows the simulation results for power transmission between an Origin and a Bot using the measured CIRs in NLOS testing environment. For each location, the power transfer performance is averaged over one the hundred channel realizations, and the power transfer performances for different waveforms are normalized to that for the direct transmission scheme. Consistent with the power transmission measurements described above, the designed power waveform yields the highest power transfer efficiency and the gain in efficiency increases at larger separations between the Origin and the Bot. This effect may be at least in part due to the longer channels efficiently capturing increased reflection and scattering signals making the multipaths seem more abundant. Using the measured CIRs, the simulations suggest that 5 dB to 6 dB improvements in power transfer efficiency can be expected over direct transmission systems. This conclusion is consistent with the measured values disclosed above. Also consistent with the experimental demonstration, the simulations show that the performance of the tone waveform for power transfer is almost the same as for the specially designed power waveform. Furthermore, the performance of the basic TR waveform, while better than a direct transmission waveform, is not the best for power transmission systems. Moreover, the power transfer performance using a maxSINR waveform is worse than using a traditional direct transmission waveform.

As in the experimental demonstration, the performance improvement for the maxPower waveforms and tone waveforms compared to the direct transmission waveform is larger in NLOS power transmission systems than in LOS transmission systems. This increase may be attributable to the increased multipaths associated with the NLOS systems. This result suggests that further gains in power transmission efficiency may be realized in environments that produce more multipaths and/or in systems that can detect more or richer multipaths. This is because the multipath phenomenon in the NLOS environment is more severe, and the direct transmission thus suffers from a serious performance degradation, while the power waveform is able to deliver more power by recollecting more of the energy at the intended receiver.

Simulation Results Using Calculated CIRs with Single Transmit Antenna

This section presents computer simulation results that predict the performance of this novel power transfer scheme for different designed waveforms over an ultrawideband channel (UWB). In these simulations, the system bandwidth is set to 125 MHz, and therefore, the sampling period is given as $T_S=8$ ns. The transmitted signal v[l] is assumed to be random and aperiodic, unless otherwise stated.

The intensity of a signal received through a multipath channel as a function of time delay, also referred to as a power delay profile, may be difficult to express generally as multiple integrals are not easily evaluated. Therefore, in these calculations, to keep the analysis analytically tractable, one can consider three power delay profiles: a uniform power delay profile (UPD), a triangular power delay profile (TPD), and an exponential decay power delay profile (EPD) which are defined as the following:

$$\rho_l = \frac{1}{L}, \text{ for } l=0, \ldots, L-1 \ (UPD) \tag{8}$$

$$\rho_l = \frac{2(1-L\rho_0)}{(L-1)L}l + \rho_0, \text{ for } l=0, \ldots, L-1, \tag{9}$$

$$\text{where } \frac{1}{L} \leq \rho_0 \leq \frac{2}{L} \ (TPD)$$

$$\rho_l = c_\rho \cdot e^{-\frac{lT_S}{\sigma_T}}, \text{ for } l=0, \ldots, L-1 \ (EPD) \tag{10}$$

where $\sigma_T$ is the delay spread of the channel, and $c_\rho$ is a constant such that the summation of $\rho_l$ for all l is equal to one. In an exemplary indoor environment, the delay spread is on the order of hundreds of nanoseconds, and the total number of resolvable paths is around several dozen with respect to $T_S=8$ ns. One can simulate the system performance in Saleh-Valenzuela (SV) channel model. This model is popularly adopted in IEEE 802.15.4a standard and suitable for the wideband applications with a frequency range from 2 to 10 GHz, covering indoor residential, office, outdoor, industrial, and open outdoor environments. The average transmitted power is assumed to be one throughout the simulation, i.e., P=1.

Figure 16:
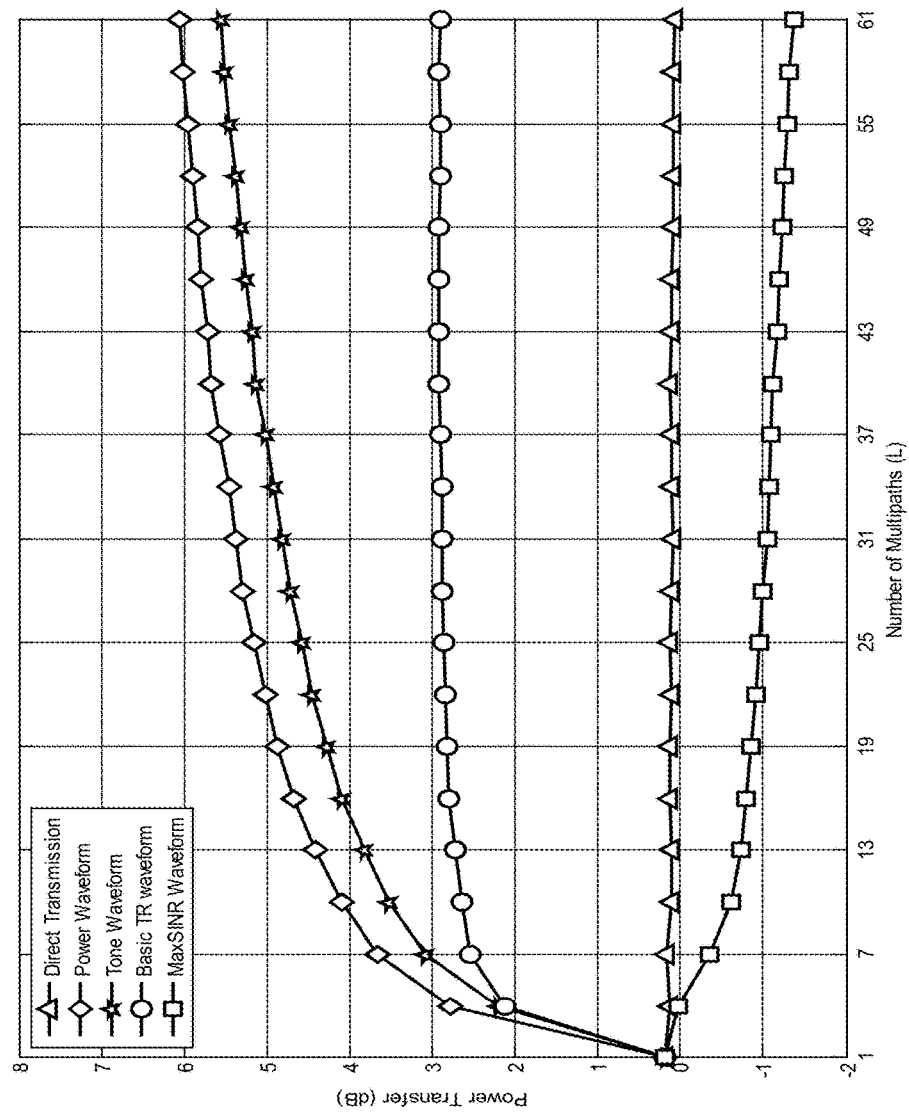
FIG. 16 shows the predicted power transfer performance using different exemplary transmitted waveforms assuming an exponential decay power delay profile (EPD), according to an embodiment of the present teaching.
Figure 17:
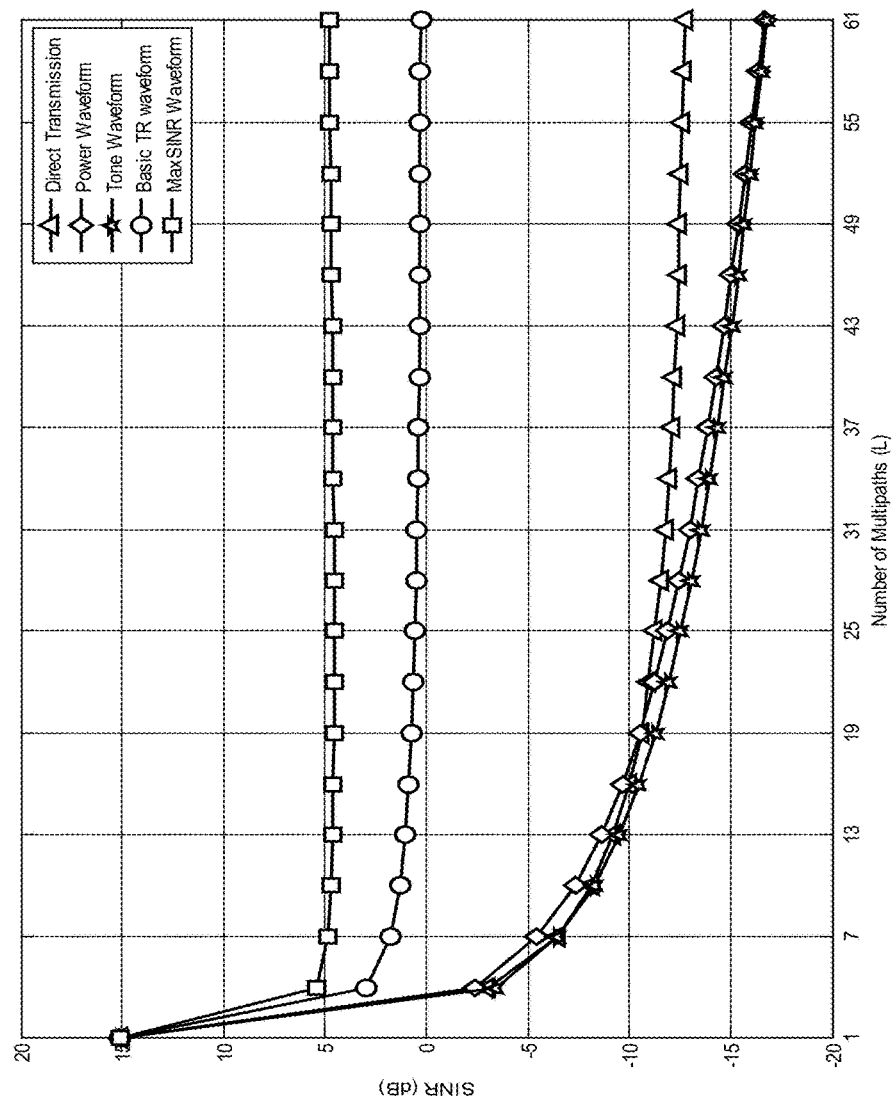
FIG. 17 shows the predicted SINR performance for the same exemplary waveforms used to obtain the results of FIG. 16 using the same EPD channel profiles, according to an embodiment of the present teaching.

FIG. 16 shows the predicted power transfer performance and FIG. 17 shows the predicted SINR performance for the different waveforms under the EPD channel profiles. The delay spread $\sigma_T$ is set to 160 ns. One can observe from FIG. 16 that the power transfer performance relative to the direct transmission waveform performance is increasing with the number of resolvable paths, except for the MaxSINR waveform. For L=61, the maxPower waveform and the basic TR waveform outperform the direct transmission by about 6 dB and 3 dB, respectively. As in the experiments and previous simulations, the performance of the tone waveform is similar to that of the maxPower waveform. In these simulations, the difference in power transfer efficiency between the power and tone waveforms is no more than approximately 0.5 dB. In general, the waveform optimized for data transmission systems, the maxSINR waveform, has an opposite performance trend compared to the other waveforms, and is even less efficient at transferring power as the number of resolvable multipaths in the system increases.

Figure 18:
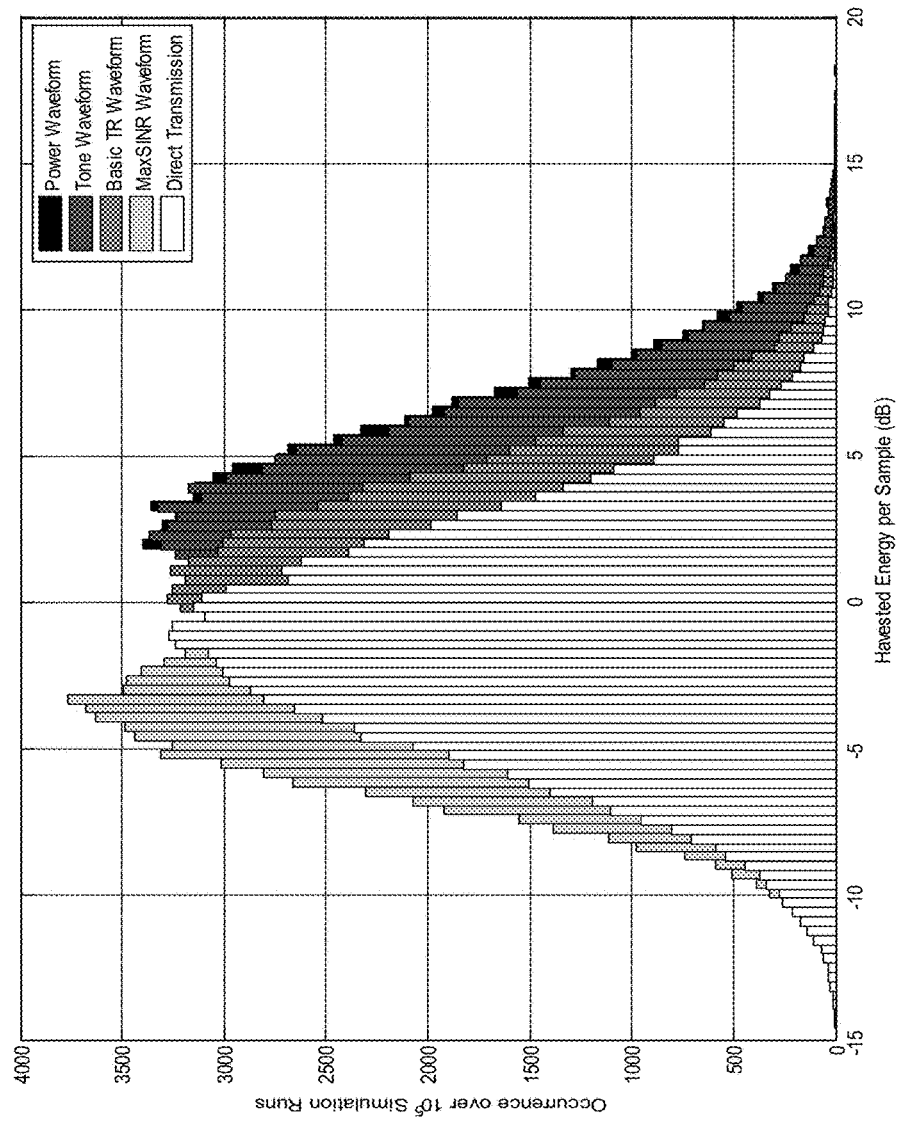
FIG. 18 shows the predicted histograms of the power transfer performance for different exemplary waveforms in Ultra-wideband (UWB) channels under LOS conditions, according to an embodiment of the present teaching.
Figure 19:
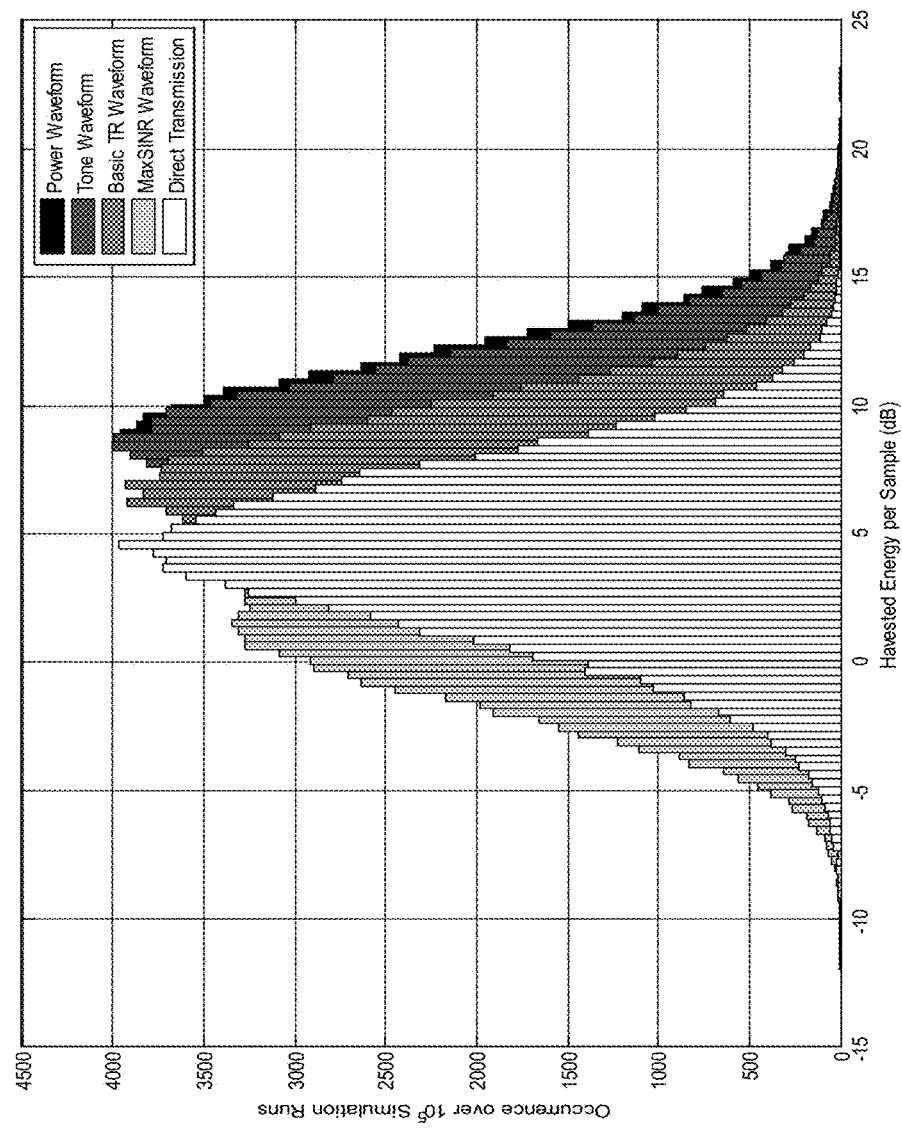
FIG. 19 shows the predicted histograms of the power transfer performance for different exemplary waveforms in UWB channels under NLOS conditions, according to an embodiment of the present teaching.

FIG. 18 and FIG. 19 show the predicted histograms of the power transfer performance for different waveforms in UWB channels with LOS (FIG. 18) and NLOS (FIG. 19) office environments. It can be observed from both FIGS. 18 and 19 that the power transfer performance of the maxPower waveform is predicted to be slightly better than that of the tone waveform in terms of the mean values of the histograms. Both of these waveforms show better capability for recollecting the power from the multipaths at the receiver side than the other three waveforms. Again, the MaxSINR waveform has the worst power transfer performance among all the waveforms. As observed in the experiments and previous simulations, the harvested power per sample in NLOS environments is predicted to be larger than that in LOS environments.

Figure 20:
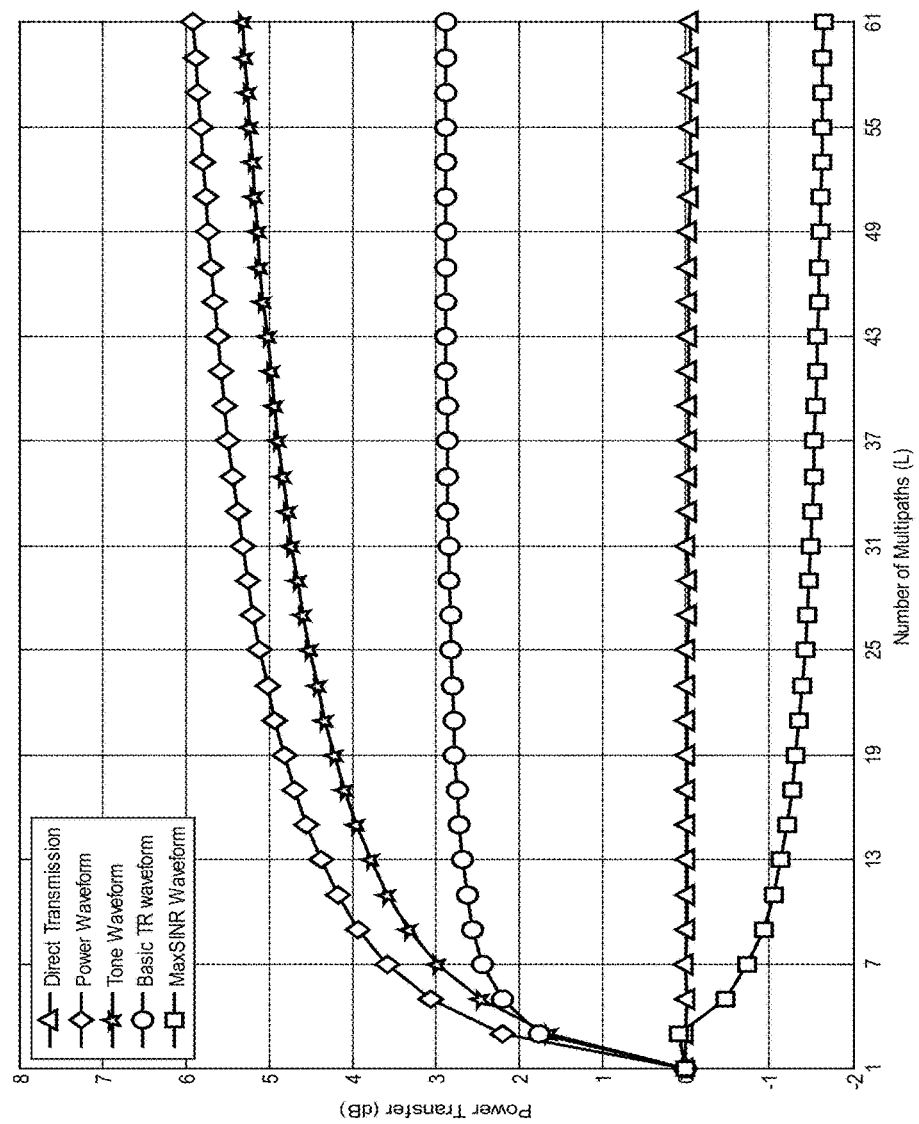
FIG. 20 shows the predicted power transfer performance for different exemplary waveforms versus number of multipaths for Uniform Power Delay (UPD) channel profiles, according to an embodiment of the present teaching.
Figure 21:
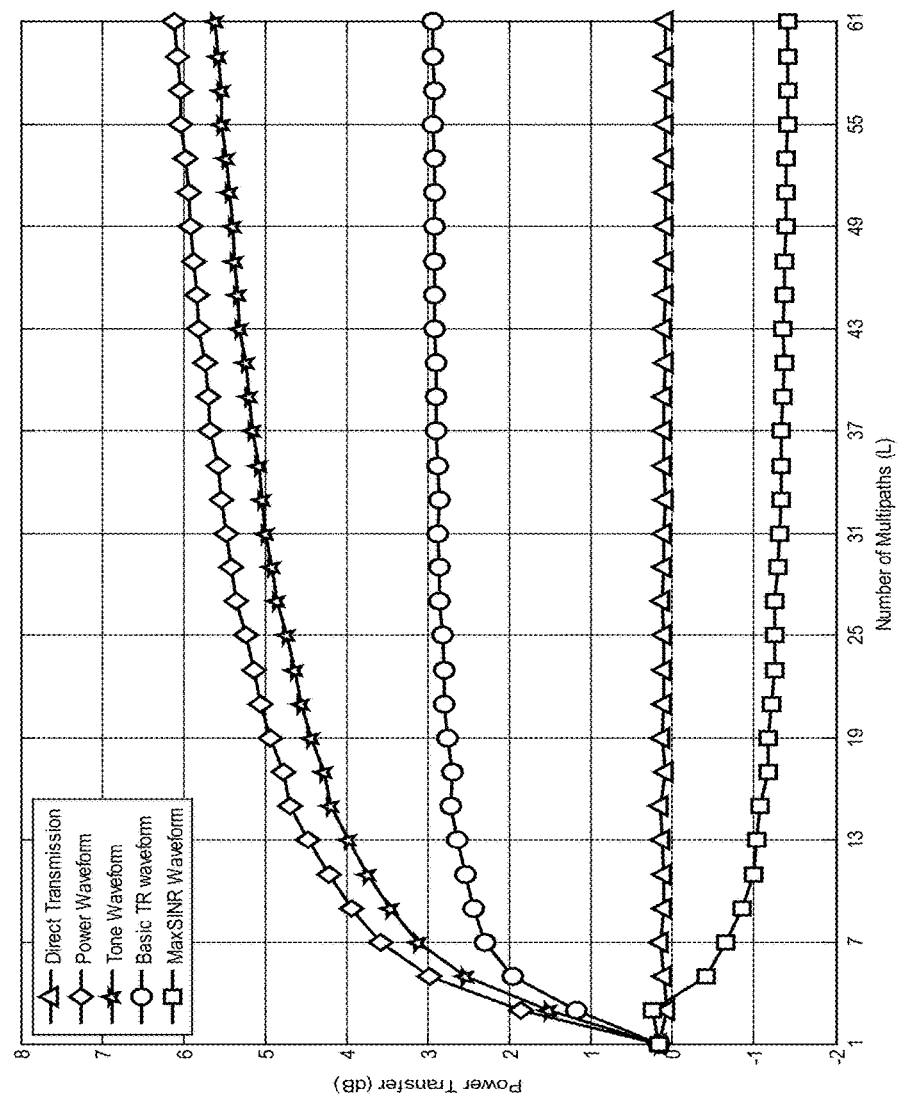
FIG. 21 shows the predicted power transfer performance for different exemplary waveforms versus number of multipaths for Triangular Power Delay (TPD) channel profiles, according to an embodiment of the present teaching.

FIGS. 20 and 21 show the predicted power transfer performance for different waveforms versus number of multipaths under the UPD and TPD channel profiles, respectively. The parameter $\rho_0$ in the TPD channel profile is set as $$\frac{2}{L}.$$

From these two figures, it is seen that the five waveforms follow a very similar performance trend as in FIG. 16.

Figure 22:
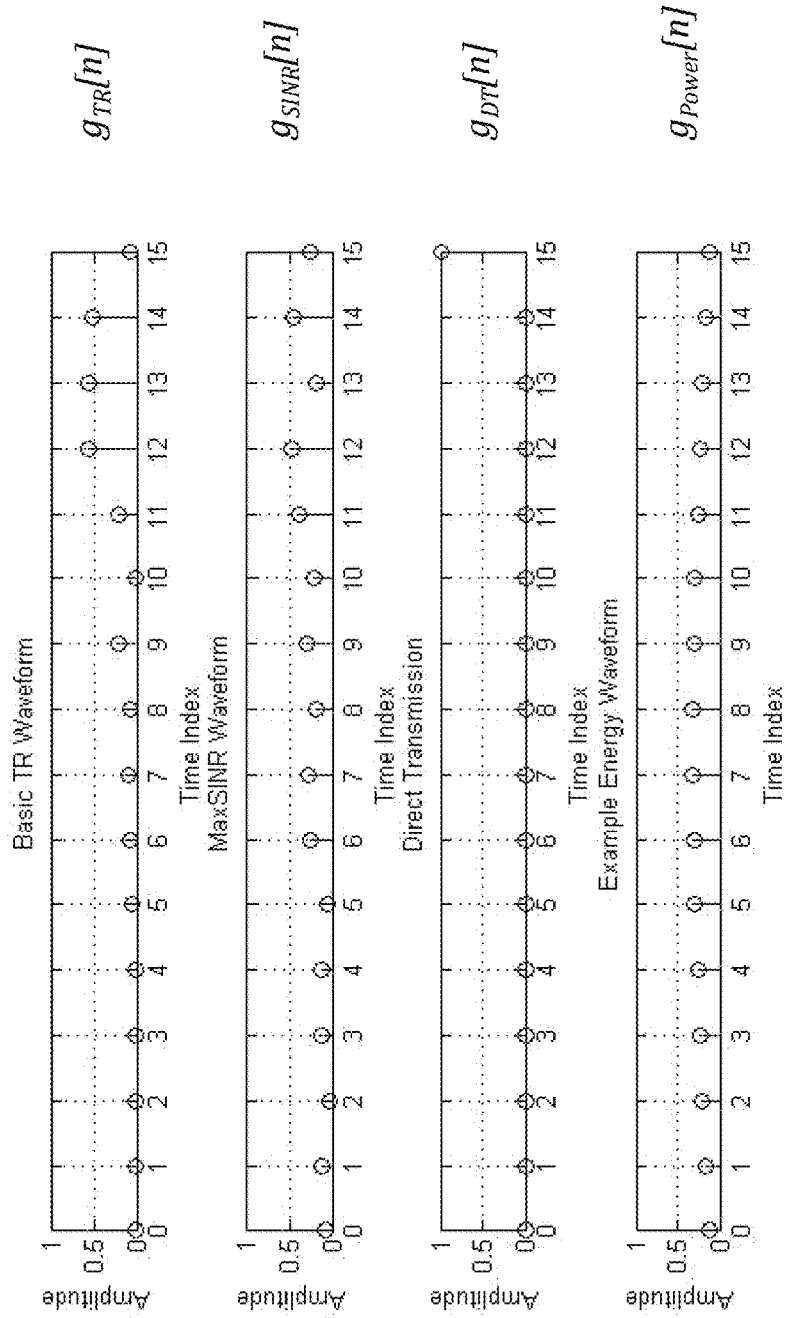
FIG. 22 shows exemplary waveforms used for the basic Time-Reversal (TR), maxSINR, direct transmission and power waveforms used in the simulations disclosed herein, according to an embodiment of the present teaching.

FIG. 22 shows exemplary waveforms used for the basic TR, maxSINR, direct transmission and maxPower waveforms used in the simulations disclosed herein.

While many of the exemplary embodiments disclosed so far transfer power between a single power source antenna and a single power receiver antenna, a wireless power system of the present teaching may include one or more power sources any or all of which may include one or more antennas. A wireless power system of the present teaching may also include one or more power receivers any or all of which may include one or more antennas. A wireless power system of the present teaching may also include a multiplexing capability so that data and power waveforms may be multiplexed and launched by a wireless antenna. In some embodiments, a composite power and data signal may be generated and launched by a wireless transmitter so that after propagating through a multipath channel, the data signal is focused on and delivered to a first antenna and the power signal is focused on and delivered to a second antenna. In some embodiments, these two antennas may be separated from each other by approximately 1 cm, 2 cm, 3 cm, 4 cm, 5 cm or more than 5 cm.

A wireless power system of the present teaching may also include a multiplexing capability so that data and power may be separately delivered to different antennas on separate or a single device. In some embodiments, power and data signals may be generated and launched separately by one or more wireless transmitters so that after propagating through a multipath channel, the data signal is focused on and delivered to a first antenna and the power signals are focused on and delivered to a second antenna. In some embodiments, these two antennas may be separated from each other by approximately 1 cm, 2 cm, 3 cm, 4 cm, 5 cm or more than 5 cm.

Figure 23:
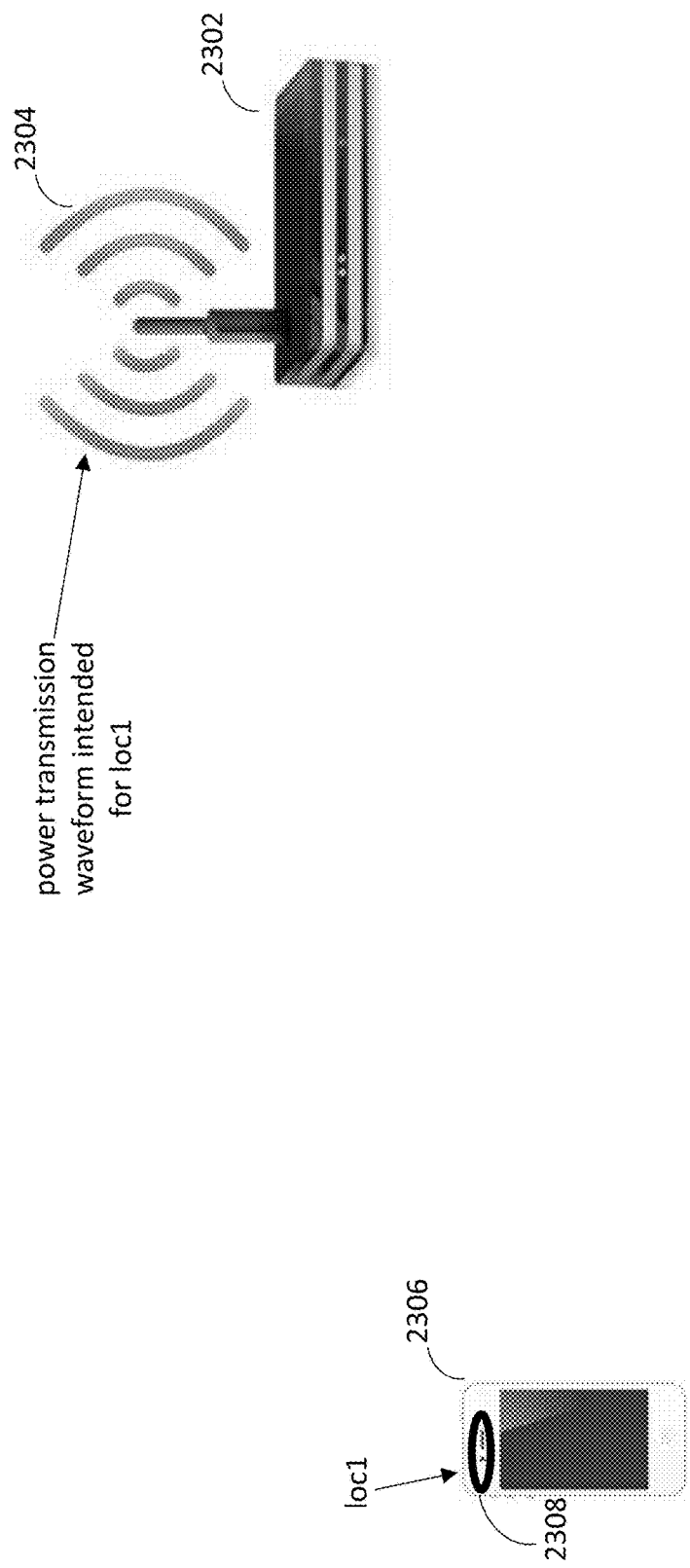
FIG. 23 shows an exemplary embodiment of the disclosed wireless power transfer system including a transmitter and a receiver, according to an embodiment of the present teaching.

FIG. 23 shows an exemplary embodiment of the disclosed wireless power transfer system including a power transmitter 2302 and a power receiver 2306. In this example, the power receiver 2306 is a mobile phone, but this is just one example of a power receiving device. A power receiving device may be any device that requires power to operate. For example, a phone, a smart phone, a tablet, a computer, a wearable device, a smart watch, a hearing aid, an ear piece, a microphone, headphones, google glasses, augmented reality glasses, night vision glasses, an insulin pump, a monitoring device, a health monitoring device, a beacon, a light, a television, a speaker, a stereo component, a kitchen appliance, a thermostat, a digital picture frame, a calculator, a flashlight, a radio, a space heater, a heated seat, a display in a vehicle, and the like, may all be power receiving devices. In this example, the power source 2302 is an access point, but this is just one example of a power source. A power source may be any device that comprises an antenna and a processor capable of generating wireless power waveforms. For example, any of the example power receiving devices listed above may also be power sources. The power source generates a wireless power transfer signal 2304 using a power waveform determined using information, such as the CIR, for the channel between the antenna 2308 on the power receiver 2306 and the antenna on the power source 2302. The generated wireless power transfer signal may preferentially focus the wireless power on the antenna 2308 of the receiving device 2306. The receiving device may use the received power to power the device and/or to charge a battery in the device and/or to partially power the device and/or charge a battery of energy storage unit in the device. The antennas on the power source and power receiving devices may be built into the devices or may be added on. For example, the power source and/or receiving devices may include a sleeve, a cover, a dongle, a mat, a card, a chip, a usb plug-in, a plug-in card, and the like that may comprise a wireless antenna or multiple antennas for use in wireless power transfer systems.

Figure 24:
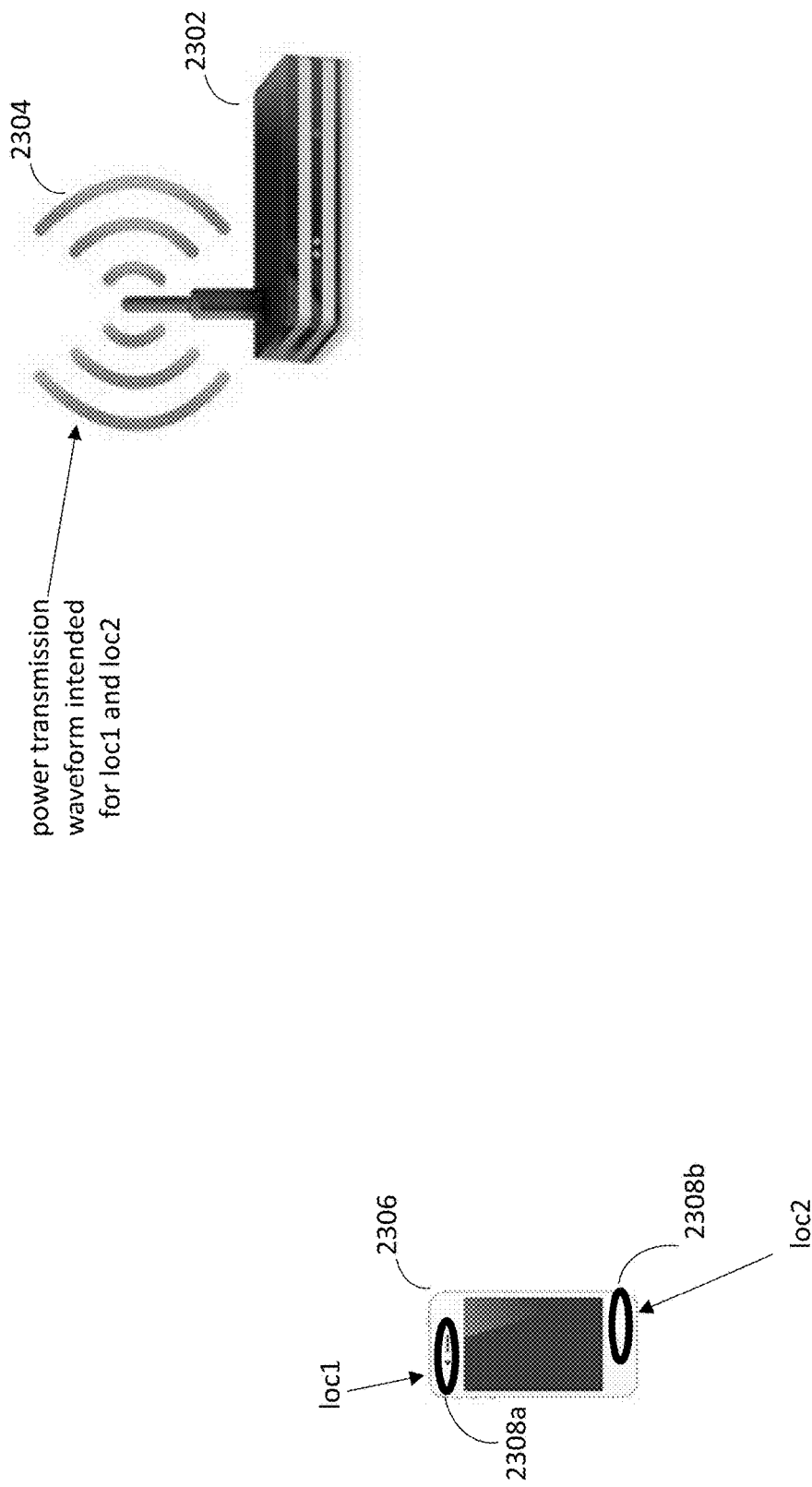
FIG. 24 shows another exemplary embodiment of the disclosed wireless power transfer system including a transmitter and a receiver, according to an embodiment of the present teaching.

FIG. 24 shows an exemplary embodiment of the disclosed wireless power transfer system including a power transmitter 2302 and a power receiver 2306. In this embodiment, a power receiving device may include more than one antenna for receiving power. Two antennas 2308a, 2308b are indicated; but it can be understood that a device may comprise three or more antennas. Each of these antennas will be located at different positions within the power receiving device 2306 or sleeve (not shown) and each may have a unique channel between it and the power source 2302. Composite communication waveforms can be generated that enable a transmitter to send separate data signals to separate receivers simultaneously with a single launched downlink signal. Similar techniques can be applied to power transmission waveforms so that a single wireless signal launched from a power source may simultaneously deliver power to two separate receivers, 2308a and 2308b.

Figure 25:
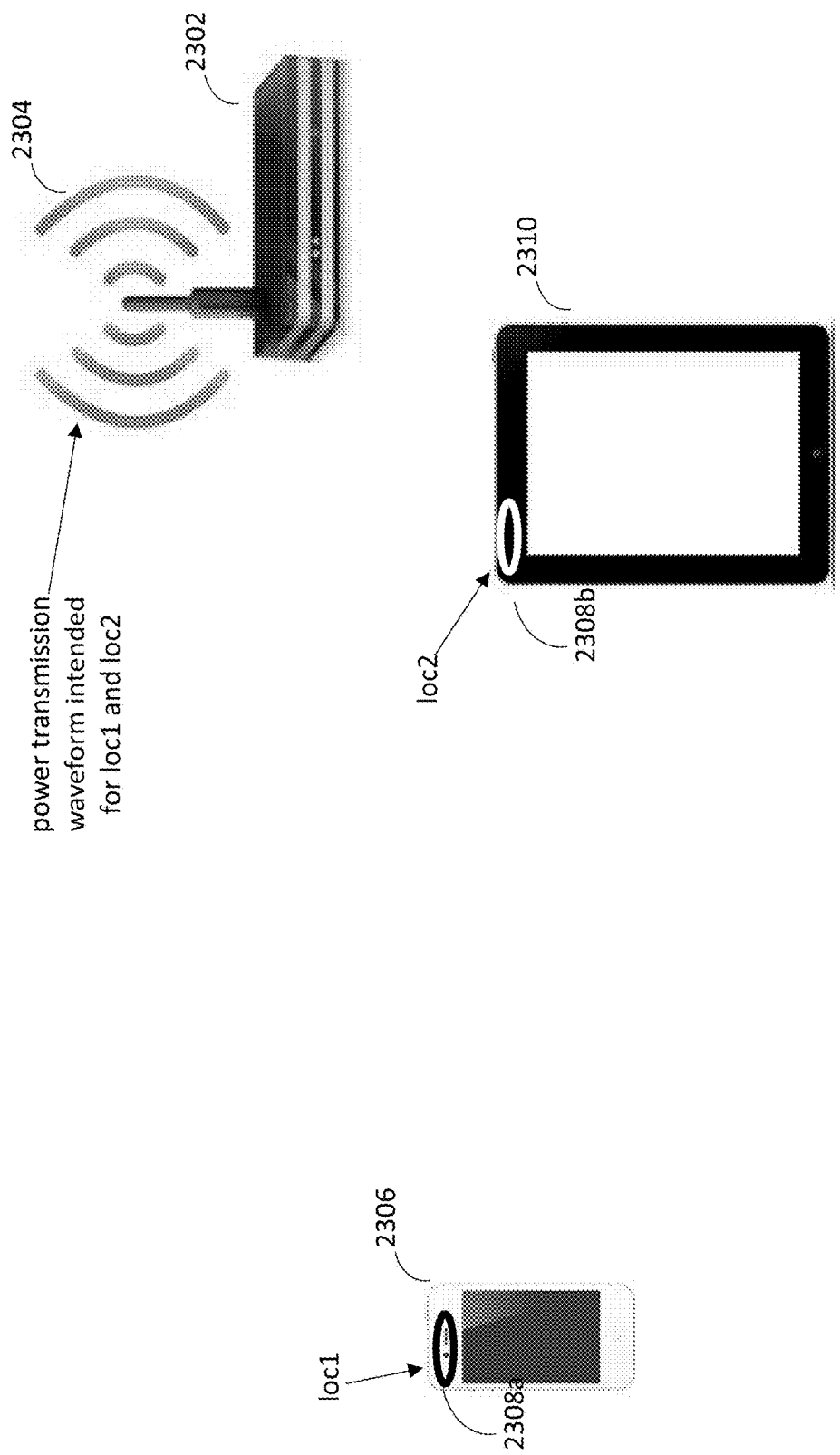
FIG. 25 shows an exemplary embodiment of the disclosed wireless power transfer system including a transmitter and two receivers, according to an embodiment of the present teaching.

FIG. 25 shows an exemplary embodiment of the disclosed wireless power transfer system including a power transmitter 2302 and two power receivers 2306, 2310. In this embodiment, each power receiving device may include more than one antenna for receiving power. Each of these antenna or antennas may be located at different positions within the power receiving devices 2306, 2310 or sleeves (not shown) and each may have a unique channel between it and the power source 2302. As disclosed in U.S. patent application Ser. No. 13/706,342, filed on Dec. 5, 2012 and U.S. patent application Ser. No. 14/615,984, filed on Feb. 6, 2015, which are incorporated herein by reference in their entireties, composite communication waveforms could be generated to enable a transmitter to send separate data signals to separate receivers simultaneously with a single launched downlink signal. Similar techniques can be applied to power transmission waveforms so that a single wireless signal launched from a power source may simultaneously deliver power to two separate receivers, 2308a and 2308b.

FIG. 26 shows an exemplary embodiment of the disclosed wireless power transfer system including a power/data transmitter 2302 and a power/data receiver 2306. In this embodiment, a power receiving device may include more than one antenna and the antennas may be configured to receive power and/or to receive data. Each of these antenna or antennas may be located at different positions within the power receiving device 2306 or sleeve (not shown) and each may have a unique channel between it and the power source 2302. As discussed before, composite communication waveforms could be generated that enabled a transmitter to send separate data signals to separate receivers simultaneously with a single launched downlink signal. Similar techniques can be applied to power transmission waveforms and communication waveforms so that a single wireless signal launched from a transmitter 2302 may simultaneously deliver power to some receivers, 2308a and data to other receivers 2308b.

Figure 27:
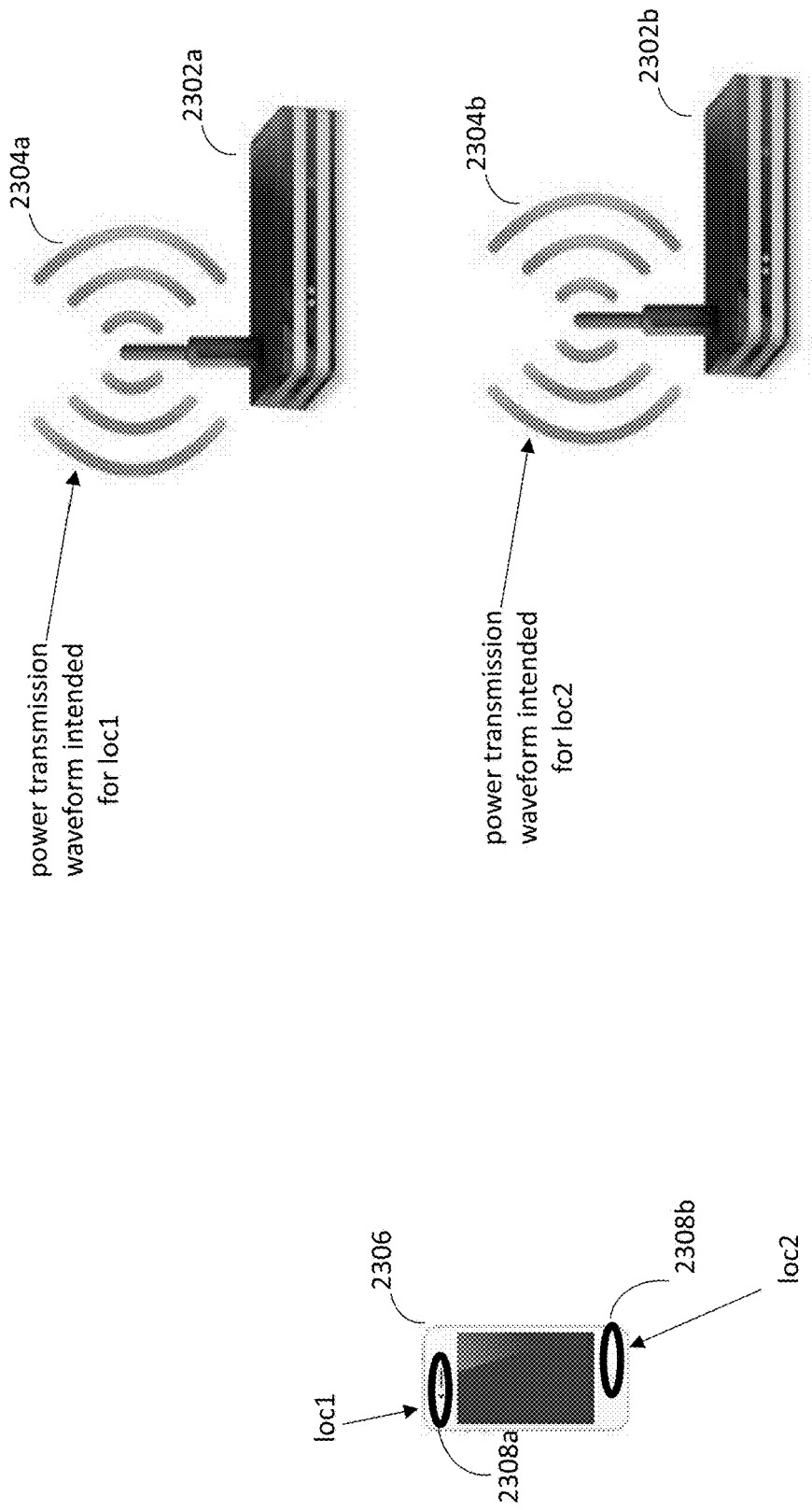
FIG. 27 shows an exemplary embodiment of the disclosed wireless power transfer system including at least two power transmitters and a power receiver, according to an embodiment of the present teaching.

FIG. 27 shows an exemplary embodiment of the disclosed wireless power transfer system including at least two power transmitters 2302a, 2302b and a power receiver 2306. In this embodiment, a power receiving device may include more than one antenna (e.g., 2308a, 2308b) for receiving power. Each of these antenna or antennas may be located at different positions within the power receiving device 2306 or sleeve (not shown) and each may have a unique channel between it and either or both of the power sources 2302a, 2302b. In exemplary embodiments, each power transmitter may transmit power to one of the receiver antennas 2308a or 2308b. In other exemplary embodiments, each power transmitter may transmit power to both power receiver circuits, 2308a, 2308b.

In some embodiments, a power/data source may send power to one or more devices using certain signal bands or frequency ranges and may send power to one or more devices using other signal bands or frequency ranges. In some embodiments, power signals and data signals may be frequency multiplexed. In some embodiments, a power/data source may send power to one or more devices during certain time intervals and may send power to one or more devices during other time intervals. In some embodiments, power signals and data signals may be time multiplexed.

Figure 28:
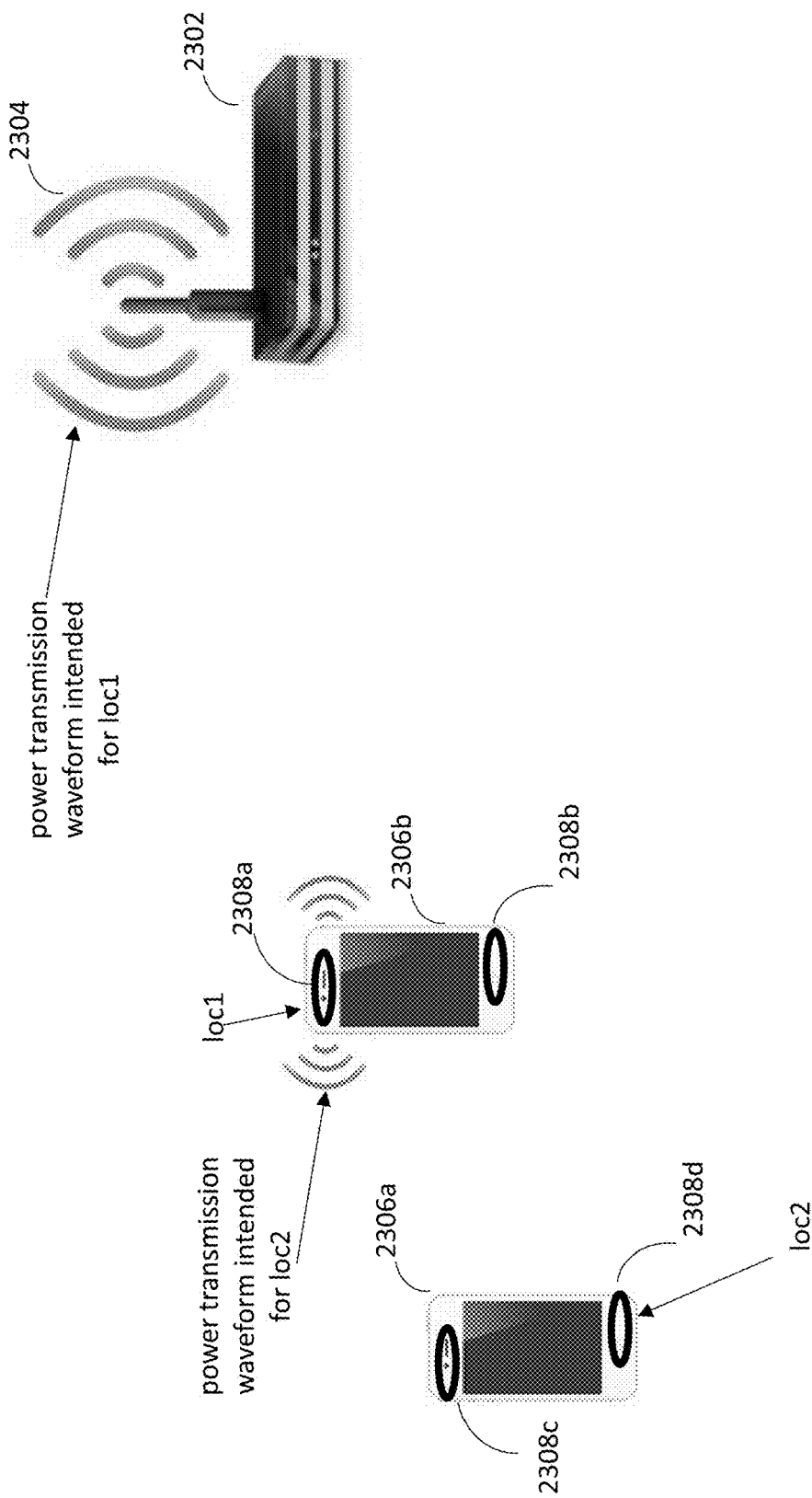
FIG. 28 shows an exemplary embodiment of the disclosed wireless power transfer system including a power transmitter, a power receiver, and a power repeater, according to an embodiment of the present teaching.

FIG. 28 shows an exemplary embodiment of the disclosed wireless power transfer system including a power transmitter 2302, a power receiver 2306a, and a power repeater 2306b. In this embodiment, power receiving and power repeating devices may include more than one antenna (e.g., 2308a, 2308b, 2308c, 2308d) for receiving and/or transmitting power. Each of these antenna or antennas may be located at different positions within the power receiving and/or repeating devices 2306a, 2306b or sleeve (not shown). A power repeater 2306b may be used to extend the range of a wireless power transmission system. A power repeater may receive power from one power source and then transfer power to one other power receiver. Any or all of the antennas in a power receiver may be bidirectional and may operate as transmitters or receivers. In exemplary embodiments, repeaters may alternately operate as transmitters or receivers or they may simultaneously operate as transmitters and receivers. In some embodiments, repeaters may operate as transmitters and/or receivers for time multiplexed and/or frequency multiplexed wireless power systems.

FIG. 29 shows an exemplary embodiment of the disclosed wireless power transfer system including a power transmitter 2302 and a power receiver 2306. In this embodiment, a power transmitting device may include more than one antenna and the antennas may be configured to transmit power and/or to transmit data. Each of these antenna or antennas may be located at different positions within the power transmitting device 2302 and each may have a unique channel between it and the power receiver 2306. In some embodiments, each antenna in the power transmitter may send a power transmission signal 2304a, 2304b, 2304c, intended to be received at a power receiving device 2306. In some embodiments, some of the antennas on device 2302 may send power transfer signals and some of the antennas may send data signals. In some embodiments, some or all of the antennas on device 2302 may send multiplexed power signals and/or multiplexed power and data signals.

System Model of Multi-Antenna Power Waveforming

It has been shown that power waveforming (PW) techniques can improve the wireless power transfer (WPT) efficiency by exploiting multipath signals. To better utilize the spatial diversity, one can develop a joint power waveforming and beamforming design for WPT by using multiple transmit and/or receive antennas. For example, the waveforms on multiple transmit antennas, driven by a reference signal, can be jointly designed to maximize the energy delivery efficiency.

The following notations are adopted in the following sections. The uppercase and lowercase boldface letters denote matrices and vectors, respectively. The notations $(\cdot)^T$, $(\cdot)^\dagger$, $(\cdot)^*$, $((\cdot))_N$ and * stand for transpose, conjugate transpose, element-wise conjugate, modulo-N and convolution operation, respectively. The matrices $I_N$ and $F_N$ represent an N×N identity matrix and an N-point discrete Fourier transform (DFT) matrix, respectively, and the $(k,n)^{th}$ entry of the DFT matrix is given by $$\frac{1}{\sqrt{N}} e^{-j\frac{2\pi k n}{N}}.$$

The notations $1_N$, $0_N$ and $e_k$ are used to express an all-one vector, an all-zero vector, and the $k^{th}$ column of the identity matrix $I_N$, respectively. The Kronecker product and Hadamard product are denoted by $\otimes$ and e, respectively. The notation $\mathbb{E}[\cdot]$ takes expectation, while $\|x\|_2$ finds the Euclidean norm of a vector x. The matrix Diag[x] represents a diagonal matrix with x as its diagonal entries. The operators $\zeta_1[A]$ and $\lambda_{max}[A]$ take the principal eigenvector and eigenvalue of the matrix A, respectively.

Figure 30:
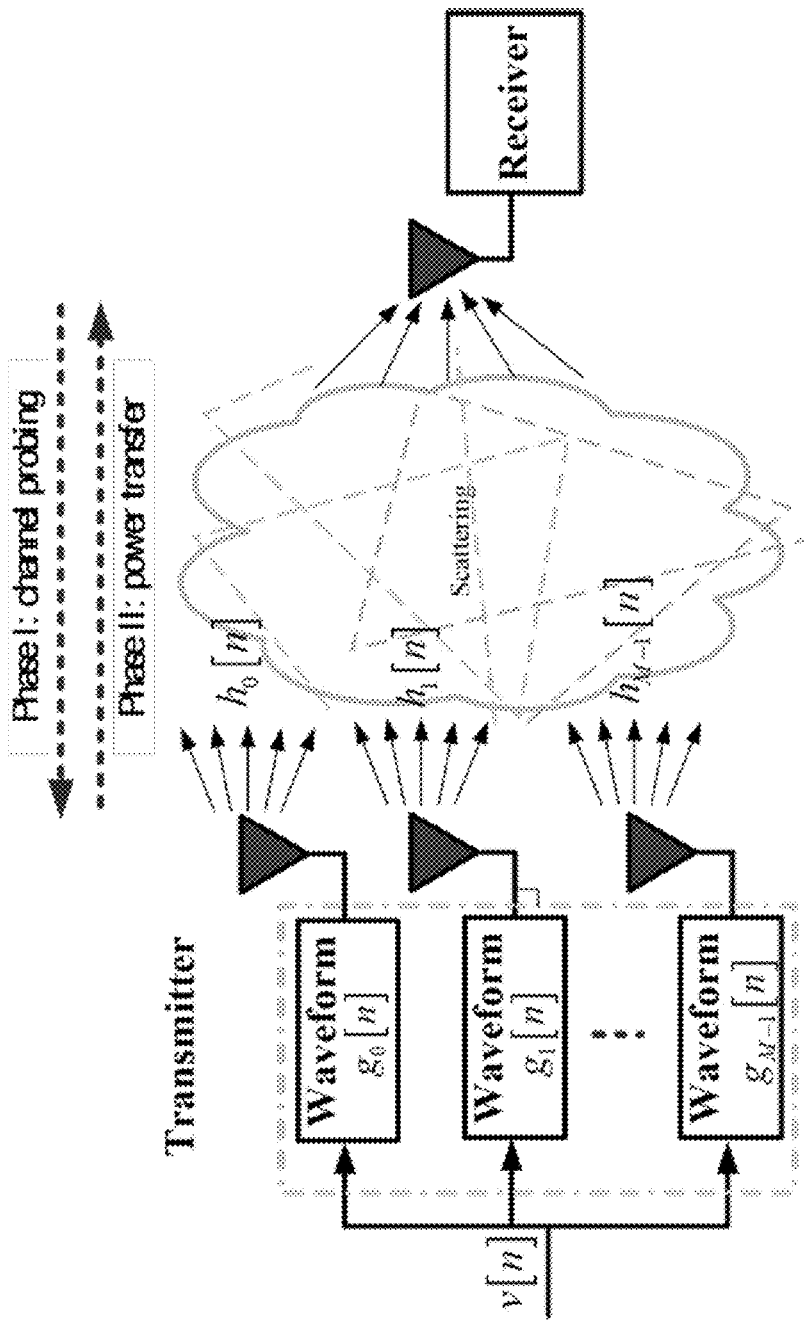
FIG. 30 shows an exemplary multi-antenna Power Waveforming (PW) system with two transmission phases: channel probing and power transfer, according to an embodiment of the present teaching.

The joint power waveforming and beamforming system is illustrated in FIG. 30, where the transmitter is equipped with M antennas and the receiver has a single antenna. One can assume that the wireless channel between each transmit and receive antenna is composed of L taps and quasi-static during the observation time. The channel impulse response (CIR) between the $m^{th}$ transmit antenna and the receiver is modeled as $$h_m[n] = \sum_{l=0}^{L-1} h_{m,l} \delta[n-l], n=0,\ldots,L-1, \quad (11)$$

where $\delta[n]$ is the Kronecker delta function, and $h_{m,l}$'s are identically and independently distributed (i.i.d.) complex Gaussian with zero mean and variance $\rho_{m,l}$, for $l=0, \ldots, L-1$. Without loss of generality, the total channel power of each channel link is normalized to one, i.e., $\Sigma_{l=0}^{L-1} \rho_{m,l}=1$, for $m=0, \ldots, M-1$.

In FIG. 30, the implementation of the multi-antenna PW system includes two transmission phases: channel probing phase and power transfer phase. During the first phase, the receiver first sends a pilot sounding signal with a delta-like auto-correlation function to each transmit antenna for estimating the corresponding CIR. In practice, the number of digitally resolvable multipaths in (11), which naturally exist in the wireless environments, at the transmitter increases as the system bandwidth becomes wider, and the number of resolvable multipaths will reach an upper limit when the system bandwidth is sufficiently large. With the channel reciprocity and quasi-static assumptions, the transmitter computes a waveform $g_m[n]$ for each transmit antenna based on the estimated CIR during the second phase for the WPT purpose, for $m=0, \ldots, M-1$ and $n=0, \ldots, N_g-1$, and $N_g$ is the length of the waveform. Let $v[n]$ be a reference signal of length $N_v$, for $n=0, \ldots, N_v-1$. Hence, the reference signal after the waveform embedding at the $m^{th}$ transmit antenna can be formulated as $$s_m[n]=\sqrt{P_v}(v*g_m)[n], n=0,\ldots,N_g+N_v-2, \quad (12)$$

where one can assume that the total waveform power is equal to one, i.e., $\Sigma_{m=0}^{M-1} \Sigma_{n=0}^{N_g-1} |g_m[n]|^2=1$, the average reference signal power is given by $$\frac{1}{N_v} \sum_{n=0}^{N_v-1} |v[n]|^2 = 1,$$

and $P_v$ is the average transmit power. Accordingly, the received signal at the receiver side is given as $$\begin{aligned} y[n] &= \sum_{m=0}^{M-1} (h_m * s_m)[n] + z[n] \\ &= \sqrt{P_v} \sum_{m=0}^{M-1} (h_m * v * g_m)[n] + z[n], \\ n &= 0, \ldots, N_g + N_v + L - 3, \end{aligned} \quad (13)$$

where $z[n]$ is additive complex white Gaussian noise at the receiver side with zero mean and variance $\sigma_z^2$.

Power Waveforming and Reference Signal Designs for Multi-Antenna WPT

This section describes how to design the reference signal as well as the waveform at each transmit antenna for the multi-antenna PW system in order to maximize the energy delivery efficiency gain. While one may focus on a block transmission of $v[n]$ with the time duration of $N_v$ in (13), the aforementioned WPT procedures can be repeated continuously with the different or the same reference signals, i.e., $v[n]$ could be non-periodic or periodic. One can define an energy delivery efficiency gain as a ratio of the total harvested energy at the receiver and the total energy expenditure at the transmitter.

Waveform Design with Non Periodic Reference Signals:

One can first define $y=[y[0], \ldots, y[N_g+N_v+L-3]]^T$, $v=[v[0], \ldots, v[N_v-1]]^T$ and $h_m=[h_m[0], \ldots, h_m[L-1]]^T$. By rewriting (13) into a compact matrix-vector form, it gives $$y=\sqrt{P_v}\Sigma_{m=0}^{M-1} VH_m g_m + z = \sqrt{P_v}\Phi g + z, \quad (14)$$

where $g_m=[g_m[0], \ldots, g_m[N_g-1]]^T$, $z=[z[0], \ldots, z[N_g+N_v+L-3]]^T$, $H_m$ is a Toeplitz matrix of size $(N_g+L-1)\times N_g$ with the vector $[h_m^T, 0^T]^T$ as its first column, and $V$ is a Toeplitz matrix of size $(N_g+N_v+L-2)\times(N_g+L-1)$ with the vector $[v^T, 0^T]^T$ as its first column. Besides, one can define $g=[g_0^T, \ldots, g_{M-1}^T]^T$ and $\Phi=V[H_0, \ldots, H_{M-1}]$. From (33), the energy delivery efficiency gain is computed as $$E_G = \frac{1}{N_v P_v} \mathbb{E}[\|y\|_2^2] = \frac{1}{N_v P_v}(P_v g^\dagger \Phi^\dagger \Phi g + (N_g + N_v + L - 2)\cdot\sigma_z^2). \quad (15)$$

The maximization problem for the energy delivery efficiency gain is then formulated as $$(P1): \max_{g,v} g^\dagger \Phi^\dagger \Phi g \quad (16)$$

s.t.

$(C.1)\ \|g\|_2^2 = 1;$ $(C.2)\ \|v\|_2^2 = N_v.$

The joint design problem, however, is non-convex, which cannot be directly solved in its current form. To make the problem tractable, one can use an iterative method to handle the problem by alternatively updating the reference signal and the waveform. For a given reference signal v, the optimization problem for the waveform design is equivalent to an eigenvalue maximization problem; that is, the optimal waveform is given by $$g=\zeta_1[\Phi^\dagger \Phi]. \quad (17)$$

On the other hand, one can rewrite (13) as $$y=\sqrt{P_v}\Sigma_{m=0}^{M-1} \overline{H}_m G_m v + z = \sqrt{P_v}\overline{\Phi} v + z, \quad (18)$$

where $G_m$ is a Toeplitz matrix of size $(N_g+N_v-1)\times N_v$ with the vector $[g_m^T, 0^T]^T$ as its first column, $\overline{H}_m$ is a Toeplitz matrix of size $(N_g+N_v+L-2)\times(N_g+N_v-1)$ with the vector $[h_m^T, 0^T]^T$ as its first column, and $\overline{\Phi}=\Sigma_{m=0}^{M-1}\overline{H}_m G_m$. As a result, for a given waveform g, the optimization problem for designing the reference signal in (35) can be expressed as $$(P2): \max_{v} v^\dagger \overline{\Phi}^\dagger \overline{\Phi} v \quad (19)$$

s.t. $(C.1)\|v\|_2^2 = N_v.$

Accordingly, the optimal reference signal is given by $$v = \sqrt{N_v} \cdot \zeta_1[\overline{\Phi}^\dagger \overline{\Phi}]. \quad (20)$$

TABLE 1

Iterative Algorithm for Finding the Reference Signal and Waveform

1: Set the iteration number i = 0 and the maximum allowable iteration number $I_{max}$;

TABLE 1-continued

Iterative Algorithm for Finding the Reference Signal and Waveform

2: Initialize the reference signal $v^{(i)}$;
3: repeat
4:     For the given $v^{(i)}$, compute the optimal waveform $g^{(i)}$ using (17);
5:     For the given $g^{(i)}$, compute the optimal reference signal $v^{(i+1)}$ using (20);
6:     Set i ← i + 1;
7: until $\frac{1}{N_v} \| v^{(i)} - v^{(i+1)} \|_2^2 \leq \varepsilon$ or $i \geq I_{max}$.

An iterative algorithm for jointly optimizing the reference signal and the waveform is summarized in Table 1, where the reference signal v and the waveform g are alternatively updated based on the latest value obtained at iteration. The procedures are repeated until a stopping criterion is met. The stopping criterion is to check whether $$\frac{1}{N_v} \| v^{(i)} - v^{(i-1)} \|_2^2 \leq \varepsilon,$$

where $\varepsilon$ is a sufficiently small threshold, or the iteration number reaches a predefined limit $I_{max}$. From (15) and (16), the achievable energy delivery efficiency gain is thus given by $$E_G = \frac{1}{N_v P_v} (P_v \lambda_{max}[\Phi^{(i)\dagger} \Phi^{(i)}] + (N_g + N_v + L - 2)\sigma_z^2), \quad (21)$$

where $\Phi^{(i)} = V^{(i)}[H_0, \ldots, H_{M-1}]$, and matrix $V^{(i)}$ is obtained by substituting $v^{(i)}$ into V.

Figure 31A:
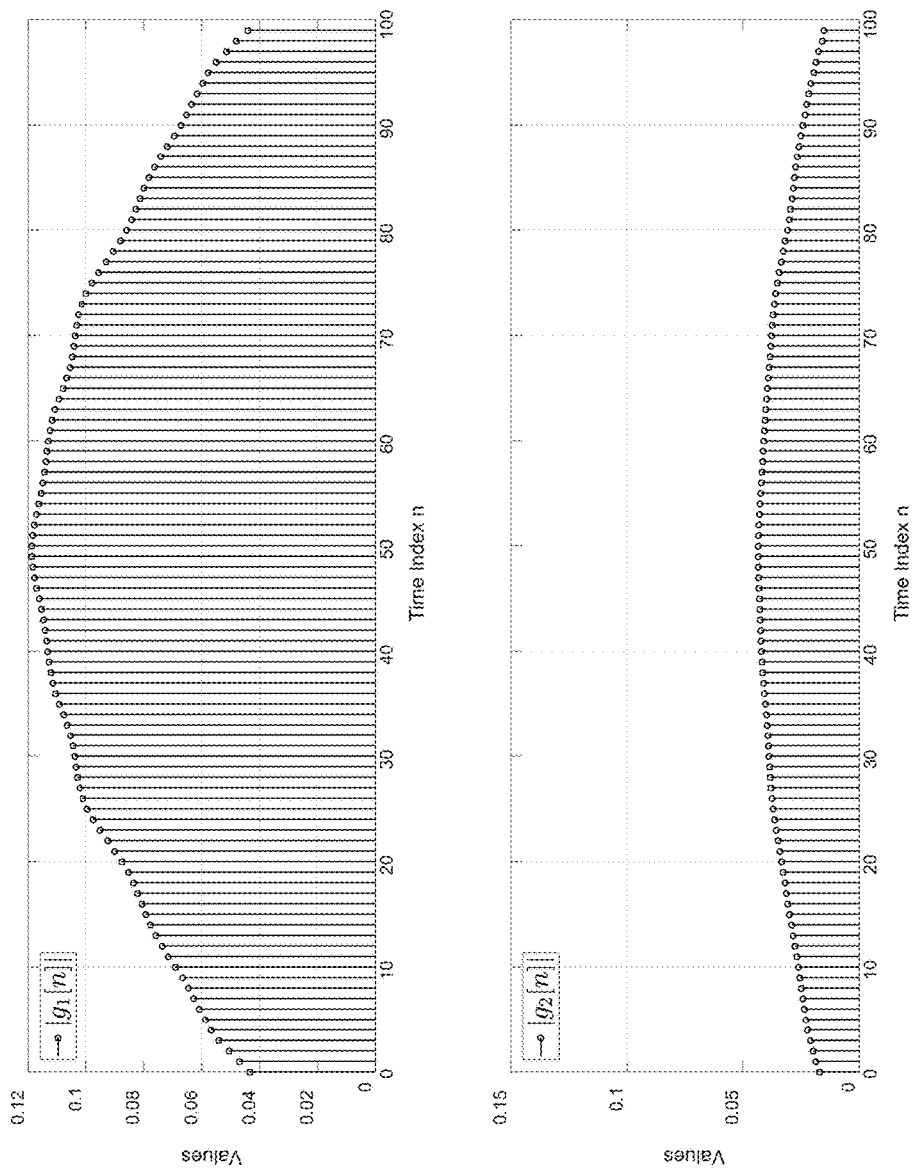
FIG. 31A-FIG. 31E shows an example of the optimal waveform in the time domain and the frequency domain, along with its relationship to $|\tilde{h}_m[k]|^2$, $|\tilde{v}[k]|^2$ and $\tilde{q}[k]$, for a given reference signal ($M=2$, $N_g=100$, $N_v=50$, and $P_v=1$), according to an embodiment of the present teaching.
Figure 31B:
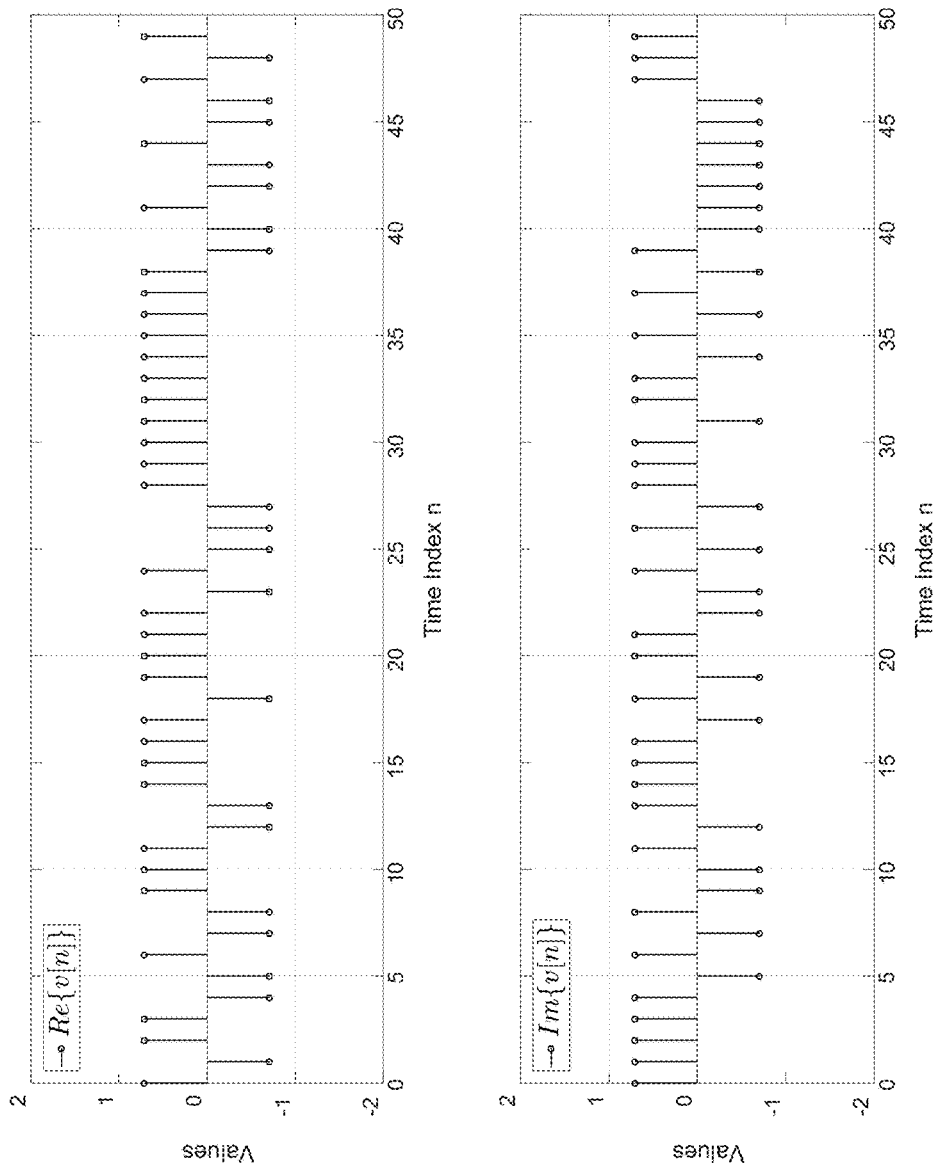
Figure 31C:
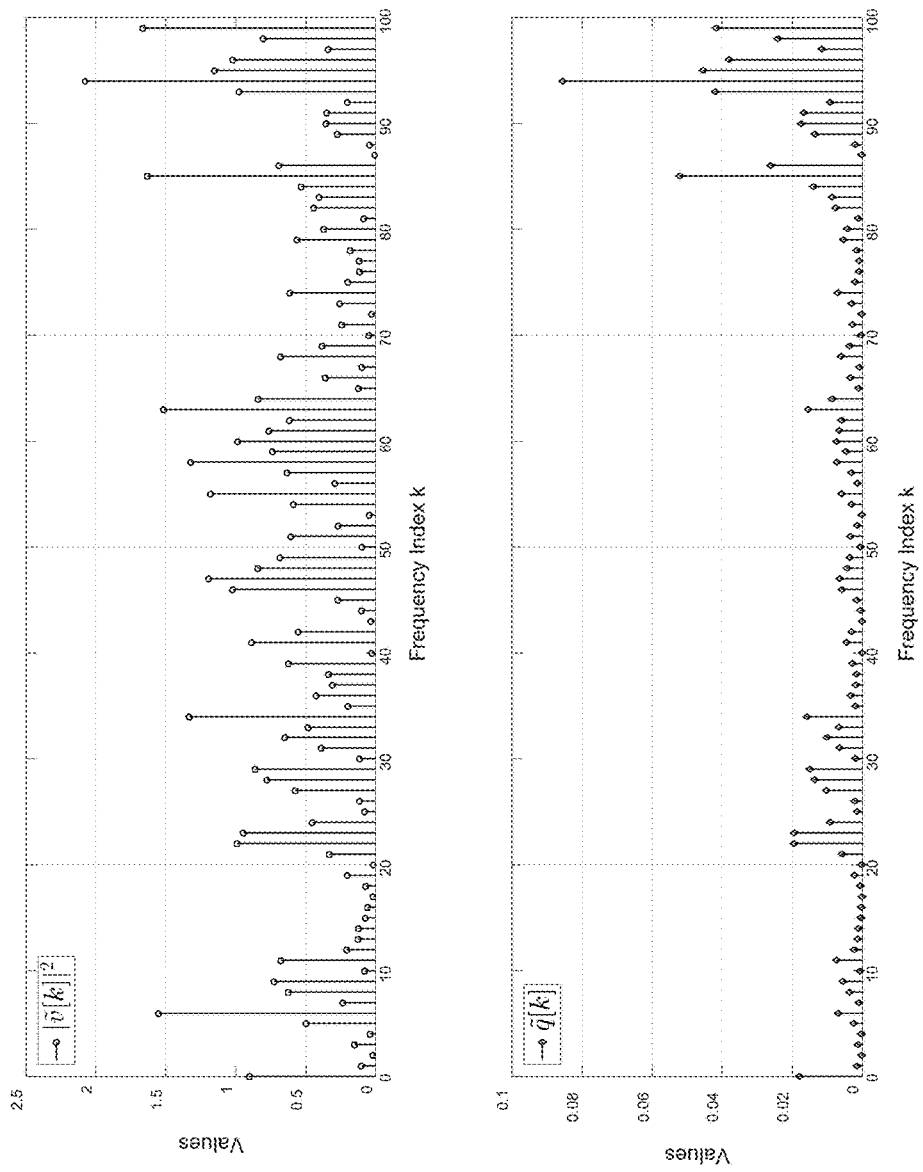
Figure 31D:
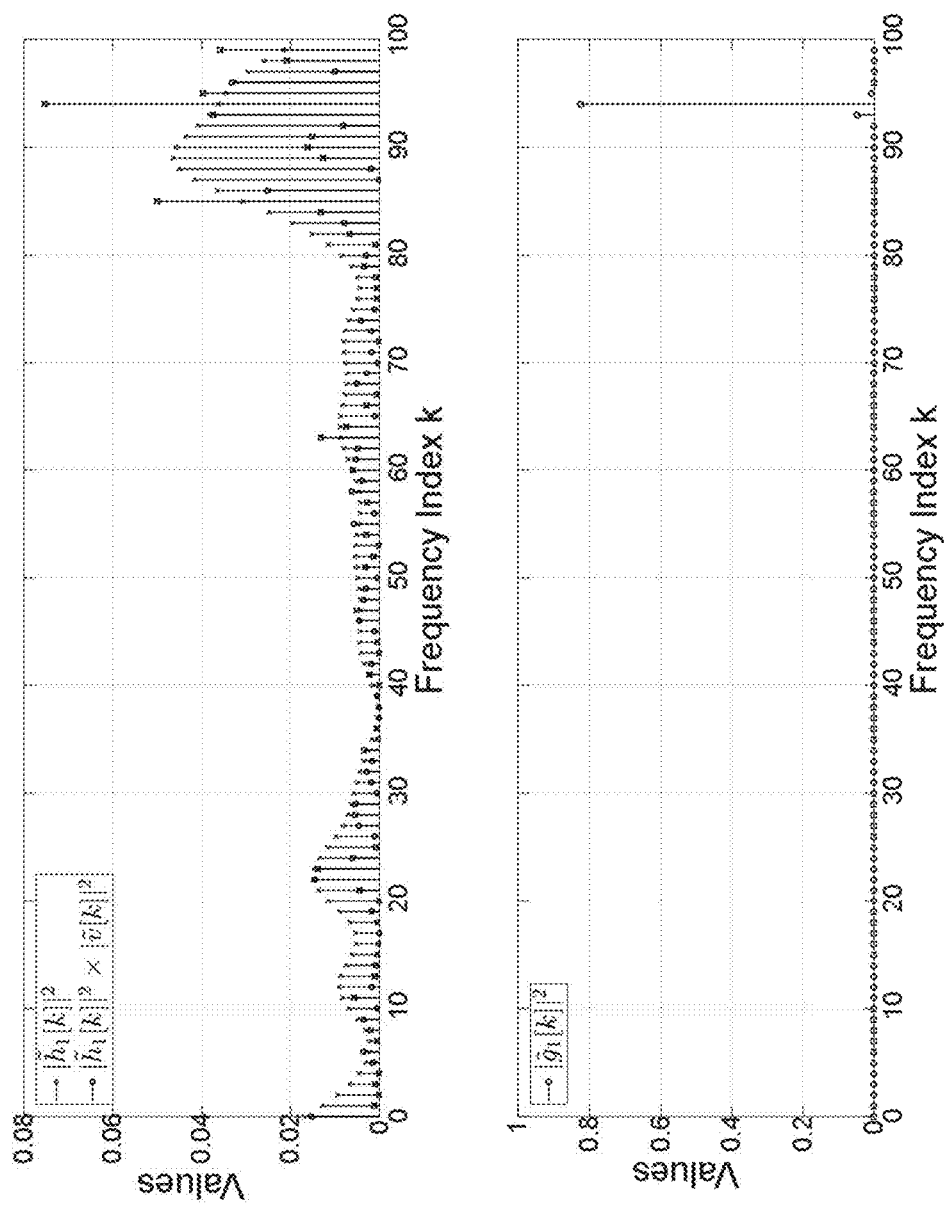
Figure 31E:
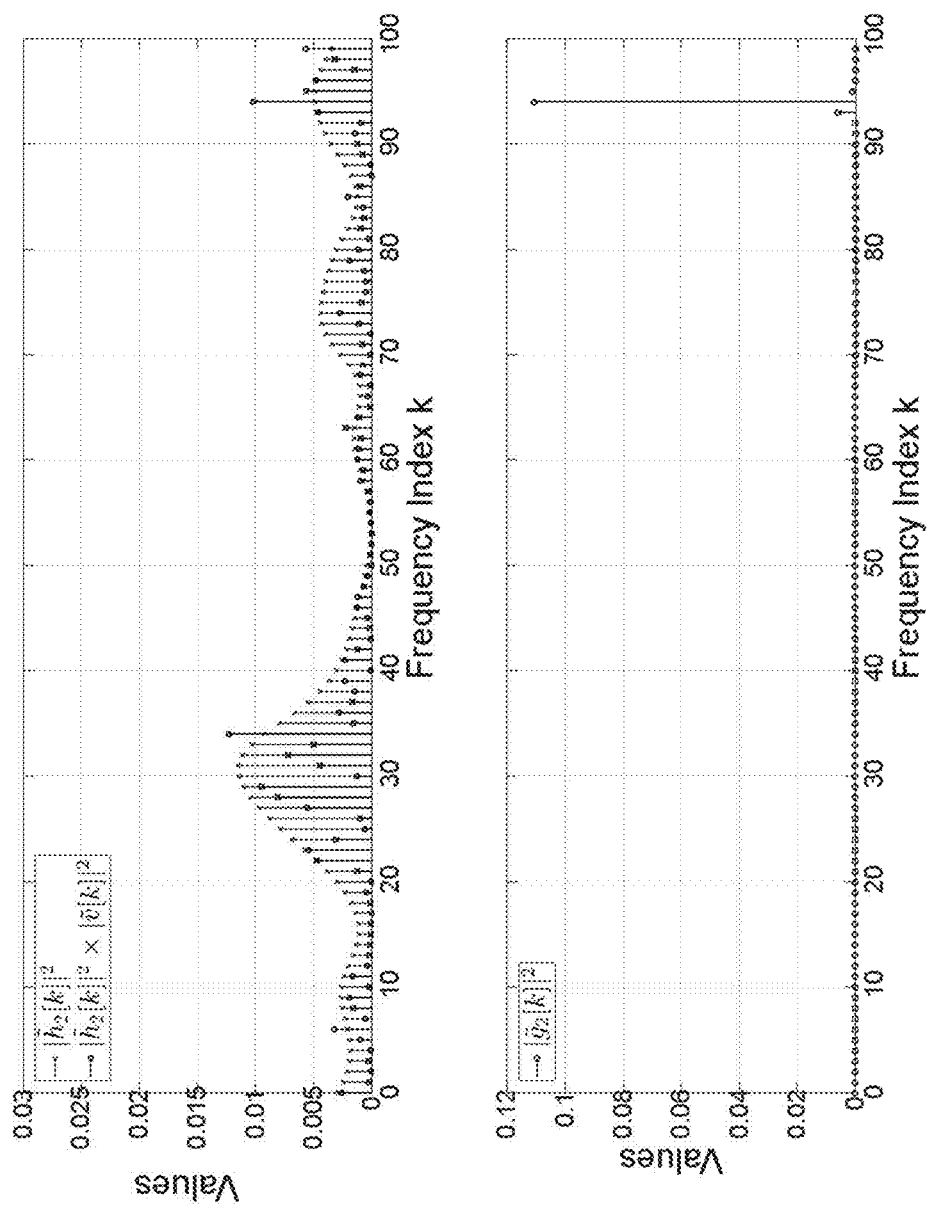

While the reference signal can be easily initialized by randomly generated complex binary signals, it is of great importance to carefully initialize the reference signal in order to achieve better WPT performance once the algorithm gets converged. To get more insight into determining a suitable initial value of $v^{(0)}$, an example of the optimal waveform in the time domain, along with its relationship to the frequency-domain representations of v[n], $g_m[n]$ and $h_m[n]$, is illustrated in FIG. 31 for a given reference signal, where M=2, $N_g$=100, $N_v$=50, and $P_v$=1. Here, a SV channel model is adopted to generate the multipath channels. An $N_{max}$-point DFT is performed for the spectrum analysis, where $N_{max}$=max{$N_g, N_v, L$}. Since the signals v[n], $g_m[n]$ and $h_m[n]$ have different lengths, they are zero-padded when applying the $N_{max}$-point DFT. The frequency-domain representations of v[n], $g_m[n]$ and $h_m[n]$ are denoted as $\tilde{v}[k]$, $\tilde{g}_m[k]$ and $\tilde{h}_m[k]$, respectively, for k=0, ..., $N_{max}$−1. Furthermore, one can define $\tilde{q}[k] = |\tilde{v}[k]|^2 \sum_{m=0}^{M-1} |\tilde{h}_m[k]|^2$, for k=0, ..., $N_{max}$−1. FIG. 31A exemplifies the optimal waveform with respect to a randomly generated reference signal v[n], whose time-domain and frequency-domain representations are given in FIG. 31B and FIG. 31C, respectively. The optimal waveforms for the two transmit antennas in the frequency domain are shown in FIG. 31D and FIG. 31E respectively, and one can make two interesting observations. First, the waveforms both concentrate its allocated power on a peak frequency tone k=94 with the largest value of $\tilde{q}[k]$. Second, at different antennas, the larger the value of $|\tilde{h}_m[k]|^2 |\tilde{v}[k]|^2$ at the peak frequency tone k=94, the more power the waveform is allocated.

From the first observation, the waveforms bear resemblance to single tones with the same frequency, and thus, the received power is in a specific formula. This motivates the initialization format of $v^{(0)}$ by condensing the power spectrum of the initial reference signal into a frequency tone with the largest value of the summation of the channel power over all the antennas, i.e., $\sum_{m=0}^{M-1} |\tilde{h}_m[k]|^2$, in order to maximize the peak value of $\tilde{q}[k]$. By doing so, the $n^{th}$ entry of initial reference signal $v^{(0)}$ is given as $$v^{(0)}[n] = e^{j \frac{2\pi k_{max} n}{N_{max}}}, n = 0, \ldots, N_v - 1, \quad (22)$$

where $$k_{max} = \arg \max_{k=0, \ldots, N_{max}-1} \sum_{m=0}^{M-1} |\tilde{h}_m[k]|^2.$$

It is noted that the initial reference signal is equivalent to a complex sinusoidal signal truncated by a rectangular window to a length of $N_v$; hence, its frequency-domain representation is essentially a sinc function centered at the $k_{max}^{th}$ frequency tone.

Waveform Design with Periodic Reference Signals:

This section discloses the optimal waveform design when the reference signal v[n] is periodically transmitted over time, i.e., $v[n]=v[n+N_v]$. From (13), since v[n] is $N_v$-periodic, the received signal at the receiver side is also $N_v$-periodic, given by $$y_c = \sqrt{P_v} \sum_{m=0}^{M-1} RH_m g_m + z_c, \quad (23)$$

where $y_c = [y[0], \ldots, y[N_v-1]]^T$, $z_c = [z[0], \ldots, z[N_v-1]]^T$, R is a generalized circulant matrix of size $N_v \times (N_g + L - 1)$, whose $j^{th}$ column is the cyclic permutation of the vector v with an offset $((j))_{N_v}$, for j=0, ..., $N_g + L - 2$. By defining $\Phi_c = R[H_0, \ldots, H_{M-1}]$, one can rewrite (23) into a compact matrix-vector form:

$$y_c = \sqrt{P_v} \Phi_c g + z. \quad (24)$$

According to the definition of the energy delivery efficiency gain, if the transmission time is sufficiently large, the energy delivery efficiency gain can be approximated as $$E_{c,G} = \frac{1}{N_v P_v} \mathbb{E}[\| y_c \|_2^2] = \frac{1}{N_v P_v} (P_v g^\dagger \Phi_c^\dagger \Phi_c g + N_v \sigma_z^2). \quad (25)$$

Under a given reference signal, the optimal waveform for maximizing the energy delivery efficiency gain in (25) can be computed as $$g_c = \zeta_1[\Phi_c^\dagger \Phi_c], \quad (26)$$

where $\hat{g} = [\hat{g}_{c,0}, \ldots, \hat{g}_{c,M-1}]^T$. Similar to the previous subsection, the reference signal and waveforms in the case of periodic transmission can be jointly optimized by following similar iterative steps in Table 1.

It can be proved that with the periodic transmission of a reference signal, the optimal waveform for each transmit antenna in (26) is endowed with a simple single-tone structure, if the lengths of the waveform and the reference signal are appropriately designed. According to (24), let $\Phi_{c,m} = RH_m$ be the $m^{th}$ submatrix of $\Phi_c$, which is also a generalized circulant matrix of size $N_v \times N_g$. Furthermore, one can define the first column of the matrix $\Phi_{c,m}$ as $\phi_m$, for m=0, ..., M-1, and its frequency representation as $\tilde{\phi}_m = [\tilde{\phi}_m[0], \ldots, \tilde{\phi}_m[N_v-1]]^T = F_{N_v} \phi_m$. The following theorem is then provided, which shows that if the waveform length is a multiple of the length of the reference signal, the optimal waveform $\hat{g}_{c,m}$ is a complex sinusoidal signal, merely composed of a single frequency component $k_{c,max}$, no matter what the reference signal is.

Theorem 1 Let $N_g = Q \cdot N_v$, where $Q$ is a positive integer. For any reference signal $v$, the optimal waveforms $\hat{g}_{c,m}$ at transmit antennas are single-tone waveforms, given by $$\hat{g}_{c,m} = \frac{\tilde{\phi}_m^*[k_{c,max}]}{\sqrt{\sum_{m=0}^{M-1} |\tilde{\phi}_m[k_{c,max}]|^2}} \left( \frac{1}{\sqrt{Q}} 1_Q \otimes (F_{N_v}^\dagger e_{k_{c,max}}) \right), \quad (27)$$

$$m = 0, \ldots, M-1,$$

where $k_{c,max} = \arg\max_{k=0,\ldots,N_v-1} \sum_{m=0}^{M-1} |\tilde{\phi}_m[k]|^2.$ Moreover, the term $\tilde{\phi}_m^*[k_{c,max}]$ represents a power allocation and phase alignment factor for the $m^{th}$ transmit antenna, while the term $$\frac{1}{\sqrt{\sum_{m=0}^{M-1} |\tilde{\phi}_m[k_{c,max}]|^2}}$$

is a power normalization factor. This simple structure offers an attractive solution for low-complexity implementation of the optimal waveform without the need of executing eigenvalue decomposition, as compared with (17) and (26).

Proof of Theorem 1 is as follows. From (25), the energy delivery efficiency gain can be upper bounded by $$E_{c,G} \leq \frac{1}{N_v P_v} (P_v \|\Phi_c\|_2^2 + N_v \sigma_z^2) \quad (28)$$

$$= \frac{1}{N_v P_v} (P_v \lambda_{max}[\Phi_c^\dagger \Phi_c] + N_v \sigma_z^2)$$

$$= \frac{1}{N_v P_v} (P_v \lambda_{max}[\Phi_c \Phi_c^\dagger] + N_v \sigma_z^2)$$

$$= \frac{1}{N_v P_v} \left( P_v \lambda_{max} \left[ \sum_{m=0}^{M-1} \Phi_{c,m} \Phi_{c,m}^\dagger \right] + N_v \sigma_z^2 \right),$$

where the relationship of $\|\Phi_c g\|_2^2 \leq \|\Phi_c\|_2^2 \|g\|_2^2$ and $\|g\|_2^2 = 1$ is applied to the first inequality. Since $N_g = QN_v$, it can be shown from (23) that $\Phi_{c,m} = RH_m = 1_Q^T \otimes \bar{\Phi}_{c,m}$, where $\bar{\Phi}_{c,m}$ is an $N_v \times N_v$ circulant matrix with $\phi_m$ as its first column. Then, it is straightforward to verify that $F_{N_v} \bar{\Phi}_{c,m} F_{N_v}^\dagger = \sqrt{N_v} \text{Diag}[\tilde{\phi}_m]$ and $F_{N_v} \Phi_{c,m} (I_Q \otimes F_{N_v})^\dagger = \sqrt{N_v} (1_Q^T \otimes \text{Diag}[\tilde{\phi}_m])$. By using the property of $F_{N_v} F_{N_v}^\dagger = F_{N_v}^\dagger F_{N_v} = I_{N_v}$ and inserting the DFT matrix into (18), one can diagonalize the matrix $\Phi_{c,m}$ as follows:

$$E_{c,G} \leq \frac{1}{N_v P_v} \left( P_v \lambda_{max} \left[ \sum_{m=0}^{M-1} F_{N_v} \Phi_{c,m} (I_Q \otimes F_{N_v})^\dagger (I_Q \otimes F_{N_v}) \Phi_{c,m}^\dagger F_{N_v}^\dagger \right] + N_v \sigma_z^2 \right) \quad (29)$$

$$= \frac{1}{N_v P_v} \left( N_v Q P_v \cdot \lambda_{max} \left[ \sum_{m=0}^{M-1} \text{Diag}[\tilde{\phi}_m] \cdot \text{Diag}[\tilde{\phi}_m]^\dagger \right] + N_v \sigma_z^2 \right).$$

Since $\lambda_{max} [\sum_{m=0}^{M-1} \text{Diag}[\tilde{\phi}_m] \cdot \text{Diag}[\tilde{\phi}_m]^\dagger] = \sum_{m=0}^{M-1} |\tilde{\phi}_m[k_{c,max}]|^2$, the energy delivery efficiency gain in (29) is finally bounded by $$E_{c,G} \leq Q \cdot \sum_{m=0}^{M-1} |\tilde{\phi}_m[k_{c,max}]|^2 + \frac{\sigma_z^2}{P_v}. \quad (30)$$

To prove this theorem, one can then show that the proposed optimal waveform in (27) can achieve the upper bound in (20). Substituting (27) into (25), one can get $$E_{c,G} = \frac{1}{N_v P_v} \left( P_v \left\| \sum_{m=0}^{M-1} \Phi_{c,m} g_{c,m} \right\|_2^2 + N_v \sigma_z^2 \right) = \frac{1}{N_v P_v} \left( P_v \quad (31) \right.$$

$$\left\| \sum_{m=0}^{M-1} \Phi_{c,m} \frac{\tilde{\phi}_m^*[k_{c,max}]}{\sqrt{\sum_{m=0}^{M-1} |\tilde{\phi}_m[k_{c,max}]|^2}} \left( \frac{1}{\sqrt{Q}} 1_Q \otimes (F_{N_v}^\dagger e_{k_{c,max}}) \right) \right\|_2^2$$

$$+ N_v \sigma_z^2 \Bigg) = \frac{1}{N_v P_v} \Bigg( P_v$$

$$\left\| F_{N_v} \sum_{m=0}^{M-1} \Phi_{c,m} \frac{\tilde{\phi}_m^*[k_{c,max}]}{\sqrt{\sum_{m=0}^{M-1} |\tilde{\phi}_m[k_{c,max}]|^2}} \left( \frac{1}{\sqrt{Q}} 1_Q \otimes (F_{N_v}^\dagger e_{k_{c,max}}) \right) \right\|_2^2$$

$$+ N_v \sigma_z^2 \Bigg),$$

where the third equality is obtained by inserting the DFT matrix $F_{N_v}$. By applying the result of $F_{N_v} \Phi_{c,m} (1_Q \otimes (F_{N_v}^\dagger e_{k_{c,max}})) = Q \sqrt{N_v} \tilde{\phi}_m[k_{c,max}] e_{k_{c,max}}$ into (21), it then yields $$E_{c,G} \leq Q \cdot \sum_{m=0}^{M-1} |\tilde{\phi}_m[k_{c,max}]|^2 + \frac{\sigma_z^2}{P_v}. \quad (32)$$

The proof is thus completed.

Based on Theorem 1, two corollaries regarding the achievable energy delivery efficiency gain and the effect of the waveform length on the WPT performance are provided in the following.

Corollary 1 When the waveform length is a multiple of the length of the reference signal, i.e., $N_g=Q \cdot N_v$, where Q is a positive integer, the energy delivery efficiency gain achieved by the optimal single-tone waveform $\hat{g}_{c,m}$ (27) is $$E_{c,G} = Q \cdot \sum_{m=0}^{M-1} |\tilde{\phi}_m[k_{c,max}]|^2 + \frac{\sigma_z^2}{P_v}. \tag{33}$$

This result is directly obtained from (32).

Corollary 2 If the waveform length $N_g$ is increased by J times, where J is a positive integer, the energy delivery efficiency gain with respect to the optimal single-tone waveform $\hat{g}_{c,m}$ in (27) can be approximately improved by J times, if $$\frac{\sigma_z^2}{P_v}$$

approaches to zero.

Proof. Consider two waveform lengths $N_{g,1}=Q \cdot N_v$ and $N_{g,2}=J \cdot N_{g,1}$. The energy delivery efficiency gains for the optimal single-tone waveform designs with the length $N_{g,1}$ and $N_{g,2}$ are denoted as $E_{c,G_1}$ and $E_{c,G_2}$, respectively. From Corollary 1, one can have $$\frac{E_{c,G_2}}{E_{c,G_1}} = \frac{JQN_v \sum_{m=0}^{M-1} |\tilde{\phi}_m[k_{c,max}]|^2 + \frac{\sigma_z^2}{P_v}}{QN_v \sum_{m=0}^{M-1} |\tilde{\phi}_m[k_{c,max}]|^2 + \frac{\sigma_z^2}{P_v}}. \tag{34}$$

If $$\frac{\sigma_z^2}{P_v}$$

is sufficiently small, the above ratio can be approximated as $$\frac{E_{c,G_2}}{E_{c,G_1}} \approx J. \tag{35}$$

From Corollary 1 and Corollary 2, it is found that the energy delivery efficiency gain achieved by the optimal single-tone waveform can be linearly increased by increasing the waveform length, if $$\frac{\sigma_z^2}{P_v}$$

is sufficiently small. In general, this condition is true because the transmit power $P_v$ is much larger than the noise power $\sigma_z^2$ in the WPT applications. Also the performance gain is determined by $\sum_{m=0}^{M-1} |\tilde{\phi}_m[k_{c,max}]|^2$, which is related to the frequency selectivity of the wireless channels and the reference signal.

One can further achieve the design structure of the optimal reference signal. Let $\bar{h}_m=[\bar{h}_m[0], \ldots, \bar{h}_m[N_v-1]]^T = F_{N_v}\bar{h}_m$, where $\bar{h}_m=[h_m^T,0^T]^T$, and define $\bar{R}$ as a circulant matrix whose first column is v. A theorem regarding the optimal reference signal is provided in the following, which implies that for the scenario of periodic transmission, the optimal reference signal is indeed a complex sinusoidal signal when the reference signal length is no smaller than the channel length.

Theorem 2 When the reference signal length is no smaller than the channel length $N_v \geq L$, the optimal reference signal for the multi-antenna PW system with periodic transmission is given by $$\hat{v}[n] = e^{j\frac{2\pi k_{c,max}n}{N_v}}, \tag{36}$$

$n = 0, \ldots, N_v - 1,$ where $k_{c,max} = \arg\max_{k=0,\ldots,N_v-1} \sum_{m=0}^{M-1} |\tilde{h}_m[k]|^2$.

Proof. By the definition of $\Phi_{c,m}=RH_m=1_Q^T \otimes \bar{\Phi}_{c,m}$ in (28), one can have $\phi_m=\bar{R}\bar{h}_m$, if $N_v \geq L$. Hence, it implies $\tilde{\phi}_m=F_{N_v}\phi_m=F_{N_v}\bar{R}\bar{h}_m$. By diagonalizing $\bar{R}$, it further gives $$\tilde{\phi}_m = F_{N_v}\bar{R}F_{N_v}^\dagger F_{N_v}\bar{h}_m = \sqrt{N_v} \text{Diag}[\tilde{v}]\tilde{h}_m, \tag{37}$$

where $\tilde{v}=F_{N_v}v$. By using (37), one can obtain $$\tilde{\phi}_m e \tilde{\phi}_m^* = \text{Diag}[\sqrt{N_v} \text{Diag}[\tilde{v}]\tilde{h}_m] \cdot \sqrt{N_v} \text{Diag}[\tilde{v}]^* \tilde{h}_m^* \tag{38}$$

$$= N_v \text{Diag}[\tilde{v}] \cdot \text{Diag}[\tilde{v}]^* \cdot \text{Diag}[\tilde{h}_m] \cdot \tilde{h}_m^*$$

$$= N_v(\tilde{v}e\tilde{v}^*)e(\tilde{h}_m e\tilde{h}_m^*).$$

From Corollary 1, it is known that the optimal reference signal can be found by maximizing $E_{c,G}$ in (33), or equivalently, maximizing $\sum_{m=0}^{M-1} |\tilde{\phi}_m[k_{c,max}]|^2$. Since $\sum_{m=0}^{M-1} \tilde{\phi}_m e\tilde{\phi}_m^* = \sum_{m=0}^{M-1} [|\tilde{\phi}_m[0]|^2, \ldots, |\tilde{\phi}_m[N_v-1]|^2]^T$, the energy delivery efficiency gain can be maximized by letting $\tilde{v}=\sqrt{N_v}e_{k_{c,max}}$, where $$k_{c,max} = \arg\max_{k=0,\ldots,N_v-1} \sum_{m=0}^{M-1} |\tilde{h}_m[k]|^2.$$

The optimal reference signal in the time domain is thus given by $$v = F_{N_v}^\dagger \tilde{v} = \sqrt{N_v} F_{N_v}^\dagger e_{k_{c,max}}.$$

Proof of Theorem 2 is complete. Also from (37) and (38) in the proof of this theorem, one can get $\tilde{\phi}_m[k]=N_v\tilde{h}_m[k]$ and $|\tilde{\phi}_m[k]|^2=N_v^2|\tilde{h}_m[k]|^2$, for $k=0, \ldots, N_v-1$, since $$\tilde{v} = \sqrt{N_v} e_{k_{c,max}}.$$

By using Theorem 1, the optimal waveform, associated with the optimal reference signal, can be explicitly expressed as $$\hat{g}_{c,m} = \frac{\tilde{h}_m^*[k_{c,max}]}{\sqrt{\sum_{m=0}^{M-1} |\tilde{h}_m[k_{c,max}]|^2}} \left( \frac{1}{\sqrt{Q}} 1_Q \otimes (F_{N_v}^\dagger e_{k_{c,max}}) \right), \quad (39)$$

$$m = 0, \ldots, M-1.$$

It is shown in the following corollary that when the waveform length is a multiple of the reference signal length and when the reference signal length is no smaller than the channel length, the energy delivery efficiency gain has a closed form and is appropriately proportional to the product of the lengths of the waveform and reference signal, if $$\frac{\sigma_z^2}{P_v}$$

is small enough.

Corollary 3 When $N_g = Q \cdot N_v$ and $N_v \geq L$, the energy delivery efficiency gain for the optimal reference signal in (36) and corresponding optimal waveform in (39) is given by $$E_{c,G} = N_g N_v \cdot \sum_{m=0}^{M-1} |\tilde{h}_m[k_{c,max}]|^2 + \frac{\sigma_z^2}{P_v}. \quad (40)$$

Proof. By using $|\tilde{\phi}_m[k]|^2 = N_v^2 |\tilde{h}_m[k]|^2$ and from Corollary 1, the energy delivery efficiency gain can be derived as $$E_{c,G} = QN_v^2 \sum_{m=0}^{M-1} \cdot |\tilde{h}_m[k_{c,max}]|^2 + \frac{\sigma_z^2}{P_v}.$$

The proof is thus completed.

Performance Analysis of Multi-Antenna PW System

One can theoretically analyze the WPT performance of the multi-antenna PW system. It is tough to analyze the WPT performance under the case of the non-periodic transmissions of reference signals. Alternatively, the WPT performance is investigated under the case of the periodic transmissions of reference signals. In addition to the average energy delivery efficiency gain, an outage probability of the average harvested energy, which is different from the conventional notation used in wireless information transmission, is taken into consideration to quantify the performance. Specifically, the outage event is defined as follows. A multi-antenna PW system is in outage, if the harvested energy is smaller than or equal to a preset threshold x.

To make the analysis tractable, it is assumed throughout this section that the waveform length is a multiple of the reference signal length and the reference signal length is a multiple of the channel length, i.e., $N_g = Q \cdot N_v$ and $N_v = C \cdot L$, where $Q$ and $C$ both take positive integer values. For the WPT applications, this is true because the lengths of the waveforms and the reference signal are in general larger than the channel length in order to achieve a higher energy delivery efficiency gain, as shown in (40). Moreover, it is almost impossible to analyze the performance for general channel power delay profiles; instead, one can consider a uniform power delay (UPD) channel profile, i.e., $$\rho_{m,l} = \frac{1}{L}$$

in (11), and investigate the impact of the numbers of multipaths and antennas on the WPT performance. From Corollary 3, one can observe that both the average energy delivery efficiency gain and the outage performance of the average harvested energy are mainly influenced by the channel frequency selective fading effect $\Sigma_{m=0}^{M-1} |\tilde{h}_m[k_{c,max}]|^2$. To facilitate the analysis, a performance lower bound for the energy delivery efficiency gain in (40) under the UPD channel profile is given in the following lemma, which states that the performance lower bound is relevant to the maximum value of $\Sigma_{m=0}^{M-1} |\tilde{u}_m[k]|^2$, the summation of the power of the L-point channel frequency responses over transmit antennas. Furthermore, this lower bound can be reached when the length of the reference signal is identical to the number of multipaths or the number of multipaths for each channel link is equal to one.

Lemma 1 When $N_g = Q \cdot N_v$ and $N_v = C \cdot L$, the energy delivery efficiency gain for the optimal reference signal in (36) and the corresponding optimal waveform in (39) under the UPD channel profile can be lower bounded by $$E_{c,G} \geq N_g L \sum_{m=0}^{M-1} |\tilde{u}_m[k_{c,max}]|^2 + \frac{\sigma_z^2}{P_v}, \quad (41)$$

where $\tilde{u}_m = [\tilde{u}_m[0], \ldots, \tilde{u}_m[L-1]]^T = F_L h_m$, and $k_{c,max} = \arg \max_{k=0,\ldots,L-1} \sum_{m=0}^{M-1} |\tilde{u}_m[k]|^2$.

Moreover, the equality in (41) holds for C=1 or L=1.

Proof. From the definition of $\tilde{h}_m = F_{N_v} \bar{h}_m$ and $N_v = C \cdot L$, it gives $$\tilde{h}_m[Ck+l] = \sqrt{\frac{L}{N_v}} \left( \frac{1}{\sqrt{L}} \sum_{n=0}^{L-1} h_m[n] e^{0,j\frac{2\pi kn}{L}} e^{-j\frac{2\pi ln}{N_v}} \right), \quad (42)$$

$$k = 0, \ldots, L-1, l = 0, \ldots, C-1.$$

By using $\tilde{u}_m = F_L h_m$, one can obtain the relationship between $\tilde{h}_m[k]$ and $\tilde{u}_m[k]$:

$$\tilde{h}_m[Ck] = \sqrt{\frac{L}{N_v}} \tilde{u}_m[k], \quad (43)$$

$$k = 0, \ldots, L-1.$$

It then implies from (43) that $$\max_{k=0,\ldots,N_v-1} \sum_{m=0}^{M-1} |\tilde{h}_m[k]|^2 \geq \max_{k=0,\ldots,L-1} \sum_{m=0}^{M-1} |\tilde{h}_m[Ck]|^2 = \quad (44)$$

$$\max_{k=0,\ldots,L-1} \frac{L}{N_v} \sum_{m=0}^{M-1} |\tilde{u}_m[k]|^2,$$

where the inequality in (44) becomes active for C=1. Note that for L=1, the inequality is also active because $$|\tilde{h}_m[k]|^2 = \frac{1}{N_v}|h_m[0]|^2$$

for all k according to (42). From Corollary 3 and (44), the proof is thus completed.

For the convenience of notation, let $\mu_k = \sum_{m=0}^{M-1}|\tilde{u}_m[k]|^2$, for $k=0, \ldots, L-1$, and $\mu = [\mu_0, \ldots, \mu_{L-1}]^T$. The characteristic function of the multivariate random vector $\mu$ is provided as follows.

Lemma 2 Let $\omega = [\omega_0, \ldots, \omega_{L-1}]^T$. The characteristic function of $\mu$ under the UPD channel profile is $$\Psi_\mu(j\omega) = \left(\prod_{l=0}^{L-1}\frac{L}{L-j\omega_l}\right)^M. \quad (45)$$

Proof. Let $\mu_m = [\mu_{m,0}, \ldots, \mu_{m,L-1}]^T$, where one can define $\mu_{m,k} = |\tilde{u}_m[k]|^2$. It can be shown that the characteristic function of $\mu_m$ under the UPD channel profile can be derived as $$\Psi_{\mu_m}(j\omega) = \prod_{l=0}^{L-1}\frac{L}{L-j\omega_l}. \quad (46)$$

Since the random vectors $\mu_m$ are independent for different transmit antennas and $\mu = \sum_{m=0}^{M-1}\mu_m$, it results in $\Psi_\mu(j\omega) = \prod_{m=0}^{M-1}\Psi_{\mu_m}(j\omega)$. Hence, the proof is completed. By applying (25) and Lemma 1, the average harvested energy during a time period of $N_v$ can be explicitly computed by $$E_H \triangleq \frac{1}{N_v}\mathbb{E}[\|y_c\|_2^2] = P_v E_{c,G},$$

and thus, it is lower bounded by $$E_H \geq N_g P_v L \cdot \mu_{k_c,max} + \sigma_z^2. \quad (47)$$

Accordingly, a theorem regarding an upper bound for the outage performance of the average harvested energy is provided in the following.

Theorem 3 When $N_g = Q \cdot N_v$ and $N_v = C \cdot L$, the outage performance of the average harvested energy $E_H$ for the optimal reference signal in (36) and the corresponding optimal waveform in (39) under the UPD channel profile is upper bounded by $$Pr(E_H \leq x) \leq \left(\frac{1}{(M-1)!}\cdot\gamma\left(M, \frac{1}{N_g P_v}(x-\sigma_z^2)\right)\right)^L, \quad (48)$$

where $\gamma(s,x) = \int_0^x t^{s-1}e^{-t}dt$ is the lower incomplete Gamma function, and the equality of the upper bound holds for $C=1$ or $L=1$.

Proof. By applying the characteristic function in (45), the cumulative distribution function (CDF) of $\mu$ can be expressed in terms of $\Psi_\mu(j\omega)$ as follow:

$$Pr(\mu_0 \leq x_0, \mu_1 \leq x_1, \ldots, \mu_{L-1} \leq x_{L-1}) = \quad (49)$$

$$\frac{1}{(2\pi)^L}\int_{-\infty}^{\infty}\cdots\int_{-\infty}^{\infty}\Psi_\mu(j\omega)\times\prod_{l=0}^{L-1}\left(\frac{1-e^{-j\omega_l x_l}}{j\omega_l}\right)d\omega_0\ldots d\omega_{L-1},$$

where $x = [x_0, \ldots, x_{L-1}]^T$. Since $$\mu_{k_c,max} = \max_{k=0,\ldots L-1}\mu_k,$$

the CDF of the random variable $\mu_{k_c,max}$ is obtained by setting $x_0 = \ldots = x_{L-1} = x$ in (49):

$$Pr(\mu_{k_c,max} \leq x) = \quad (50)$$

$$\frac{1}{(2\pi)^L}\int_{-\infty}^{\infty}\cdots\int_{-\infty}^{\infty}\Psi_\mu(j\omega)\times\prod_{l=0}^{L-1}\left(\frac{1-e^{-j\omega_l x}}{j\omega_l}\right)d\omega_0\ldots d\omega_{L-1}.$$

From (45) and (50), the CDF of the random variable $\mu_{k_c,max}$ can be explicitly derived as $$Pr(\mu_{k_c,max} \leq x) = \quad (51)$$

$$\frac{1}{(2\pi)^{L-1}}\int_{-\infty}^{\infty}\cdots\int_{-\infty}^{\infty}\prod_{l=1}^{L-1}\left(\left(\frac{L}{L-j\omega_l}\right)^M\cdot\frac{1-e^{-j\omega_l x}}{j\omega_l}\right)\cdot$$

$$\left(\frac{1}{2\pi}\int_{-\infty}^{\infty}\left(\frac{L}{L-j\omega_0}\right)^M\cdot\frac{1-e^{-j\omega_0 x}}{j\omega_0}d\omega_0\right)$$

$$d\omega_1\ldots d\omega_{L-1} = \left(\frac{1}{(M-1)!}\cdot\gamma(M, Lx)\right)^L,$$

where the relationship between the CDF function and the characteristic function of the Erlang distribution is applied in the last equality of (51) as follows:

$$\frac{1}{2\pi}\int_{-\infty}^{\infty}\left(\frac{\beta}{\beta-j\omega}\right)^M\left(\frac{1-e^{-j\omega x}}{j\omega}\right)d\omega = \frac{1}{(M-1)!}\cdot\gamma(M,\beta x), \quad (52)$$

where $\gamma(s,x) = \int_0^x t^{s-1}e^{-t}dt$ is the lower incomplete Gamma function. By using (47), the outage performance of the average harvested energy $E_H$ is upper bounded by $$Pr(E_H \leq x) \leq Pr(N_g P_v L\cdot\mu_{k_c,max} + \sigma_z^2 \leq x). \quad (53)$$

From (51) and (53), it is concluded that the upper bound of the outage performance is given as in (48), and by further applying Lemma 1, one can know that the upper bound becomes tight for $C=1$ or $L=1$. Proof of Theorem 3 is complete.

One can show a theorem about the lower bound of the average energy delivery efficiency gain for the optimal reference signal in (36) and the corresponding optimal waveform in (39) under the UPD channel profile, when the waveform length is a multiple of the reference signal length and the reference signal length is a multiple of the channel length.

Theorem 4 When $N_g = Q\cdot N_v$ and $N_v = C\cdot L$, the average energy delivery efficiency gain for the optimal reference signal in

(36) and the corresponding optimal waveform in (39) under the UPD channel profile is lower bounded by $$\mathbb{E}[E_{c,G}] \geq N_g L \left( \sum_{l=1}^{L} \binom{L}{l}(-1)^{l+1} \sum_{k=0}^{(M-1)l} b_k(M,L,l)\left(\frac{1}{lL}\right)^{k+1} k! \right) + \frac{\sigma_z^2}{P_v}, \quad (54)$$

in which $b_k(M,L,l)$ is the coefficient of $x^k$, for $k=0, \ldots, (M-1)l$, in the expansion of $$\left( \sum_{k=0}^{M-1} \frac{L^k x^k}{k!} \right)^l, \text{ and} \quad (55)$$

$$\binom{n}{k} = \frac{n!}{k!(n-k)!}.$$

Proof. The lower incomplete Gamma function in (51) can be expressed in a form of power series expansion:

$$\gamma(M, Lx) = \Gamma(M) \cdot \left( 1 - e^{-Lx} \sum_{k=0}^{M-1} \frac{L^k x^k}{k!} \right), \quad (56)$$

where $\Gamma(M)=(M-1)!$ is the Gamma function. Since $\mu_{k_c,max} \geq 0$, the mean of the random variable $\mu_{k_c,max}$ can be directly computed through its CDF as follows:

$$\mathbb{E}[\mu_{k_c,max}] = \int_0^\infty (1 - Pr(\mu_{k_c,max} \leq x)) dx. \quad (57)$$

By substituting (51) and (56) into (57) and applying the binomial theorem, it leads to $$\mathbb{E}[\mu_{k_c,max}] = \int_0^\infty \left( 1 - \left( 1 - e^{-Lx} \sum_{k=0}^{M-1} \frac{L^k x^k}{k!} \right)^L \right) dx \quad (58)$$

$$= \int_0^\infty \left( \sum_{l=1}^{L} \binom{L}{l}(-1)^{l+1} e^{-lLx} \left( \sum_{k=0}^{M-1} \frac{L^k x^k}{k!} \right)^l \right) dx$$

$$= \sum_{l=1}^{L} \binom{L}{l}(-1)^{l+1} \sum_{k=0}^{(M-1)l} b_k(M,L,l) \int_0^\infty e^{-lLx} x^k dx.$$

By change of variables, the integral in (58) can be further rewritten as $$\int_0^\infty e^{-lLx} x^k dx = \left(\frac{1}{lL}\right)^{k+1} \int_0^\infty t^k e^{-t} dt = \left(\frac{1}{lL}\right)^{k+1} \Gamma(k+1). \quad (59)$$

Hence, one can get $$\mathbb{E}[\mu_{k_c,max}] = \quad (60)$$

$$\sum_{l=1}^{L} \binom{L}{l}(-1)^{l+1} \sum_{k=0}^{(M-1)l} b_k(M,L,l)\left(\frac{1}{lL}\right)^{k+1} \Gamma(k+1).$$

From Lemma 1 and (60), the proof is completed.

Theorem 4 gives two immediate remarks for the operation of the disclosed PW systems in two special cases: 1) multi-antenna PW systems in flat fading channels (L=1) and 2) single-antenna PW systems in frequency selective fading channels (M=1), which provides an important insight into understanding the influence of the numbers of multipaths and transmit antennas on the power transfer performance.

Remark 1: For flat fading channels with one tap channel profile L=1, the average energy delivery efficiency gain is exactly given by $$\mathbb{E}[E_{c,G}] = N_g M + \frac{\sigma_z^2}{P_v}, \text{ since}$$

$$b_k(M,1,1) = \frac{1}{k!}, \text{ for } k = 0, \ldots, M-1.$$

It is observed that the efficiency is proportional to the waveform length and the number of antennas, as long as $P_v$ is sufficiently larger then the noise power Interestingly, this indicates that even in a flat fading channel, the proposed system is capable of improving the delivery efficiency gain via waveforming.

Remark 2: For single-antenna PW system M=1, the average energy delivery efficiency gain is lower bounded by $$\mathbb{E}[E_{c,G}] \geq N_g \sum_{l=1}^{L} \binom{L}{l}(-1)^{l+1} \frac{1}{l} + \frac{\sigma_z^2}{P_v}, \text{ since}$$

$$b_0(1,L,l) = 1, \text{ for } l = 1, \ldots, L.$$

Actually, the summation term over the index 1 is equal to $$\sum_{l=1}^{L} \frac{1}{l},$$

and one can have $$\mathbb{E}[E_{c,G}] \geq N_g \sum_{l=1}^{L} \frac{1}{l} + \frac{\sigma_z^2}{P_v},$$

which concludes that the efficiency is increased as the number of multipaths increases. In other words, one can possibly increase the system bandwidth to improve the efficiency by digitally resolving the naturally existing multipaths in wireless environments as many as possible.

Simulation Results of Multi-Antenna PW System

Computer simulations are conducted to demonstrate the performance of the multi-antenna PW systems and to substantiate the analytical findings on the average energy delivery efficiency gain and the outage performance of average harvested energy. One can set $P_v=1$ and normalize the large-scale path loss because the focus is on the WPT performance gain achieved by the multi-antenna PW technology. In addition to a UPD channel profile, i.e., setting $$\rho_{m,l} = \frac{1}{L}$$

in (1), a Saleh-Valenzuela (SV) channel model in IEEE 802.15.4a UWB communication standard is adopted in the simulation. This channel model is typically considered in wideband applications over a central frequency ranging between 2 GHz and 6 GHz. The system bandwidth is set as 125 MHz, i.e., the sampling period $T_S$=8 ns, and the number of resolvable multipaths is around several dozens with respect to the considered channel bandwidth. Notice that a larger bandwidth is configured for the multi-antenna PW system to digitally resolve the naturally existing multipaths during the channel probing phase, and the estimated CIR is then utilized for the calculation of waveforms and reference signals during the power transfer phase. Otherwise, the estimated CIR is likely to be a single tap in spite of abundant multipaths in wireless environments. One can ignore the noise power by setting $\sigma_z^2$=0, since the required signal power for wirelessly charging (at least 10 dBm) is much higher than the common noise power level (−93 dBm at 125 MHz bandwidth). The default values in the stopping criterion of the proposed algorithm in Table 1 are set as $\varepsilon=10^{-3}$ or $I_{max}$=3. In addition, the WPT performance of the conventional narrow-band beamforming scheme is included for performance comparison.

Figure 32:
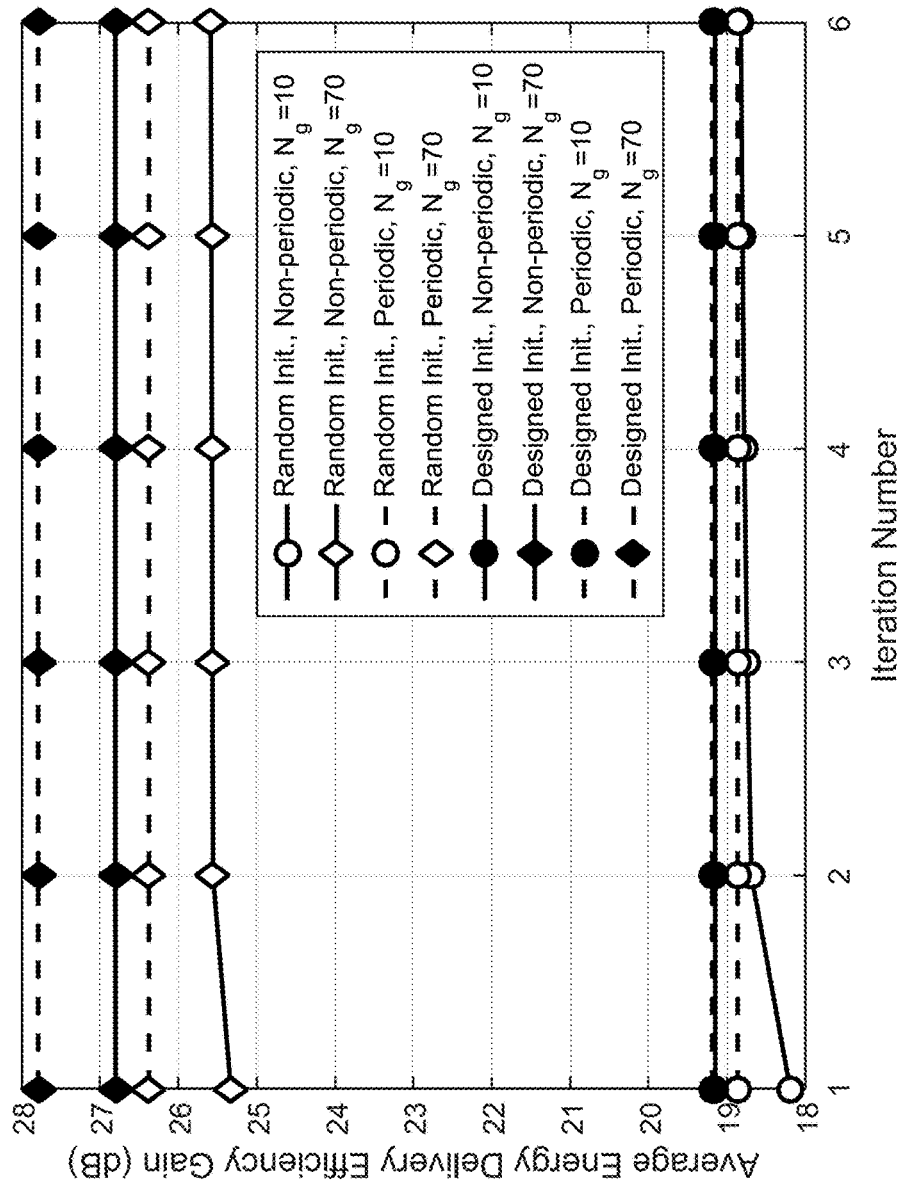
FIG. 32 shows an exemplary average energy delivery efficiency gain of the disclosed PW system with the random and designed initialization for various iteration numbers in the UWB Saleh-Valenzuela (SV) channels (M=4 and $N_v$=100), according to an embodiment of the present teaching.

FIG. 32 shows the average energy delivery efficiency gain using the algorithm in Table 1 with the random and designed initialization for various iteration numbers in the UWB SV channels. The number of transmit antennas and the length of reference signals are given by M=4 and $N_v$=100, respectively. For the random initialization, the reference signal is initialized with complex binary signals, i.e., $$v[n] \in \left\{ \pm \frac{1}{\sqrt{2}} \pm j \frac{1}{\sqrt{2}} \right\}.$$

One can make two observations from this figure. First, for a given initialization scheme and a fixed waveform length, the multi-antenna PW system with the periodic transmission of reference signals can achieve better converged performance than that with the non-periodic transmission. Second, the disclosed system with the designed initialization outperforms that with the random initialization, and its performance can quickly get converged within two iterations. Hence, the designed initialization scheme is utilized throughout the following simulation.

Figure 33:
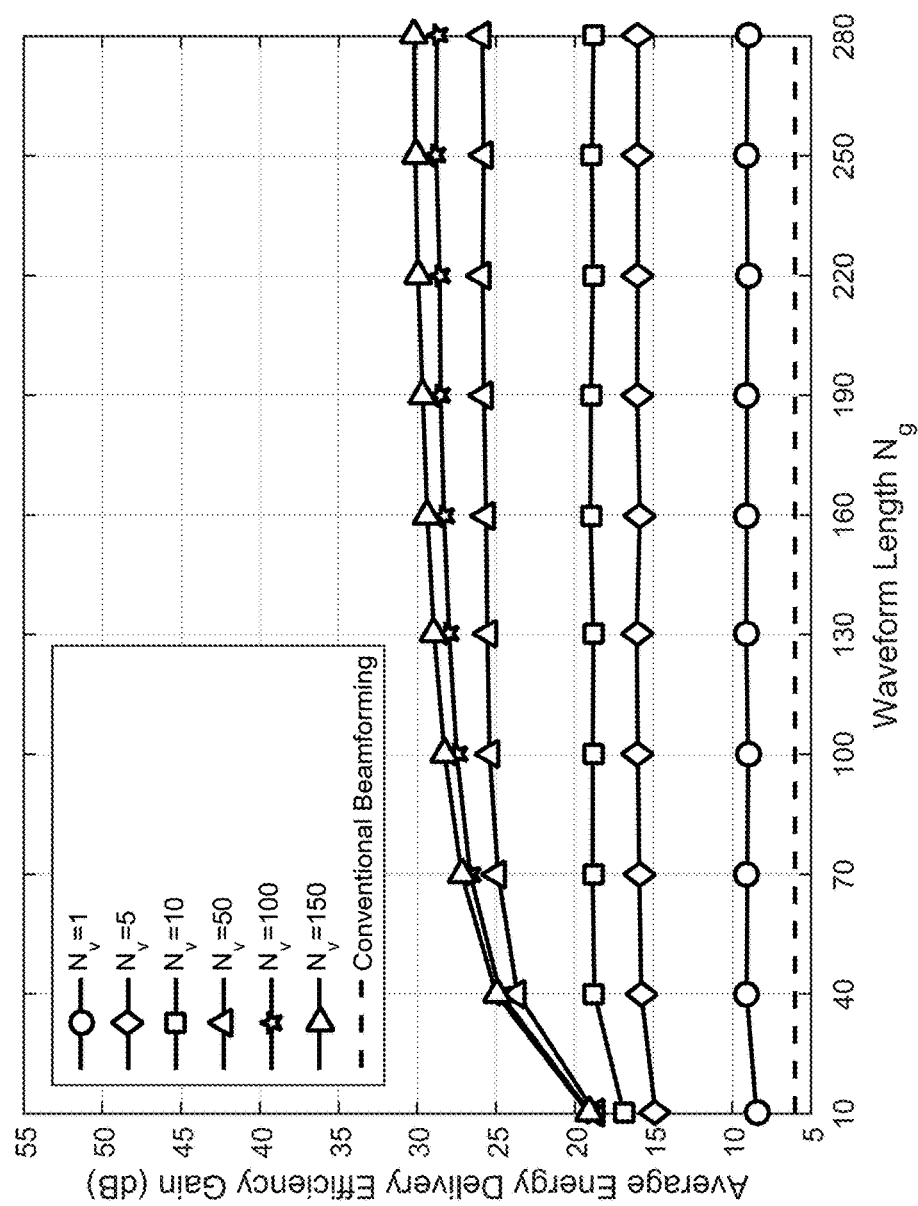
FIG. 33 shows an exemplary average energy delivery efficiency gain of the disclosed PW system with the non-periodic transmission of reference signals for different lengths of waveforms and reference signals in the UWB SV channels (M=4), according to an embodiment of the present teaching.
Figure 34:
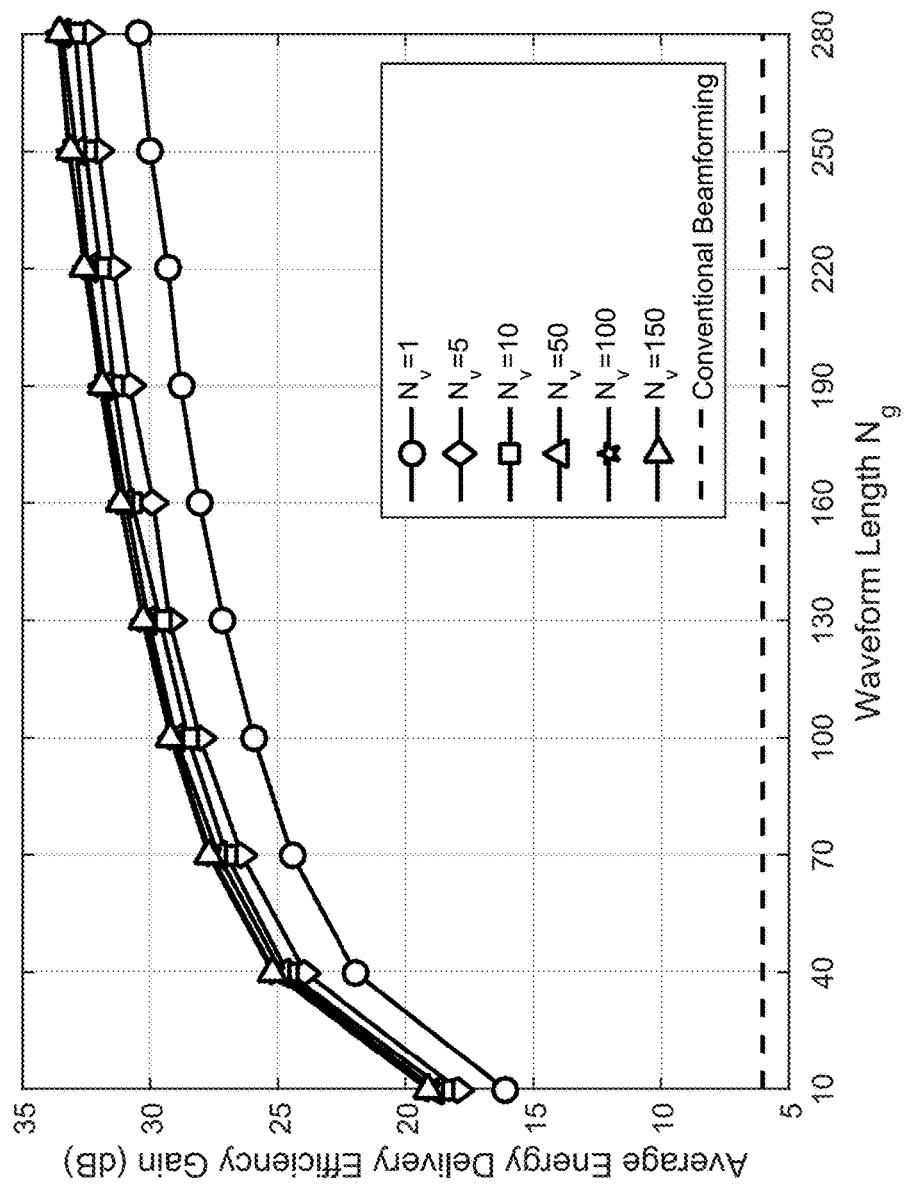
FIG. 34 shows an exemplary average energy delivery efficiency gain of the disclosed PW system with the periodic transmission of reference signals for different lengths of waveforms and reference signals in the UWB SV channels (M=4), according to an embodiment of the present teaching.

FIG. 33 and FIG. 34 show the average energy delivery efficiency gain with the non-periodic and periodic transmissions of reference signals, respectively, for different lengths of waveforms and reference signals in the UWB SV channels. The number of transmit antennas is given by M=4. For the case of non-periodic transmission, it is found that the average energy delivery efficiency gain can be dramatically improved by increasing the lengths of waveforms or reference signals. Taking an example of $N_g$=280, the performance improvement is as large as 22 dB when k is increased from 1 to 150. One can also see that the performance improvement becomes moderate as the values of $N_v$ and $N_g$ increase. Similar performance trends can be observed for the case of periodic transmission in FIG. 34. For $N_v$=150 and $N_g$=280, the average energy delivery efficiency gain of the disclosed multi-antenna PW system is around 34 dB, whereas the conventional beamforming with four transmit antennas can only achieve a performance gain of 4 dB. It is demonstrated from these two figures that for given values of $N_v$ and $N_g$, the performance of the multi-antenna PW system with the periodic transmission of reference signals is much superior to that with the non-periodic transmission.

Figure 35:
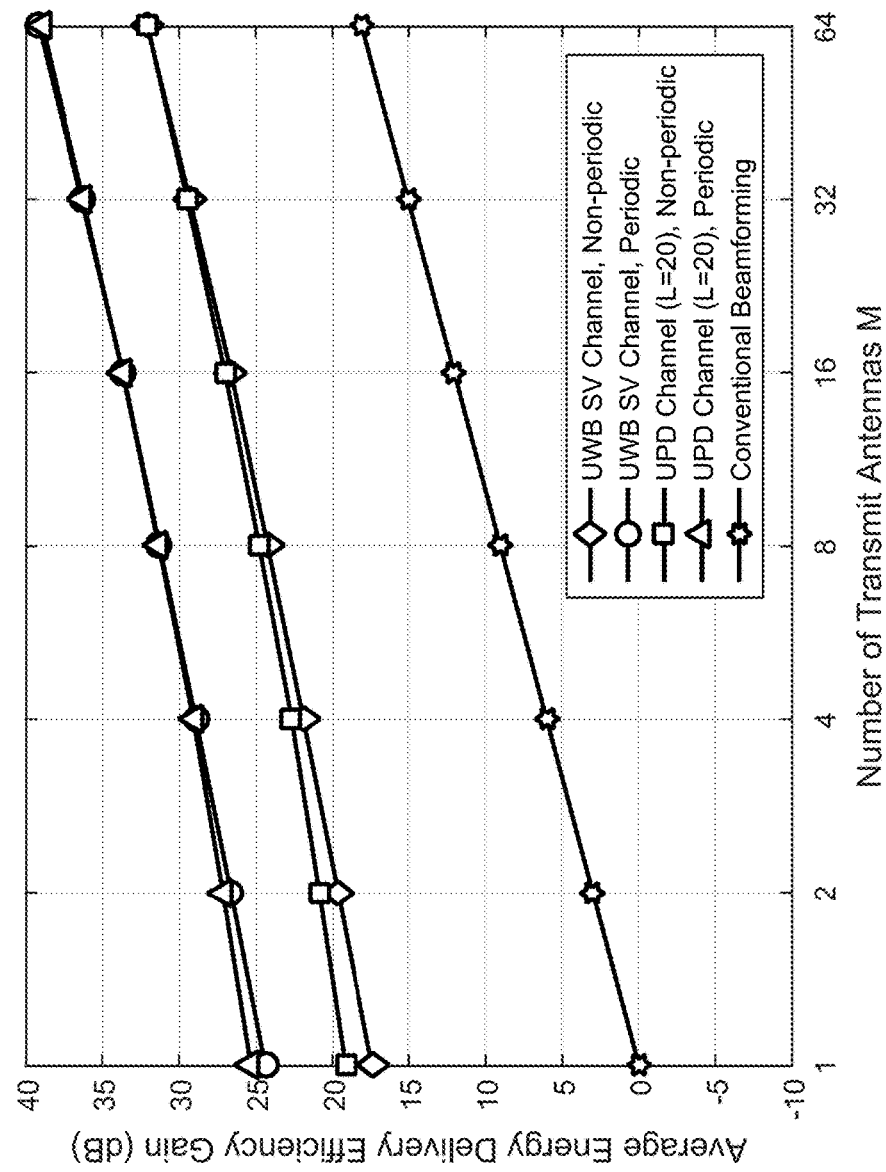
FIG. 35 shows an exemplary comparisons of average energy delivery efficiency gains between the multi-antenna PW system and the conventional beamforming system for various numbers of transmit antennas in the UWB SV and the UPD channels ($N_g$=$N_v$=100), according to an embodiment of the present teaching.

FIG. 35 compares the performances of the multi-antenna PW system and the conventional beamforming system, in terms of the average energy delivery efficiency gain. The lengths of the waveforms and the reference signals are given by $N_g$=$N_v$=100, and the number of multipaths in the UPD channel profile is set as L=20. One can see that the energy delivery efficiency gain of the multi-antenna PW system with the periodic transmission of reference signals is 5 dB better than that with the non-periodic transmission for various numbers of transmit antennas. Furthermore, it exhibits that the multi-antenna PW systems with the non-periodic or periodic transmissions of reference signals outperform the conventional beamforming scheme under both the UWB SV and UPD channel models. This is due to the fact that the proposed multi-antenna PW system is capable of constructively accumulating all the possibly available multipath power in both spatial and temporal domains. As compared with the conventional beamforming scheme, a significant performance gap of around 25 dB is observed for the PW system with the periodic reference signals and M=1, while the gap becomes slightly narrow (approximately, 22 dB) when the number of transmit antennas is increased up to 64.

Figure 36:
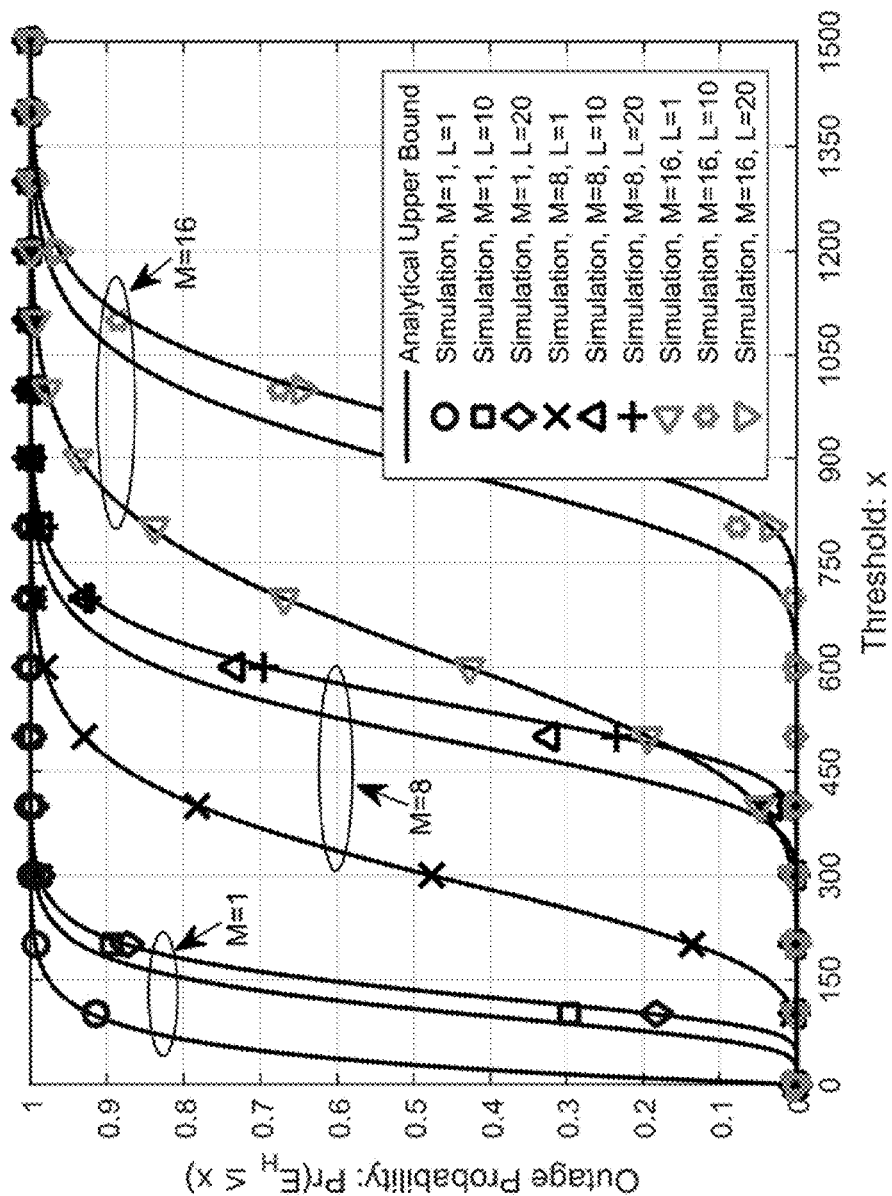
FIG. 36 shows an exemplary outage performance of the average harvested energy and the analytical upper bound for the multi-antenna PW systems with the periodic transmission of reference signals under the UPD channel profile ($N_v$=20 and $N_g$=40), according to an embodiment of the present teaching.
Figure 37:
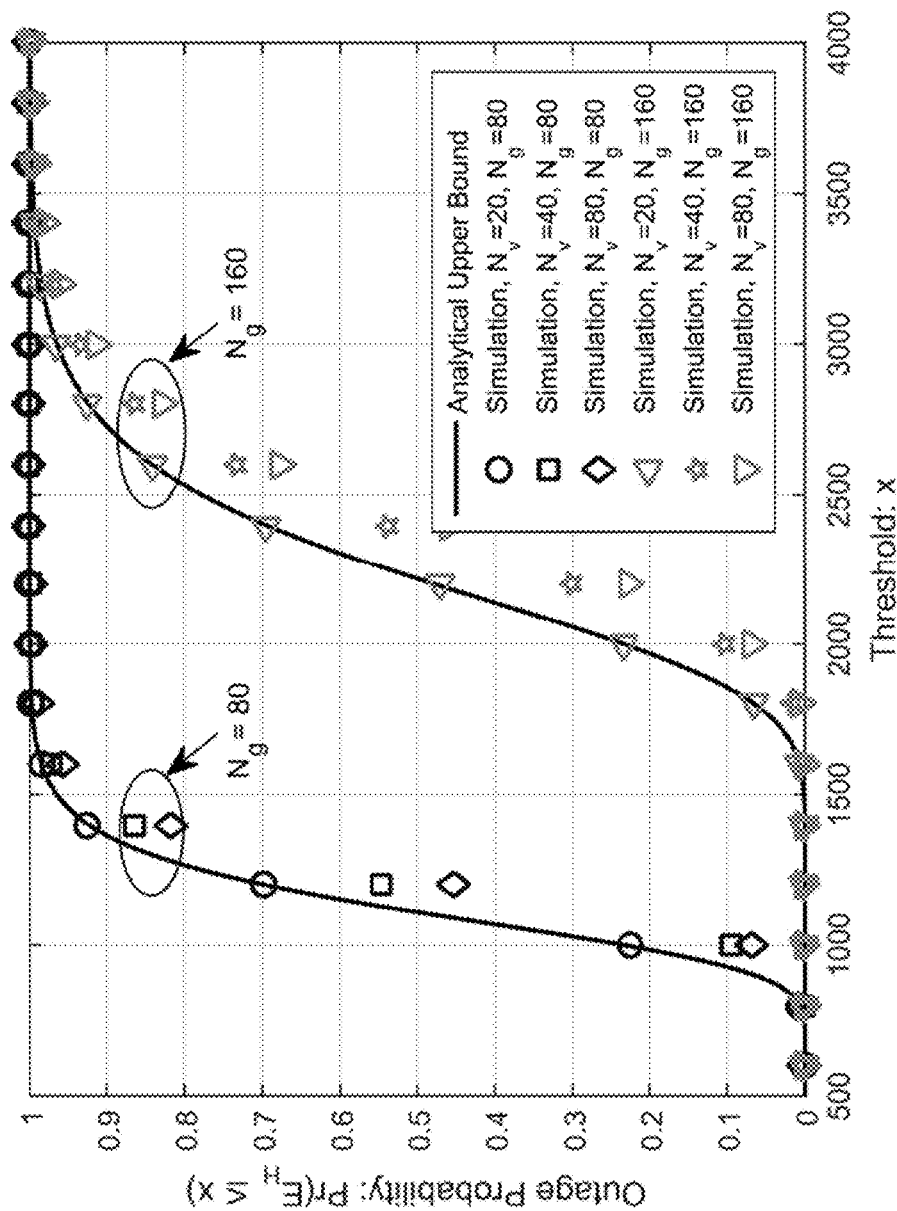
FIG. 37 shows an exemplary outage performance of the average harvested energy and the analytical upper bound for different lengths of waveforms and reference signals under the UPD channel profile (M=8 and L=20), according to an embodiment of the present teaching.

FIG. 36 shows the exact outage probability of the average harvested energy and the derived upper bound given in (38) under the UPD channel profile for various numbers of transmit antennas and multipaths. The lengths of periodic reference signals and waveforms are set as $N_v$=20 and $N_g$=40, respectively. Obviously, the outage performance gets better when the numbers of transmit antennas and multipaths increase owing to the higher frequency-selective and antenna gains on the combined channel frequency responses. As expected, the analytical results are in close agreement with the simulation results when $N_v$=L=20 or L=1, thereby validating the correctness of the proposed analytical expressions in Theorem 3. In addition, it is clearly observed that the upper bounds are quite tight for the cases with L=10. In order to verify the tightness of the derived upper bound under different lengths of waveforms and reference signals, the simulation results and analytical results for the outage performance are compared in FIG. 37, where one can set M=8 and L=20 for the UPD channel profile. One can find that the outage probability decreases as the values of $N_v$ and $N_g$ increase. Again the analytical results for the upper bounds are very close to the simulated ones when $N_v$=L=20. As the value of k increases, the difference between the two performance results slightly increases.

Figure 38:
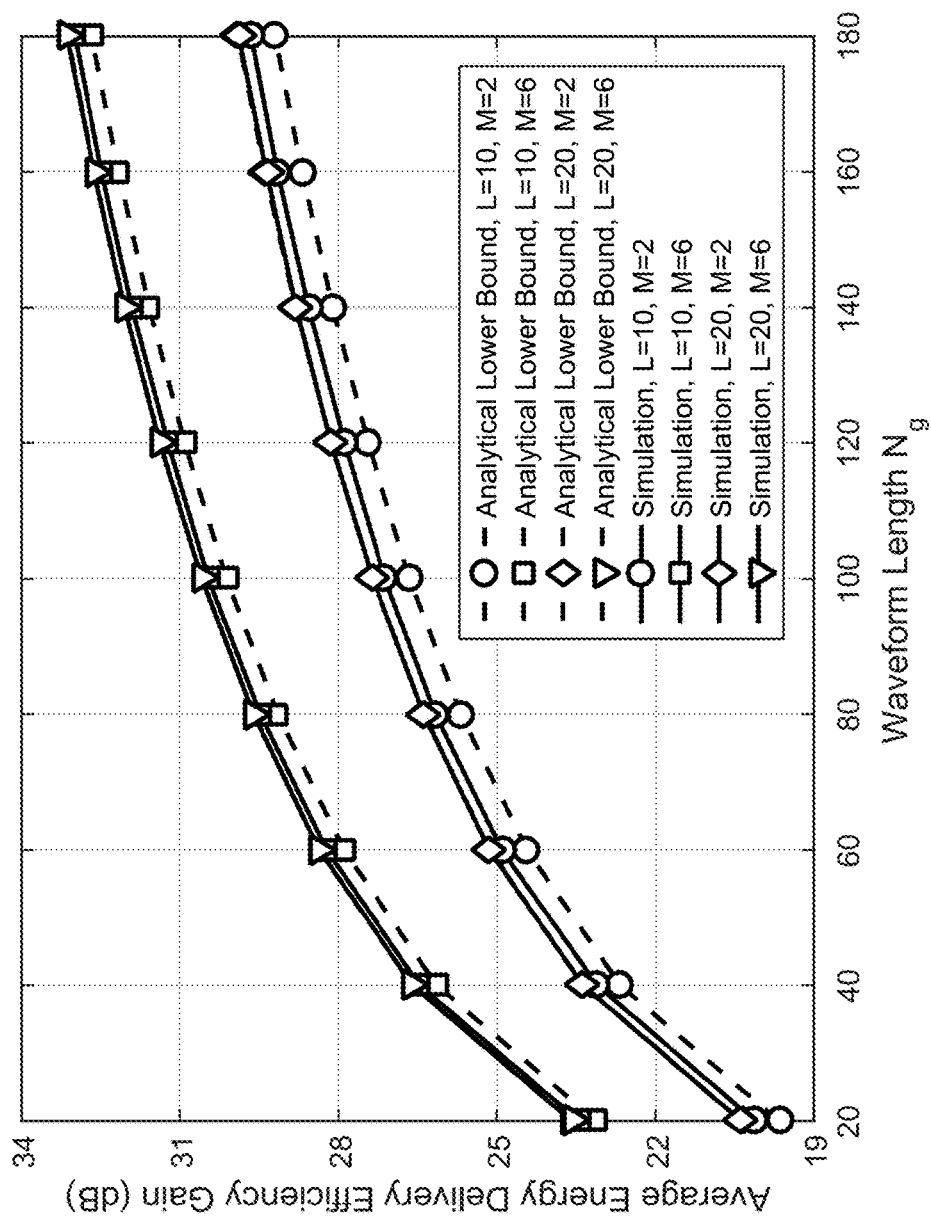
FIG. 38 shows an exemplary average energy delivery efficiency gain and the analytical lower bound for the multi-antenna PW systems with the periodic transmission of reference signals under the UPD channel profile ($N_v$=20), according to an embodiment of the present teaching.

FIG. 38 depicts the average energy delivery efficiency gain as a function of the waveform length and the derived lower bound given in (44) under the UPD channel profile for various numbers of transmit antennas and multipaths. The length of reference signals is given by $N_v$=20. Experiment results reveal that a substantial improvement can be achieved by increasing the waveform length, the number of transmit antennas, and the resolvable number of multipaths. It is evident from this figure that the simulation results and the analytical results fit perfectly when $N_v$=L=20, which confirms the theoretical findings in Theorem 4. The proposed lower bound is also very tight in the cases with L=10, and therefore, it can serve as a good lower bound for predicting the performance of the proposed multi-antenna PW system in multipath environments.

Simultaneous Wireless Information and Power Transfer (SWIPT)

Figure 39:
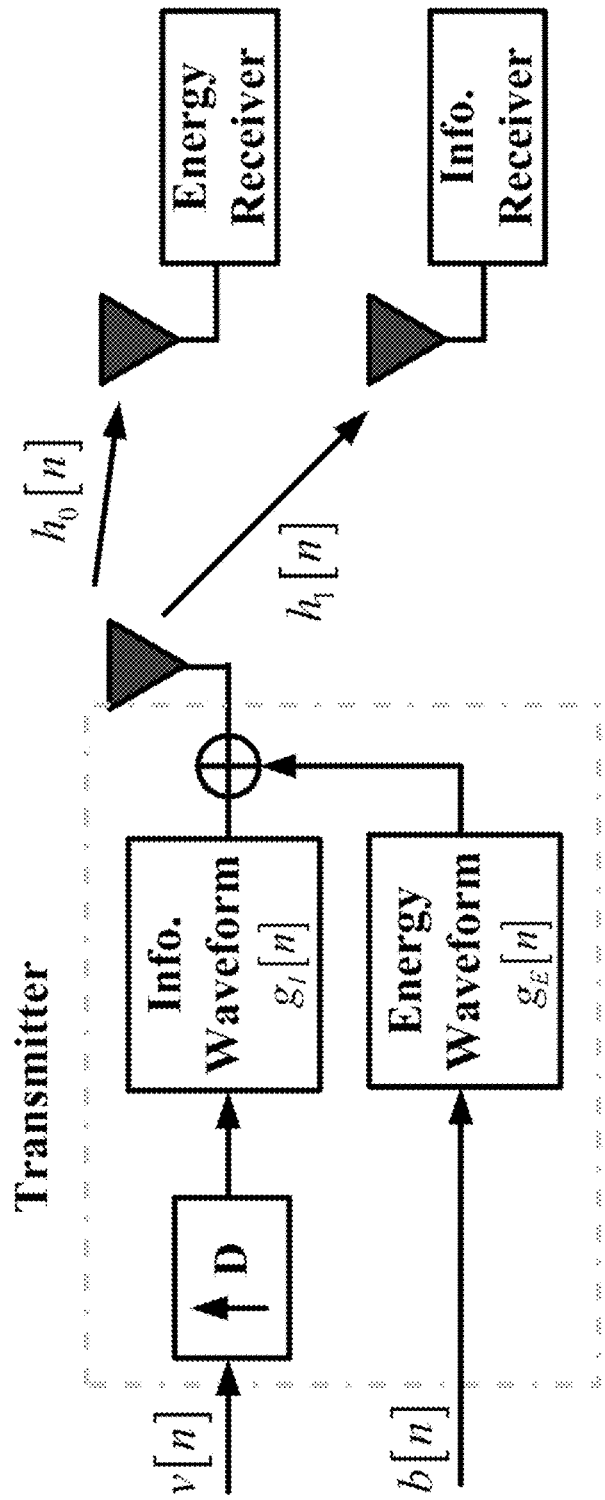
FIG. 39 shows an exemplary simultaneous wireless information and power transfer system, according to an embodiment of the present teaching.

An example of a SWIPT system is show in FIG. 39, which includes one transmitter, one information receiver (IRx) and one separated energy receiver (ERx). The transmitter intends to send data to the IRx, while transferring wireless power to the ERx concurrently. Assume that there are totally $J_{max}$ numbers of independent multipaths between each transmitter and receiver pair in the wireless environments, and the $j^{th}$ path has the path delay for j=1, . . . ,$J_{max}$. Without loss of generality, the maximum delay spread is given by $\tau_{J_{max}}$. Let W be the bandwidth of the waveforming SWIPT system. Through the Nyquist sampling, the discrete channel impulse response between a transmitter and a receiver can be modeled as an L-tap wireless fading channel, where L=round ($\tau_{J_{max}}$W) also represents the number of resolvable paths in digital domain. Specifically, the channel impulse response (CIR) between the transmitter and the receiver i can be modeled as $$h_i[n]=\Sigma_{l=0}^{L-1}h_{i,l}\delta[n-l], n=0, \ldots, L-1, \tag{61}$$

where $\delta[n]$ is the Kronecker delta function, and $h_{i,l}$ is the complex channel gain of the $l^{th}$ tap. Here, the subscripts i=0 and i=1 are used for denoting the energy and the information receivers, respectively, and one can define $h_i=[h_i[0], \ldots, h_i[L-1]]^T$. Moreover, it is assumed that the channel taps of the CIR are spatially and temporally uncorrelated with each other, i.e., $\mathbb{E}[h_{i,m}h_{j,k}^*]=0$, for any i≠j or m≠k. Suppose that there are J non-zero elements in the L-tap channel vector $h_i$ for a given i. It can be found that when the bandwidth W is small, the L channel taps are in general non-zero. On the other hand, when the bandwidth W is sufficiently large, the non-zero elements in $h_i$ is at most given by $J=J_{max}$<L[1]. Define J as a set including those non-zero channel taps, which reflects the physical phenomenon of scatter distribution in the wireless environments. Then, one can have $h_{i,l}=0$, for l J, and $h_{i,l}$ is a circularly symmetric complex Gaussian random variable with zero mean and variance $\rho_{i,l}$, for l∈J.

There are two transmission phases in the waveforming SWIPT system. During the first phase, the two receivers first send pilot signals in sequence to the transmitter for estimating the CIRs $h_0[n]$ and $h_1[n]$ at the transmitter side. With the channel reciprocity assumption, during the second phase, the transmitter then forms waveforms $g_E[n]$ and $g_I[n]$ for sending power and information to the respective receivers according to the channel state information (CSI), for n=0, . . . , L−1. Let v[n] be the transmitted data symbols with $\mathbb{E}[|v[n]|^2]=1$, for n=0, . . . , N−1, and assume that $\mathbb{E}[v^*[m]v[n]]=0$, for any m≠n. Without loss of generality, one can assume N»L. Since the baud rate is typically much lower than the sampling rate, the up-sampling signal of v[n] with a rate back-off factor D can be expressed as $$v_D[n] = \begin{cases} v[n/D], & n \bmod D = 0; \\ 0, & \text{otherwise} \end{cases}, \tag{62}$$

where the rate back-off factor is a ratio of the sampling rate and the baud rate. The introduction of the back-off factor can not only apply to SWIPT but also apply to single-antenna and multiple-antenna PW discussed earlier in the present teaching. Then, the transmitted signal after waveforming is given as $$s[n]=(v_D*g_I)[n]+(b*g_E)[n], \tag{63}$$

where b[n] is an L-periodic power-bearing signal, i.e., b[n]=b[n+L], for n=0, . . . , (N−1)D, and it is assumed to be uncorrelated with $v_D[n]$, i.e., $\mathbb{E}[v_D^*[m]b[n]]=0$, for m≠n. Furthermore, its power is normalized to one, i.e., $\mathbb{E}[|b[n]|^2]=1$, and one can assume that $\mathbb{E}[b^*[m]b[n]]=0$, for any m≠n and m, n=0, . . . , L−1. Consequently, the received signal at the receiver i is expressed as $$y_i[n]=(h_i*s)[n]+z_i[n]=(f_{I,i}*v_D)[n]+(f_{E,i}*b)[n]+z_i[n]=\Sigma_{l=0}^{2L-2}f_{I,i}[l]v_D[n-l]+f_{E,i}[l]b[n-l]+z_i[n], \\ n=0, \ldots, 2L-2+(N-1)D, \tag{64}$$

where $f_{I,i}[n]=(h_i*g_I)[n]$ and $f_{E,i}[n]=(h_i*g_E)[n]$ are defined as equivalent impulse responses, for n=0, . . . , 2L−2, and $z_i[n]$ is additive complex white Gaussian noise with zero mean and variance $\sigma_z^2$. By substituting (62) into (64) and applying change of variables, it yields $$y_i[n] = \sum_{l=\lceil (n-2L+2)/D \rceil}^{\lfloor n/D \rfloor} f_{I,i}[n-lD]v[l] + \sum_{l=n-2L+2}^{n} f_{E,i}[n-l]b[l] + z_i[n] \tag{65}$$

$$= \sum_{l=\lceil (n-2L+2)/D \rceil}^{\lfloor n/D \rfloor} \sum_{m=0}^{L-1} g_I[m]h_i[n-lD-m]v[l] + \sum_{l=n-2L+2}^{n} \sum_{m=0}^{L-1} g_E[m]h_i[n-l-m]b[l] + z_i[n],$$

$$n = 0, \ldots, 2L-2+(N-1)D,$$

where $\lceil \cdot \rceil$ and $\lfloor \cdot \rfloor$ are the ceiling and floor functions, respectively.

Let $H_i$ be a (2L−1)×L Toeplitz channel matrix with the column vector $h_i=[h_i[0], \ldots, h_i[L-1], 0, \ldots, 0]^T$ as its first column, and define an extended Toeplitz channel matrix as $$B_i=[O_{(L-1)\times L}^T, H_i^T, O_{(L-1)\times L}^T]^T. \tag{66}$$

Since the transmitted data symbols v[n] are uncorrelated, one can just focus on a short period of the received signals with the length L, $y=[y_0[2L-2], \ldots, y_0[3L-3]]^T$, for computing the average harvested power at the Erx. Accordingly, one can rewrite (65) in a compact matrix-vector form as follows:

$$y=\Sigma_{q=0}^{\lfloor (3L-3)/D \rfloor}\Phi_q g_1 \cdot v[q]+\Sigma_{q=0}^{3L-3}\Phi_q g_E \cdot b[q]+z, \tag{67}$$

where z represents the noise term contained in the received signal y, and the matrix $\Phi_q$ is a submatrix of the extended Toeplitz channel matrix $B_0$, containing the entries from the (3L−3−qD)$^{th}$ row to the (4L−4−qD)$^{th}$ row of $B_0$. Moreover, the matrix $\Phi_q$ contains the entries from the (3L−3−q)$^{th}$ row to the (4L−4−q)$^{th}$ row of $B_0$. Due to the fact that b[q]=b[q+L], (67) can be rewritten as $$y=\Sigma_{q=0}^{\lfloor (3L-3)/D \rfloor}\Phi_q g_1 \cdot v[q]+\Sigma_{q=0}^{L-1}\Omega_q g_E \cdot b[q]+z, \tag{68}$$

where one can define $$\Omega_q = \begin{cases} \Phi_q + \Phi_{(q+L)} + \Phi_{(q+2L)}, & q = 0, \ldots, L-3; \\ \Phi_q + \Phi_{(q+L)}, & q = L-2, L-1 \end{cases}. \tag{69}$$

It is then straightforward to verify that the matrix $\Omega_q$ is a circulant matrix of size L×L, specified by the circular-shifted version of the CIR column vector $h_0$ for different q. Thus, one can have the following relationship:

$$F\Omega_q F^\dagger = \sqrt{L} \cdot \text{Diag}(Fh_0) \cdot \text{Diag}(\zeta_q), \tag{70}$$

where F is an L×L discrete Fourier transform matrix whose (m,n)$^{th}$ entry is given by $$\frac{1}{\sqrt{L}}e^{-j2\pi mn/L}, \text{ for } m, n = 0, \ldots, L-1,$$

and $\zeta_q = [e^{-j2\pi q 0/L}, \ldots, e^{-j2\pi q(L-1)/L}]^T$ is a linear phase due to the circular shift q.

Without loss of generality, one can assume that the number of channel taps is finite, and the time duration of the transmitted signals is sufficiently larger, i.e., N»L. From (65) and (68), as N goes to infinity, the average received power at the ERx is asymptotically expressed as $$P_E = \lim_{N \to \infty} \frac{1}{2L-1+(N-1)D} \sum_{n=0}^{2L-2+(N-1)D} \mathbb{E}[|y_0[n]|^2] \quad (71)$$

$$= \frac{1}{L}\mathbb{E}[\|y\|_2^2] = \frac{1}{L} g_I^\dagger R_E g_I + \frac{1}{L} g_E^\dagger R_E g_E,$$

where the matrices $R_E$ and $\tilde{R}_E$ are defined as $R_E = \sum_{q=0}^{\lfloor(3L-3)/D\rfloor} \Phi_q^\dagger \Phi_q \geq 0$ and $\tilde{R}_E = \sum_{q=0}^{L-1} \Omega_q^\dagger \Omega_q \geq 0$, respectively. It can be found that the matrix $R_E$ is composed of the matrix $\tilde{R}_E$ and a remaining positive semi-definite matrix. As a result, one can obtain $\lambda_{max}(\tilde{R}_E) \geq \lambda_{max}(R_E)$ Different from the ERx where the received signals are directly used for charing rechargeable batteries, a down-sampling process of the received signals is required at the IRx before data symbols decoding. From (65) and (67), the down-sampling signal for decoding the $p^{th}$ data symbol can be expressed as $$y_1[n]|_{n=L-1+pD} = \eta_0 g_I v[p] + \sum_{q=p-\lfloor(L-1)/D\rfloor, q \neq p}^{p+\lfloor(L-1)/D\rfloor} \eta_{(q-p)} g_I v[q] + \sum_{q=pD}^{pD+(L-1)} \theta_{(q-pD)} g_E b[q] + z_1[L-1+pD], \quad (72)$$

where one can define $$\theta_j = \begin{cases} \eta_0, & j=0, \\ \eta_j + \eta_{(j-L)}, & j=1, \ldots, L-1 \end{cases}, \quad (73)$$

and $\eta_j$ and $\eta_j$ are the $(L-1-jD)^{th}$ row and the $(L-1-j)^{th}$ row of the matrix $H_1$, respectively. Accordingly, the signal-to-interference plus noise power ratio (SINR) can be computed as $$\Gamma = \frac{g_I^\dagger R_D g_I}{g_I^\dagger R_I g_I + g_E^\dagger R_I g_E + \sigma_z^2}, \quad (74)$$

where $R_D = \eta_0^\dagger \eta_0 \geq 0$, $R_I = \sum_{j=-\lfloor(L-1)/D\rfloor, j \neq 0}^{\lfloor(L-1)/D\rfloor} \eta_j^\dagger \eta_j \geq 0$, and $\tilde{R}_I = \sum_{j=0}^{L-1} \theta_j^\dagger \theta_j$.

One exemplary waveforming design goal of SWIPT is to maximize the received power at the ERx, while ensuring the quality-of-service (QoS) of the IRx with a preset SINR constraint. From (71) and (74), the optimal waveforming design problem, subject to a total transmit power constraint, can thus be formulated as $$(P1): \max_{g_I, g_E} g_I^\dagger R_E g_I + g_E^\dagger R_E g_E \quad (75)$$

s.t. (C.1) $\frac{g_I^\dagger R_D g_I}{g_I^\dagger R_I g_I + g_E^\dagger R_I g_E + \sigma_z^2} \geq \gamma_{th};$ (C.2) $\|g_I\|_2^2 + \|g_E\|_2^2 \leq P_{max},$ where $\gamma_{th}$ is a preset threshold for the QoS constraint, and $P_{max}$ is the maximum allowable transmit power. The necessary and sufficient condition for the feasibility of the problem (P1) is stated as follows.

Theorem 5 The problem (P1) is feasible, only if the SINR threshold $\gamma_{th}$ and the maximum allowable power $P_{max}$ satisfy the condition:

$$\lambda_{max}(R_D - \gamma_{th} R_I) \geq \frac{1}{P_{max}} \gamma_{th} \sigma_z^2. \quad (76)$$

In fact, the optimization problem (P1) is non-convex, and one can resort to a semi-definite relaxation (SDR) approach to solve the problem. First, one can define two rank-one matrices $G_I = g_I g_I^\dagger$ and $G_E = g_E g_E^\dagger$, and the problem (P1) can be equivalently rewritten as $$(P2): \max_{G_I \geq 0, G_E \geq 0} Tr(R_E G_I + \tilde{R}_E G_E) \quad (77)$$

s.t.

(C.1) $Tr((\gamma_{th} R_I - R_D) G_I + \gamma_{th} \tilde{R}_I G_E) + \gamma_{th} \sigma_z^2 \leq 0;$ (C.2) $Tr(G_I + G_E) \leq P_{max};$ (C.3) Rank $(G_I) = 1;$ (C.4) Rank $(G_E) = 1.$ By relaxing the rank-one constraint, it yields a convex optimization problem in the following:

$$(P3): \min_{G_I \geq 0, G_E \geq 0} -Tr(R_E G_I + \tilde{R}_E G_E) \quad (78)$$

s.t.

(C.1) $Tr((\gamma_{th} R_I - R_D) G_I + \gamma_{th} \tilde{R}_I G_E) + \gamma_{th} \sigma_z^2 \leq 0;$ (C.2) $Tr(G_I + G_E) \leq P_{max}.$ The optimal solution for the problem (P3) can be found by using off-the-shelf solvers, and the following theorem is given.

Theorem 6 The optimal solution $(G_I^*, G_E^*)$ obtained by the problem (P3) is also the optimal one for the problem (P2).

It can be shown that both of the power constraint and the QoS constraint hold with equality for the optimal waveform solution. Moreover, the globally optimal solution to the original problem (P1) can be found by extracting the principal eigenvector of the obtained optimal solution $G_I^*$ and $G_E^*$ in (78).

In reality, the optimal solution makes performance tradeoff between the obtained SINR at the IRx and the harvested power at the ERx. To get more insight, a theorem is provided in the following to demonstrate the inherent tradeoff for obtaining the optimal solution, and one can define $A = R_E + \kappa_1^*(R_D - \gamma_{th} R_I)$ and $B = \tilde{R}_E - \kappa_1^* \gamma_{th} \tilde{R}_I$ for the sake of simple notation, where $\kappa_1^* \geq 0$, $\kappa_2^* \geq 0$ are the Lagrangian multipliers associated with the constraints (C.1), (C.2)

held with equality respectively. Theorem 7 The optimal waveform $(g_I^*, g_E^*)$ to the problem (P1) is given as $$(g_I^*, g_E^*) = \begin{cases} (\sqrt{P_{max}}\,\bar{g}_1, 0), & \text{if } \lambda_{max}(A) > \lambda_{max}(B); \\ (0, \sqrt{P_{max}}\,\bar{g}_2), & \text{if } \lambda_{max}(A) < \lambda_{max}(B); \\ \left( \sqrt{\frac{1}{a+b}(bP_{max} + \gamma_{th}\sigma_z^2)}\,\bar{g}_1, \right. \\ \left. \sqrt{\frac{1}{a+b}(aP_{max} - \gamma_{th}\sigma_z^2)}\,\bar{g}_2 \right), & \text{if } \lambda_{max}(A) = \lambda_{max}(B), \end{cases} \quad (79)$$

where $\bar{g}_1$ and $\bar{g}_2$ are the principal eigenvectors of the matrices A and B, respectively, the two power allocation-related factors are defined as $a=\bar{g}_1^\dagger(R_D-\gamma_{th}R_I)\bar{g}_1$, $b=\gamma_{th}\bar{g}_2^\dagger \tilde{R}_I\bar{g}_2$, and the optimal value of $\kappa_1^*$ is selected to ensure the following condition satisfied:

$$\begin{cases} aP_{max} = \gamma_{th}\sigma_z^2, & \text{if } \lambda_{max}(A) > \lambda_{max}(B); \\ bP_{max} = -\gamma_{th}\sigma_z^2, & \text{if } \lambda_{max}(A) < \lambda_{max}(B); \\ 0 \leq \frac{1}{a+b}(bP_{max} + \gamma_{th}\sigma_z^2) \leq P_{max}, & \text{if } \lambda_{max}(A) = \lambda_{max}(B) \end{cases} \quad (80)$$

According to this theorem, one can make the following observations. First, since the QoS constraint is always active, the solution $(g_I^*, g_E^*)=(0,\sqrt{P_{max}}\bar{g}_2)$ occurs, if and only if $\gamma_{th}=0$. Thus, the vector $\bar{g}_2$ is degenerated as the principal eigenvector of the matrix $\tilde{R}_E$. Second, when the threshold $\gamma_{th}$ for the QoS constraint becomes large, the optimal solution tends to the form $(g_I^*, g_E^*)=(\sqrt{P_{max}}\bar{g}_1, 0)$ in order to avoid the inter-waveform interference to the IRx.

If one can define that a waveform g is called a single-tone waveform, if it takes the form $g=c\cdot F^\dagger e_k$, where $e_k$ represents the $k^{th}$ column of an L×L identity matrix $I_L$, and c is a constant, one can show that the optimal energy waveform $g_E^*$ for the waveforming SWIPT systems is a single-tone waveform, i.e., $g_E^*=\sqrt{P_E}F^\dagger e_k$, and the energy waveform design can be simply determined by tone selection and power allocation.

Below one can disclose an exemplary algorithm to find the optimal SWIPT waveform without relying on the adoption of the SDR approach. From Theorem 7, the optimal waveform belongs to one of the three forms in (79), and an iterative algorithm is proposed in Table 2 to find the optimal solution via a bisection method. First, if $\gamma_{th}=0$, the optimal solution is given by $(g_I^*, g_E^*)=(0,\sqrt{P_{max}}\bar{g}_2)$, where $\bar{g}_2$ is the principal eigenvector of $\tilde{R}_E$. Otherwise, one can utilize a bisection algorithm to find a value of $\kappa_1$ for achieving the condition $\lambda_{max}(A)=\lambda_{max}(B)$. The bisection algorithm is repeated until $|\lambda_{max}(A)-\lambda_{max}(B)|\leq\varepsilon_1$ for a sufficiently small threshold $\varepsilon_1$. Then the allocated power values $P_I$ and $P_E$ are computed for the information and the energy waveforms, respectively. If $0\leq P_I\leq P_{max}$, it means that $(g_I^*, g_E^*)=(\sqrt{P_I}\bar{g}_1, \sqrt{P_E}\bar{g}_2)$ is the optimal solution, where $\bar{g}_1$ and $\bar{g}_2$ are the principal eigenvectors of the matrices A and B, respectively, associated with $\kappa_1$. Otherwise, one can proceed to find a value of $\kappa_1$ which satisfies the condition $aP_{max}=\gamma_{th}\sigma_z^2$ by a bisection method until $|aP_{max}-\gamma_{th}\sigma_z^2|\leq\varepsilon_2$, where $\varepsilon_2$ is a sufficiently small threshold. Then, the obtained solution $(g_I^*/g_E^*)=$is the optimal waveform, where $\bar{g}_1$ is the corresponding principal eigenvector of the matrix A.

TABLE 2

An Exemplary Algorithm for Finding the Optimal SWIPT Waveform

```
1:  if γ_th = 0
2:    Set (g_I*, g_E*) = (0, √P_max g̅_2), where g̅_2 is the principal eigenvector of R̃_E ;
3:  else
4:    Initialize κ_L = 0 and κ_U ;
5:    repeat
6:      Compute λ_max (A) and λ_max (B) using (93) with κ_1 = ½ (κ_U + κ_L) ;
7:      if λ_max (A) < λ_max (B) Update κ_L ← κ_1 ; else Update κ_U ← κ_1 ; end
8:    until |λ_max (A) − λ_max (B)| ≤ ε_1 ;
9:    Compute the allocated power α and β using
```

$$P_I = \frac{1}{a+b}(bP_{max} + \gamma_{th}\sigma_z^2) \text{ and } P_E = \frac{1}{a+b}(aP_{max} - \gamma_{th}\sigma_z^2);$$

```
10:     if 0 ≤ α ≤ P_max
11:       Set (g_I*, g_E*) = (√α g̅_1, √β g̅_2), where g̅_1 and g̅_2 are the principal eigenvectors of
12:       A and B with κ_1.
13:     else
14:       Initialize κ_L = 0 and κ_U ;
15:       repeat
16:         Compute (g_I*, g_E*) = (√P_max g̅_1, 0), where g̅_1 is the principal eigenvector of A
17:         with κ_1 = ½ (κ_U + κ_L) ;
18:         if αP_max < γ_th σ_z² Update κ_L ← κ_1 ; else Update κ_U ← κ_1 ; end
19:       until |αP_max − γ_th σ_z²| ≤ ε_2 ;
20:     end
21:  end
```

In one embodiment, the disclosed WPT system with one receiver or terminal device can be extended to the case with more than one receiver or terminal device. The optimal waveform can be designed to maximize the energy delivery efficiency gain of a system with multiple terminal devices, and the energy delivery efficiency gain can be defined as the ratio of the total harvested energy at all the receivers or terminal devices and the total energy expenditure at the transmitter.

Figure 40:
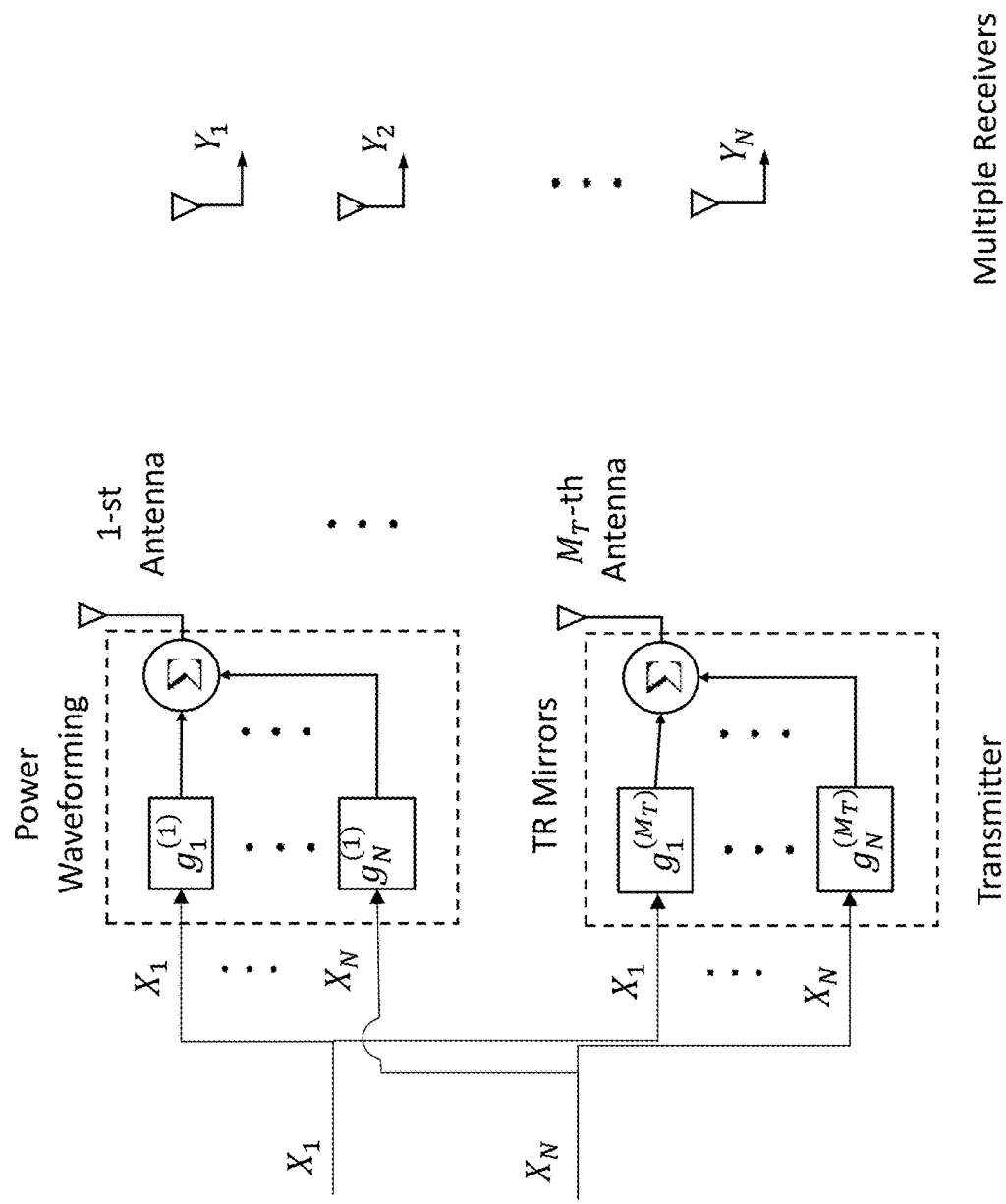
FIG. 40 shows an exemplary wireless power waveforming system with multiple transmit antennas at the transmitter and multiple receivers, according to an embodiment of the present teaching.

In another embodiment, the receiver in the disclosed WPT system can each be equipped with more than one antenna. In yet another embodiment, the reference signal for each receiver, or user, or terminal device, can be different. One example is shown in FIG. 40 where the transmitter is equipped with $M_T$ antennas and there are N receivers. The reference signal for receiver i is represented by $X_i$.

In one embodiment, the parameters in the disclosed WPT system, such as the waveform length, the reference signal length, and the channel length, can be adjusted through a feedback loop. If the received energy is smaller than expected, the waveform length and/or the reference signal length can be increased, or the channel length can be increased by increasing the system bandwidth.

In one embodiment, if the channel between the energy transmitter and the receiver changes, the joint design of the power waveforming and the reference signal need to be updated based on the new channel state information.

In some implementations, each of the wireless devices 108, 110, 140, transmitter or Origin 816, receiver or Bot 806, computer 820, power transmitters 2302, power receivers 2306, 2310, power repeaters 2306 can include one or more processors and one or more computer-readable mediums (e.g., RAM, ROM, SDRAM, hard disk, optical disk, and flash memory). The one or more processors can perform various calculations described above. The calculations can also be implemented using application-specific integrated circuits (ASICs). The calculations can also be implemented in remote computing resources such as remote computers and cloud computing resources. The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire, fiber optics and free space.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments can also be implemented in combination in a single embodiment. Conversely, various features that are described in the context of a single embodiment can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus for wireless power transmission, comprising:
at least one antenna configured for receiving at least one wireless signal from a receiver, via a multipath channel between the apparatus and the receiver; and
at least one processor configured for
estimating at least one channel state information (CSI) of the multipath channel based on the at least one wireless signal,
determining a power transmission waveform based on the at least one CSI, and
calculating a power transfer signal based on the power transmission waveform and a reference signal,
wherein the at least one antenna is further configured for wirelessly transmitting the power transfer signal to the receiver,
wherein determining the power transmission waveform comprises jointly designing the power transmission waveform and the reference signal to maximize an efficiency gain that is a ratio between a total harvested energy at the receiver and a total energy expenditure at the apparatus,
wherein jointly designing the power transmission waveform and the reference signal comprises:
initiating an iteration number,
optimizing, based on an initial version of the reference signal or a previous version of the reference signal from previous iteration, the power transmission waveform to maximize the efficiency gain and generate a current version of the power transmission waveform of current iteration, optimizing, based on the current version of the power transmission waveform of current iteration, the reference signal to maximize the efficiency gain and generate a current version of the reference signal of current iteration, increasing the iteration number by one, and repeating the steps of optimizing the power transmission waveform, optimizing the reference signal and increasing the iteration number, until at least one of the following: the iteration number exceeds a first threshold, a difference between the current version of the reference signal of current iteration and the previous version of the reference signal from previous iteration is smaller than a second threshold, and a difference between the current version of the power transmission waveform of current iteration and a previous version of the power transmission waveform from previous iteration is smaller than a third threshold.

2. The apparatus of claim 1, further comprising:
a digital-to-analog converter configured for converting the power transfer signal having a digital format to an analog power transfer signal; and
an amplifier configured for amplifying the analog power transfer signal to generate an amplified analog power transfer signal, wherein the at least one antenna is configured for wirelessly transmitting the amplified analog power transfer signal to the receiver.

3. The apparatus of claim 1, wherein determining the power transmission waveform comprises designing the power transmission waveform to maximize an efficiency of energy delivery from the apparatus to the receiver.

4. The apparatus of claim 1, wherein the initial version of the reference signal is a single-tone signal that has a power spectrum condensed into a single frequency tone that has a largest value of summation of channel power over all transmit antennas on the apparatus.

5. The apparatus of claim 1, wherein jointly designing the power transmission waveform and the reference signal comprises:
designing the power transmission waveform to be a single-tone waveform regardless of the designing of the reference signal, when the reference signal is periodic and a first length of the power transmission waveform is a multiple of a second length of the reference signal; and
designing the reference signal to be a single-tone signal that has a power spectrum condensed into a single frequency tone that has a largest value of summation of channel power over all transmit antennas on the apparatus, regardless of the designing of the power transmission waveform, when the reference signal is periodic and the second length of the reference signal is larger than or equal to a third length of the multipath channel.

6. The apparatus of claim 1, wherein the at least one processor is further configured for adjusting at least one of the following parameters: a quantity of transmit antennas on the apparatus for wirelessly transmitting power transfer signals, a quantity of multipaths of the multipath channel, a length of the power transmission waveform, and a length of the reference signal, based on at least one of:

a first relationship between an upper bound of an outage probability and the at least one parameter, wherein the outage probability is a probability that harvested energy at the receiver is smaller than or equal to a predetermined threshold; and a second relationship between a lower bound of an efficiency gain and the at least one parameter, wherein the efficiency gain is a ratio between a total harvested energy at the receiver and a total energy expenditure at the apparatus.

7. The apparatus of claim 1, wherein:
the at least one antenna is further configured for receiving a feedback signal from the receiver;
the at least one processor is further configured for
detecting a change of the multipath channel based on the feedback signal;
estimating updated at least one CSI of the multipath channel upon detecting the change of the multipath channel,
updating at least one of the power transmission waveform and the reference signal based on the updated at least one CSI, and
re-calculating the power transfer signal to generate an updated power transfer signal; and
the at least one antenna is further configured for wirelessly transmitting the updated power transfer signal to the receiver.

8. The apparatus of claim 1, wherein:
the at least one antenna is further configured for receiving a feedback signal from the receiver;
the at least one processor is further configured for
determining that harvested energy at the receiver is smaller than or equal to a predetermined threshold based on the feedback signal;
updating at least one of: a first length of the power transmission waveform, a second length of the reference signal, a third length of the multipath channel, and a quantity of transmit antennas, and
re-calculating the power transfer signal to generate an updated power transfer signal; and
one or more of the at least one antenna, according to the quantity of transmit antennas, is further configured for wirelessly transmitting the updated power transfer signal to the receiver.

9. The apparatus of claim 1, wherein:
the at least one processor is further configured for
determining a first narrow band power transmission waveform having a first frequency that is selected based on at least one characteristic associated with wireless power transmission to the receiver, the first frequency being within a first frequency range,
determining a second narrow band power transmission waveform having a second frequency that is selected based on the at least one characteristic, the second frequency being within a second frequency range that does not overlap the first frequency range,
determining a composite narrow band power transmission waveform based on a combination of the first and second narrow band power transmission waveforms, and
calculating a composite narrow band power transfer signal based on the composite narrow band power transmission waveform; and
the at least one antenna is further configured for wirelessly transmitting the composite narrow band power transfer signal to the receiver.

10. The apparatus of claim 1, wherein:
the power transmission waveform is a narrowband frequency tone waveform;
the at least one antenna includes at least one of: an omni-directional antenna and a dipole antenna;
the at least one wireless signal has an auto-correlation function that is a delta function;
the at least one CSI includes at least one of: a channel impulse response (CIR) of the multipath channel and a channel frequency response (CFR) of the multipath channel; and
the at least one wireless signal includes at least one of: a wireless signal having a center frequency between 2 GHz and 3 GHz and a wireless signal having a center frequency between 5 GHz and 7 GHz.

11. An apparatus for wireless power transmission, comprising:
at least one antenna configured for receiving at least one wireless signal from a receiver, via a multipath channel between the apparatus and the receiver; and
at least one processor configured for
estimating at least one channel state information (CSI) of the multipath channel based on the at least one wireless signal,
determining a power transmission waveform based on the at least one CSI, and
calculating a power transfer signal based on the power transmission waveform and a reference signal,
wherein the at least one antenna is further configured for wirelessly transmitting the power transfer signal to the receiver,
wherein determining the power transmission waveform comprises jointly designing the power transmission waveform and the reference signal to maximize an efficiency gain that is a ratio between a total harvested energy at the receiver and a total energy expenditure at the apparatus,
wherein jointly designing the power transmission waveform and the reference signal comprises:
designing the power transmission waveform to be a single-tone waveform regardless of the designing of the reference signal, when the reference signal is periodic and a first length of the power transmission waveform is a multiple of a second length of the reference signal, and
designing the reference signal to be a single-tone signal that has a power spectrum condensed into a single frequency tone that has a largest value of summation of channel power over all transmit antennas on the apparatus, regardless of the designing of the power transmission waveform, when the reference signal is periodic and the second length of the reference signal is larger than or equal to a third length of the multipath channel.

12. The apparatus of claim 11, further comprising:
a digital-to-analog converter configured for converting the power transfer signal having a digital format to an analog power transfer signal; and
an amplifier configured for amplifying the analog power transfer signal to generate an amplified analog power transfer signal, wherein the at least one antenna is configured for wirelessly transmitting the amplified analog power transfer signal to the receiver.

13. The apparatus of claim 11, wherein determining the power transmission waveform comprises designing the power transmission waveform to maximize an efficiency of energy delivery from the apparatus to the receiver.

14. The apparatus of claim 11, wherein the initial version of the reference signal is a single-tone signal that has a power spectrum condensed into a single frequency tone that has a largest value of summation of channel power over all transmit antennas on the apparatus.

15. The apparatus of claim 11, wherein:
the at least one antenna is further configured for receiving a feedback signal from the receiver;
the at least one processor is further configured for
detecting a change of the multipath channel based on the feedback signal;
estimating updated at least one CSI of the multipath channel upon detecting the change of the multipath channel,
updating at least one of the power transmission waveform and the reference signal based on the updated at least one CSI, and
re-calculating the power transfer signal to generate an updated power transfer signal; and
the at least one antenna is further configured for wirelessly transmitting the updated power transfer signal to the receiver.

16. The apparatus of claim 11, wherein:
the at least one antenna is further configured for receiving a feedback signal from the receiver;
the at least one processor is further configured for
determining that harvested energy at the receiver is smaller than or equal to a predetermined threshold based on the feedback signal;
updating at least one of: a first length of the power transmission waveform, a second length of the reference signal, a third length of the multipath channel, and a quantity of transmit antennas, and
re-calculating the power transfer signal to generate an updated power transfer signal; and
one or more of the at least one antenna, according to the quantity of transmit antennas, is further configured for wirelessly transmitting the updated power transfer signal to the receiver.

17. The apparatus of claim 11, wherein:
the at least one processor is further configured for
determining a first narrow band power transmission waveform having a first frequency that is selected based on at least one characteristic associated with wireless power transmission to the receiver, the first frequency being within a first frequency range,
determining a second narrow band power transmission waveform having a second frequency that is selected based on the at least one characteristic, the second frequency being within a second frequency range that does not overlap the first frequency range,
determining a composite narrow band power transmission waveform based on a combination of the first and second narrow band power transmission waveforms, and
calculating a composite narrow band power transfer signal based on the composite narrow band power transmission waveform; and
the at least one antenna is further configured for wirelessly transmitting the composite narrow band power transfer signal to the receiver.

18. An apparatus for wireless power transmission, comprising:
at least one antenna configured for receiving at least one wireless signal from a receiver, via a multipath channel between the apparatus and the receiver; and at least one processor configured for
- estimating at least one channel state information (CSI) of the multipath channel based on the at least one wireless signal,
- determining a power transmission waveform based on the at least one CSI, and
- calculating a power transfer signal based on the power transmission waveform and a reference signal,
- wherein the at least one antenna is further configured for wirelessly transmitting the power transfer signal to the receiver,
- wherein the power transmission waveform is a narrow-band frequency tone waveform,
- wherein the at least one antenna includes at least one of: an omni-directional antenna and a dipole antenna,
- wherein the at least one wireless signal has an auto-correlation function that is a delta function,
- wherein the at least one CSI includes at least one of: a channel impulse response (CIR) of the multipath channel and a channel frequency response (CFR) of the multipath channel, and
- wherein the at least one wireless signal includes at least one of: a wireless signal having a center frequency between 2 GHz and 3 GHz and a wireless signal having a center frequency between 5 GHz and 7 GHz.

19. The apparatus of claim 18, further comprising:
- a digital-to-analog converter configured for converting the power transfer signal having a digital format to an analog power transfer signal; and
- an amplifier configured for amplifying the analog power transfer signal to generate an amplified analog power transfer signal, wherein the at least one antenna is configured for wirelessly transmitting the amplified analog power transfer signal to the receiver.

20. The apparatus of claim 18, wherein determining the power transmission waveform comprises designing the power transmission waveform to maximize an efficiency of energy delivery from the apparatus to the receiver.

21. The apparatus of claim 18, wherein the initial version of the reference signal is a single-tone signal that has a power spectrum condensed into a single frequency tone that has a largest value of summation of channel power over all transmit antennas on the apparatus.

22. The apparatus of claim 18, wherein the at least one processor is further configured for adjusting at least one of the following parameters: a quantity of transmit antennas on the apparatus for wirelessly transmitting power transfer signals, a quantity of multipaths of the multipath channel, a length of the power transmission waveform, and a length of the reference signal, based on at least one of:
- a first relationship between an upper bound of an outage probability and the at least one parameter, wherein the outage probability is a probability that harvested energy at the receiver is smaller than or equal to a predetermined threshold; and
- a second relationship between a lower bound of an efficiency gain and the at least one parameter, wherein the efficiency gain is a ratio between a total harvested energy at the receiver and a total energy expenditure at the apparatus.

23. The apparatus of claim 18, wherein:
the at least one processor is further configured for
- determining a first narrow band power transmission waveform having a first frequency that is selected based on at least one characteristic associated with wireless power transmission to the receiver, the first frequency being within a first frequency range,
- determining a second narrow band power transmission waveform having a second frequency that is selected based on the at least one characteristic, the second frequency being within a second frequency range that does not overlap the first frequency range,
- determining a composite narrow band power transmission waveform based on a combination of the first and second narrow band power transmission waveforms, and
- calculating a composite narrow band power transfer signal based on the composite narrow band power transmission waveform; and the at least one antenna is further configured for wirelessly transmitting the composite narrow band power transfer signal to the receiver.

\* \* \* \* \*